United States Patent [19]

Zur

[11] Patent Number: 5,767,885
[45] Date of Patent: Jun. 16, 1998

[54] APPARATUS AND METHOD FOR PATTERN GENERATION ON A DIELECTRIC SUBSTRATE

[75] Inventor: Albert Zur, Givat Savion, Israel

[73] Assignee: Imagine Ltd., Ra'anana, Israel

[21] Appl. No.: 398,621

[22] Filed: Mar. 1, 1995

Related U.S. Application Data

[63] Continuation-in-part of Ser. No. 306,052, Sep. 14, 1994, Pat. No. 5,508,727, which is a continuation-in-part of Ser. No. 944,157, Sep. 11, 1992, abandoned, which is a continuation-in-part of Ser. No. 766,691, Sep. 27, 1991, Pat. No. 5,289,214, which is a continuation-in-part of Ser. No. 697,166, May 8, 1991, Pat. No. 5,157,423.

[30] Foreign Application Priority Data

Oct. 13, 1994 [IL] Israel ........................ 111281

[51] Int. Cl.⁶ .............................. B41J 2/385; B41J 2/415; G03G 13/04
[52] U.S. Cl. .............................. 347/115; 347/120; 347/140
[58] Field of Search .............................. 347/159, 162, 347/141, 147, 55, 112, 115, 120, 153, 154, 140

Primary Examiner—David F. Yockey
Assistant Examiner—L. Anderson
Attorney, Agent, or Firm—Townsend and Townsend and Crew LLP

[57] ABSTRACT

The present disclosure presents an apparatus for pattern generation on a dielectric substrate comprising an imaging drum including a dielectric pattern receiving and retaining substrate, a plurality of electrodes underlying the pattern receiving and retaining dielectric substrate, imaging circuitry for application of voltage signals to the plurality of electrodes, an elongate charge source operative to apply a flow of charges to the dielectric substrate, thereby creating a latent image thereon, a developing unit operative to apply toner to the dielectric substrate, thereby producing a toned image according to the latent image, and a transfer unit operative to transfer the toned image to a substrate.

33 Claims, 32 Drawing Sheets

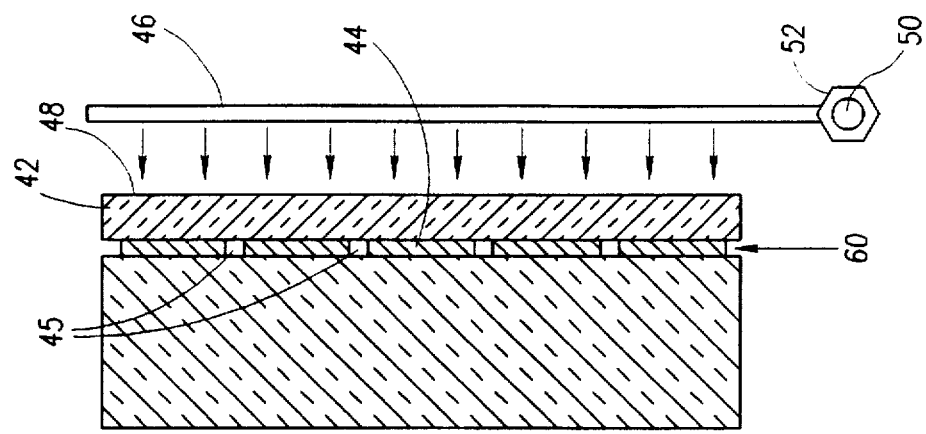
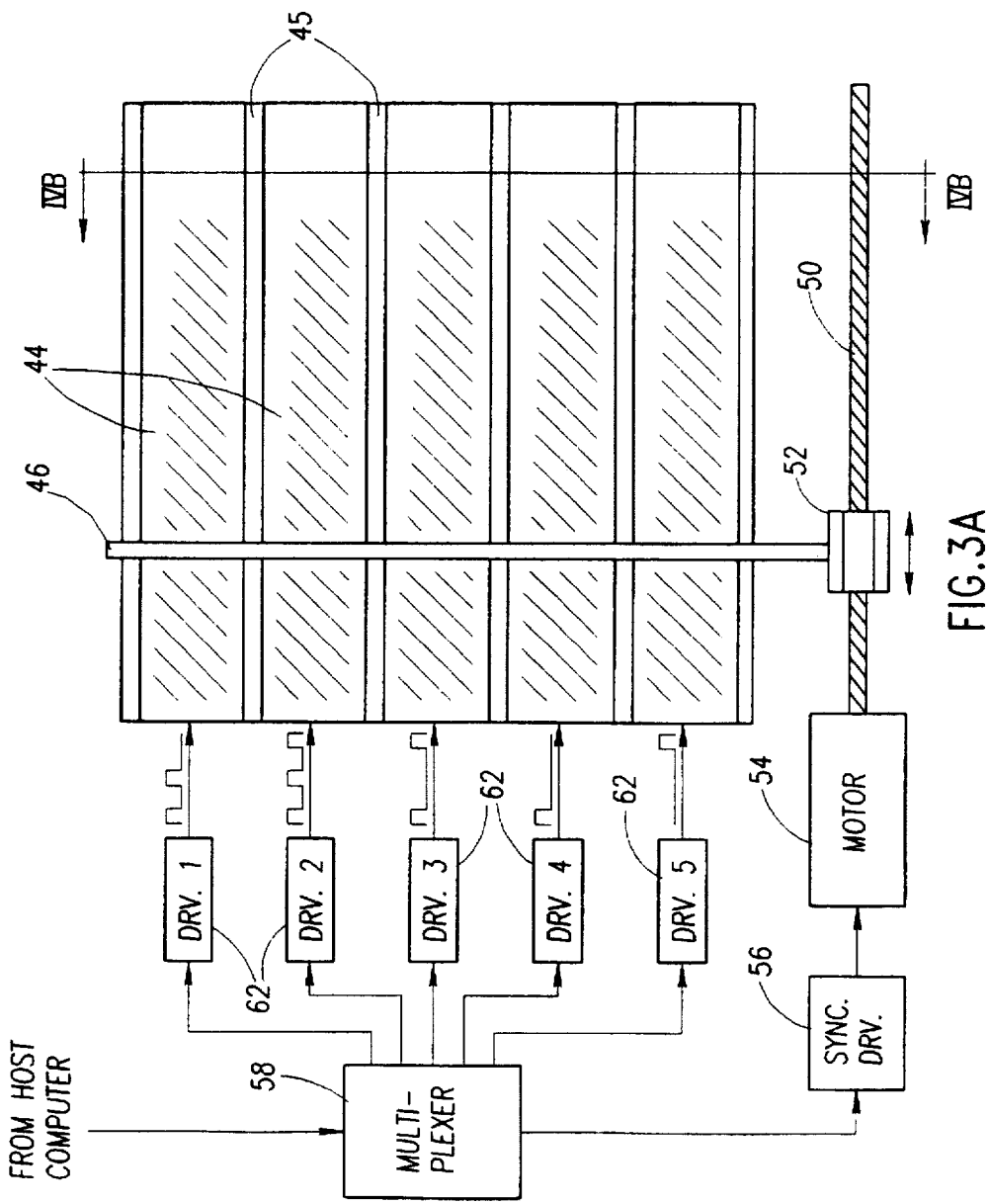

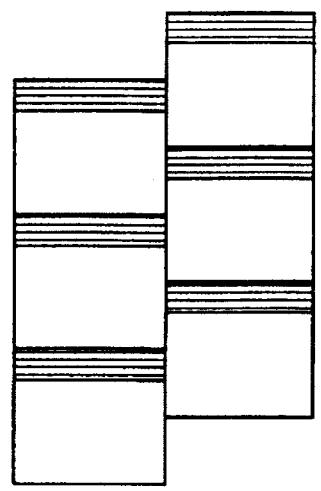
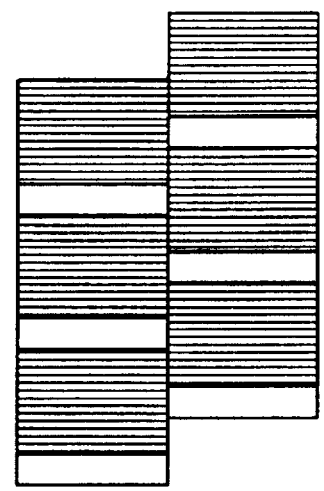
FIG. 6B
FIG. 6C
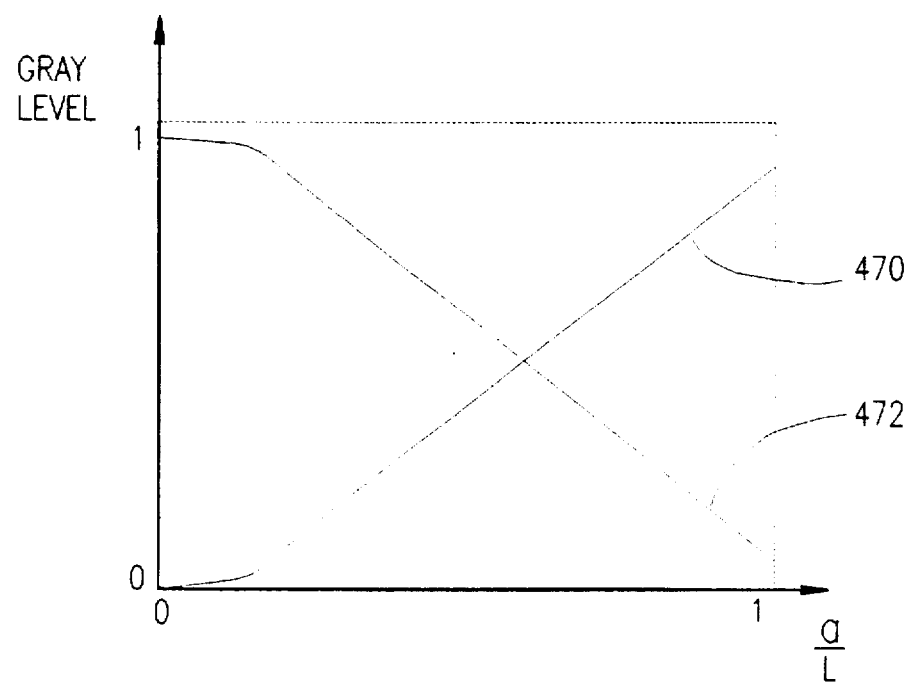
FIG. 6A

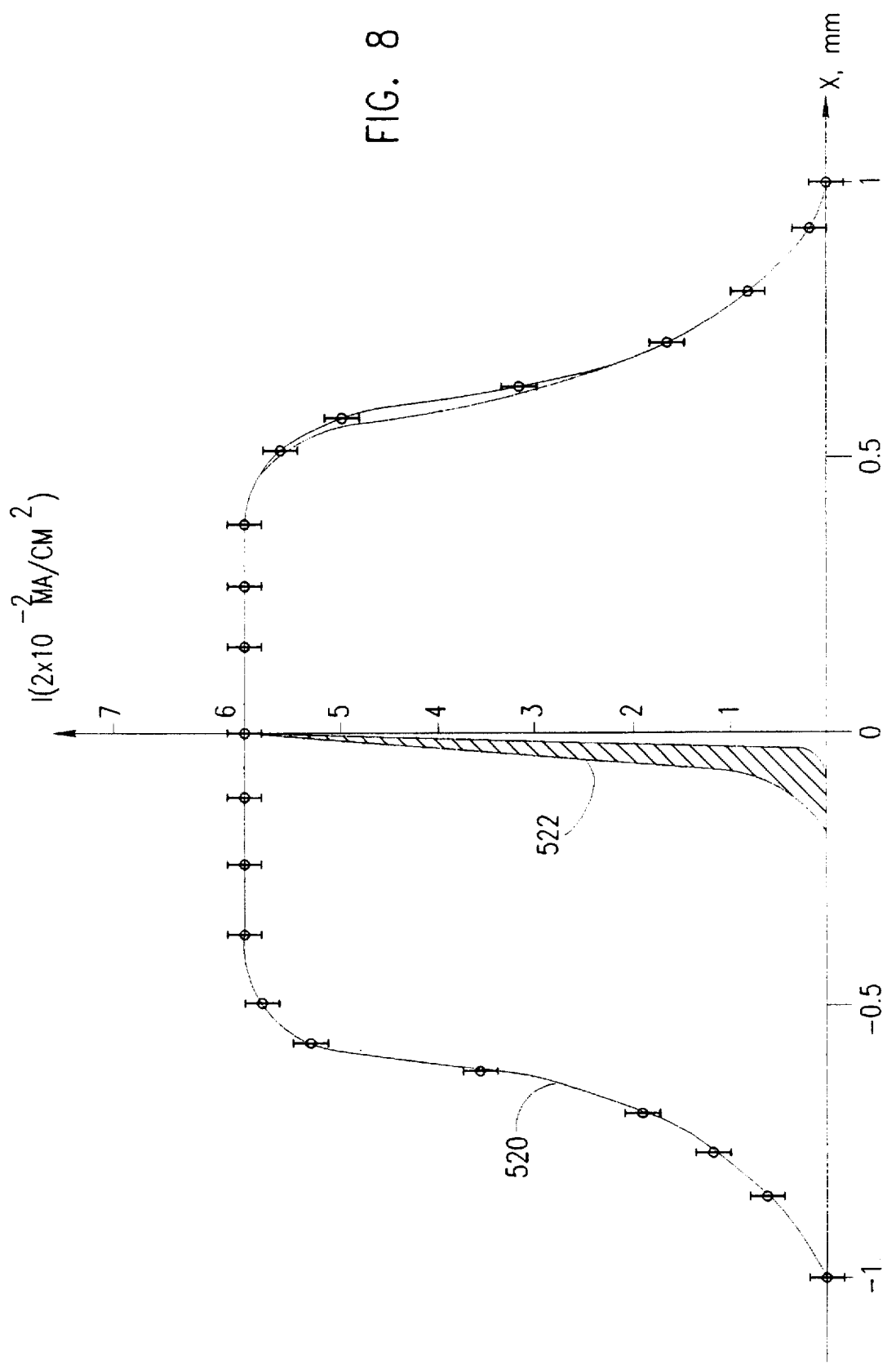

APPARATUS AND METHOD FOR PATTERN GENERATION ON A DIELECTRIC SUBSTRATE

REFERENCE TO CO-PENDING APPLICATIONS

This application is a continuation-in-part of U.S. patent application Ser. No. 306,052 titled "Apparatus and Method for Pattern Generation on a Dielectric Substrate", inventor Albert Zur, filed Sep. 14, 1994, now U.S. Pat. No. 5,508,727 and assigned to the assignee of the prsent invention, which is a continuation-in-part of U.S. patent application Ser. No. 07/944,157 filed Sep. 11, 1992 now abandoned, which is a continuation-in-part of U.S. patent application Ser. No. 07/766,691, filed Sep. 27, 1991, now U.S. Pat. No. 5,289,214, which is a continuation-in-part of U.S. patent application Ser. No. 07/697,166, filed May 8, 1991, now U.S. Pat. No. 5,157,423.

FIELD OF THE INVENTION

The present invention relates to apparatus and methods for non-impact imaging and digital printing and more particularly to digital receptor imaging drums.

BACKGROUND OF THE INVENTION

There exist in the patent literature disclosures of a great number of techniques for non-impact printing and imaging. The most widely used of these techniques is electrophotography wherein an electrostatic image is optically formed on a photoconductor, which is then developed with a toner. The toner image is transferred to a substrate and fused thereon.

An additional technique in general use is ionography, wherein an electrostatic image is formed on a dielectric substrate by firing charges directly onto the substrate using an imagewise ion source.

A technique for the transfer of electrostatic images from a dielectric photoconductor onto a dielectric substrate has also been proposed in *Electrophotography* by R. M. Schaffert, 2nd Edition, Focal Press, London, 1975 at pages 166–176 and in U.S. Pat. No. 3,055,006. This technique, known as TESI (Transfer of Electrostatic Images) employs an imagewise optical signal to create a charge image on a photoconductor. The charge image is subsequently replicated onto a dielectric substrate by applying single polarity charges to a surface of the dielectric substrate opposite from that surface which faces the photoconductor.

SUMMARY OF THE INVENTION

There is thus provided in accordance with a preferred embodiment of the present invention, apparatus for pattern generation on a dielectric substrate including a digital input electrostatic imaging drum including a latent image receiving and retaining substrate, a plurality of electrodes underlying the pattern receiving and retaining dielectric substrate, imagewise circuitry for application of voltage signals to the plurality of electrodes, an elongate charge source operative to apply a flow of charges to the dielectric substrate, thereby creating a latent image thereon, a developing unit operative to apply toner to the dielectric substrate, thereby producing a toned image according to the latent image, and a transfer unit operative to transfer the toned image to a substrate.

Additionally in accordance with a preferred embodiment of the present invention, also comprising substrate feed and transport apparatus.

Further in accordance with a preferred embodiment of the present invention, the developing unit comprises a multicolor toner applicator assembly for applying toners of multiple colors.

Still further in accordance with a preferred embodiment of the present invention, the developing unit comprises liquid toner applicator assembly.

Further in accordance with a preferred embodiment of the present invention, the developing unit comprises means for applying dry toner.

Further in accordance with a preferred embodiment of the present invention, the dry toner comprises a monocomponent toner.

Still further in accordance with a preferred embodiment of the present invention, the dry toner comprises a dual component toner.

Further in accordance with a preferred embodiment of the present invention, the transfer unit comprises an intermediate transfer medium.

There is thus provided in accordance with a preferred embodiment of the present invention, apparatus for digital copying including an image scanning unit, electronics operative to carry out image processing, memory and controller functions on an output of the image scanning unit, an image printing unit including a digital input electrostatic imaging drum including a latent image receiving and retaining substrate, a plurality of electrodes mounted in the drum and being arranged so as to underlie the pattern receiving and retaining dielectric substrate, imagewise voltage supply circuitry for application of voltage signals to the plurality of electrodes employing an output of the electronics, a non-imagewise elongate charge source operative to apply a flow of charges to the dielectric substrate, thereby creating a latent image thereon, a developing unit operative to apply toner to the dielectric substrate, thereby producing a toned image according to the latent image, and a transfer unit operative to transfer the toned image to a substrate.

There is thus provided in accordance with a preferred embodiment of the present invention, apparatus for the pattern generation on a dielectric film including an imaging drum including an outer dielectric substrate, a plurality of electrodes underlying the outer dielectric substrate, imaging circuitry for application of voltage signals to the plurality of electrodes, a non-imagewise elongate charge source operative to apply a flow of charges to the dielectric film, a relatively thin dielectric film, a drum preconditioning unit which is operative to prepare the imaging drum for attachment of the thin dielectric film, an attaching unit which is operative to place the thin dielectric film in dielectric contact with the outer dielectric substrate of imaging drum, a detaching unit which is operative to separate the thin dielectric film from the outer dielectric substrate of the imaging drum, a developing unit which is operative to apply toner to the thin dielectric film, and a laminating unit which is operative to laminate the thin dielectric film to a support medium.

Additionally in accordance with a preferred embodiment of the present invention, the toner is liquid toner.

Further in accordance with a preferred embodiment of the present invention, the support medium is paper.

Further in accordance with a preferred embodiment of the present invention, the support medium is a transparency.

Still further in accordance with a preferred embodiment of the present invention, the laminating unit encapsulates the pattern that is present on said thin dielectric film.

Further in accordance with a preferred embodiment of the present invention, the thin dielectric film is transparent and glossy.

Still further in accordance with a preferred embodiment of the present apparatus, the thin dielectric film is transparent and hazy.

There is thus provided according to a preferred embodiment of the present invention, a digital color printing apparatus including a plurality of image printing units, operating simultaneously in a synchronized manner, wherein each printing unit includes a digital input electrostatic imaging drum including a pattern receiving and retaining dielectric substrate, a plurality of electrodes underlying the pattern receiving and retaining dielectric substrate, voltage supply circuitry for application of voltage to the plurality of electrodes, a non-imagewise elongate ion source operative to apply a flow of charges to the dielectric substrate, thereby creating a latent image thereon, a developing unit operative to apply toner to the dielectric substrate, thereby producing a toned image according to the latent image, a transfer unit operative transfer the toned image to a substrate, and a print medium transport unit.

Additionally according to a preferred embodiment of the present invention, the plurality of image printing units are arranged to provide duplex printing.

There is thus provided in accordance with a preferred embodiment of the present invention, a laminated print including a transparency printer operative to print onto a transparent substrate, and a laminator for attaching the transparent substrate to a second substrate.

Additionally in accordance with a preferred embodiment of the present invention, the laminator attaches the transparent substrate, image side down onto said second substrate.

Further in accordance with a preferred embodiment of the present invention, the second substrate is an opaque substrate.

Further in accordance with a preferred embodiment of the present invention, the transparent substrate is thinner than the second substrate.

Still further in accordance with a preferred embodiment of the present invention, the transparent substrate is approximately an order of magnitude thinner than said second substrate.

Further in accordance with a preferred embodiment of the present invention, the transparency printer including a drum, a transparent substrate mounting assembly for mounting a transparent dielectric substrate onto the drum, and apparatus for developing an electrostatic image on the transparent dielectric substrate when mounted on the drum.

There is thus provided in accordance with a preferred embodiment of the present invention, a printing apparatus including a drum, a substrate mounting assembly for mounting a dielectric substrate onto the drum, and apparatus for developing an electrostatic image on the dielectric substrate when mounted on the drum.

There is thus provided in accordance with a preferred embodiment of the present invention, a method for pattern generation on a dielectric substrate the method including, providing a digital input electrostatic imaging drum including a latent image receiving and retaining substrate, a plurality of electrodes underlying the latent image receiving and retaining substrate, applying voltage signals to the plurality of electrodes, operating an elongate ion source to apply a flow of charges to the latent image receiving and retaining substrate, thereby creating a latent image thereon, applying a toner to the dielectric substrate, thereby producing a toned image according to the latent image, and transferring the toned image to a substrate.

Additionally in accordance with a preferred embodiment of the present invention, a method for also feeding and transporting the substrate into operative association with the drum.

Further in accordance with a preferred embodiment of the present invention, a method for the toner applying process includes applying toners of multiple colors.

Still further in accordance with a preferred embodiment of the present invention, a method for the toner applying process including applying liquid toner.

Further in accordance with a preferred embodiment of the present invention, a method for the toner applying process including applying dry toner.

Further in accordance with a preferred embodiment of the present invention, a method for the dry toner applying process the dry toner including a monocomponent toner.

Still further in accordance with a preferred embodiment of the present invention, a method for the dry toner applying process includes applying a dual component toner.

Further in accordance with a preferred embodiment of the present invention, a method for the transferring process including transferring the tone image to an intermediate transfer medium.

There is provided in accordance with a preferred embodiment of the present invention, a method for digital copying the method including providing an image scanning unit, image processing of electronics to carry out memory and controller functions on an output of the image scanning unit, providing an image printing unit including providing a digital input electrostatic imaging drum including a pattern receiving and retaining substrate, a plurality of electrodes underlying the pattern receiving and retaining dielectric substrate, applying voltage imagewise to the plurality of electrodes, operating a non-imagewise elongate ion source to apply a flow of charges to said dielectric substrate, thereby creating a latent image thereon, applying toner to the dielectric substrate, thereby producing a toned image according to the latent image, and transferring the toned image to a substrate.

There is provided in accordance with a preferred embodiment of the present invention, a method for pattern generation on a dielectric film the method including providing an imaging drum including an outer dielectric substrate, mounting a plurality of electrodes in the imaging drum, arranged so as to underlie the outer dielectric substrate, applying voltage signals imagewise to the plurality of electrodes, operating a non-imagewise elongate ion source to apply a flow of charges to the dielectric film, providing a relatively thin dielectric film, preparing the imaging drum for attachment of the thin dielectric film, placing the thin dielectric film in dielectric contact with the outer dielectric substrate of imaging drum, separating the thin dielectric film from said outer dielectric substrate of said imaging drum, applying toner to the thin dielectric film and laminating the thin dielectric film to a support medium.

Additionally in accordance with a preferred embodiment of the present invention, the applying toner process includes applying a liquid toner.

Further in accordance with a preferred embodiment of the present invention, the laminating process includes applying paper.

Further in accordance with a preferred embodiment of the present invention, the laminating process includes applying a transparency.

Still further in accordance with a preferred embodiment of the present invention, the laminating process encapsulates the pattern that is present on the thin dielectric film.

Further in accordance with a preferred embodiment of the present invention, the placing thin dielectric film process includes applying a transparent and glossy thin dielectric film.

Still further in accordance with a preferred embodiment of the present invention, the placing thin dielectric film process includes applying a transparent and hazy dielectric film.

In accordance with a preferred embodiment of the present invention, a method for digital color printing including the method of operating simultaneously in a synchronized manner, a plurality of image printing units, wherein each printing unit includes providing a digital input electrostatic imaging drum including a dielectric pattern receiving and retaining substrate, mounting a plurality of electrodes in the drum such that the electrodes underlie the pattern receiving and retaining dielectric substrate, applying voltage imagewise to the plurality of electrodes, operating a non-imagewise elongate ion source to apply a flow of charges to the dielectric substrate, thereby creating a latent image thereon, applying toner to the dielectric substrate, thereby producing a toned image according to the latent image, transferring the toned image to a substrate and providing a print medium transport unit.

Additionally in accordance with a preferred embodiment of the present invention, the image printing process includes arranging printing units to provide duplex printing.

There is thus provided in accordance with a preferred embodiment of the present invention, a method for producing a laminated print the method including operating a transparency printer to print onto a transparent substrate and laminating the transparent substrate to a second substrate.

Additionally in accordance with a preferred embodiment of the present invention, the printing process includes attaching the transparent substrate, image side down onto the second substrate.

Further in accordance with a preferred embodiment of the present invention, the second substrate attaching process includes attaching an opaque substrate.

Further in accordance with a preferred embodiment of the present invention, the second substrate attaching process includes attaching a substrate thinner than the second substrate.

Still further in accordance with a preferred embodiment of the present invention, the second substrate attaching process includes attaching a substrate approximately an order of magnitude thinner than the second substrate.

Further in accordance with a preferred embodiment of the present invention, the transparency printer includes providing a drum, mounting a transparent substrate assembly for mounting a transparent dielectric substrate onto the drum and developing an electrostatic image on the transparent dielectric substrate when mounted on the drum.

There is thus provided in accordance with a preferred embodiment of the present invention a method for printing including providing a drum, mounting a substrate assembly for mounting a dielectric substrate onto the drum and developing an electrostatic image on the dielectric substrate when mounted on the drum.

BRIEF DESCRIPTION OF THE DRAWINGS

The present invention will be understood and appreciated more fully from the following detailed description, taken in conjunction with the drawings in which:

FIGS. 3A and 3B are respective generalized and side view illustrations, taken along the line IVB—IVB, of apparatus for applying voltage and charges to opposite surfaces of a dielectric substrate in accordance with another embodiment of the present invention;

FIGS. 6A, 6B and 6C are illustrations of parameters for obtaining a continuum of gray levels by pixel size modulation in accordance with an embodiment of the present invention;

FIG. 8 is a graphical illustration of the intensity of an ion current measured by a current measuring device as a function of the relative displacement in a sweep direction between an alternating polarity charge source and the device in accordance with a preferred embodiment of the present invention;

DETAILED DESCRIPTION OF A PREFERRED EMBODIMENT

Figure 1A:
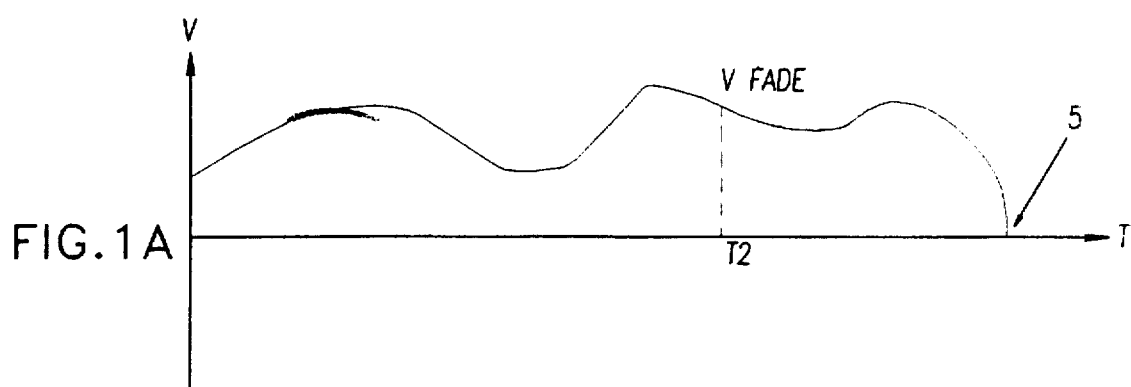
FIGS. 1A, 1B, 1C and 1D are illustrations of the application of voltage or charge on various surfaces over time in accordance with a preferred embodiment of the present invention.

Reference is now made to FIGS. 1A–1D, which illustrate the operation of the present invention. FIG. 1A illustrates an arbitrary voltage at a typical point location on a first surface of a dielectric substrate as it varies over time. The voltage may be applied to the typical point location by means of a conductive backing associated with the first surface of the dielectric substrate in touching or capacitive relationship therewith. The conductive backing may be a separate conductor in close proximity to, or alternatively a permanent coating or layer formed on, the first surface of the dielectric substrate.

Figure 1B:
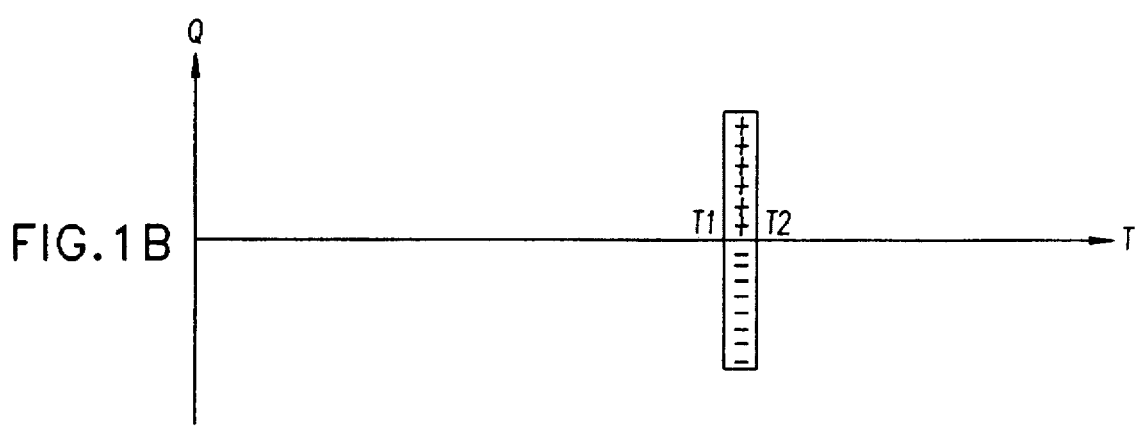

FIG. 1B illustrates, on the same time scale as in FIG. 1A, the application of a flow of charges to a second surface of the dielectric substrate, which is opposite to and generally uniformly spaced from the first surface, to temporarily neutralize the effect on the second surface of the voltage applied to the first surface. Following application of such charges the second surface retains a charge corresponding to the voltage which was applied to the first surface, at the time T2 that the application of such charges ceased, but of an opposite polarity thereto.

According to a preferred embodiment of the invention, the flow of charges comprises an alternating polarity charge flow to a second surface of the dielectric substrate which is opposite to and generally uniformly spaced from the first surface. It is preferred that the time variation of the voltage applied to any given location on the first surface be sufficiently small such that at least during an end portion of the duration of the alternating polarity charge flow at such location, the voltage variation is essentially zero.

The alternating polarity charge flow at each location is represented in FIG. 1B by a stack of positive and negative charges. The beginning and end of the duration of the application of the alternating polarity charge flow at each location are indicated in FIG. 1B respectively as T1 and T2.

Figure 1C:
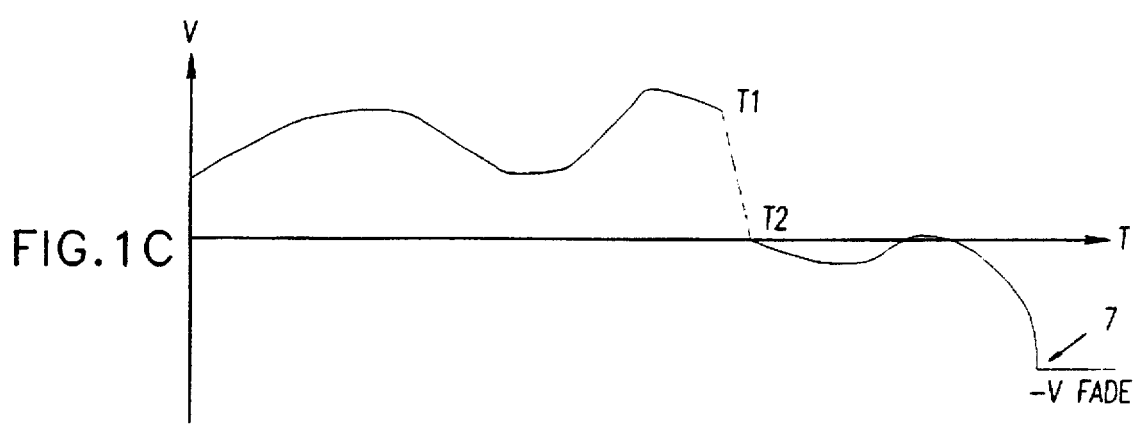

FIG. 1C illustrates the apparent surface voltage on the second surface of the dielectric substrate. It is noted that this voltage tracks the voltage on the first surface until the charge flow begins at time T1. Upon termination of the charge flow at time T2, the apparent surface voltage of the second surface is very nearly zero. If, thereafter, the voltage on the first surface is brought to zero, as indicated in FIG. 1A, the apparent surface voltage on the second surface becomes approximately the negative of the voltage on the first surface at time T2, due to charge retention on the second surface, as indicated in FIG. 1C.

Figure 1D:
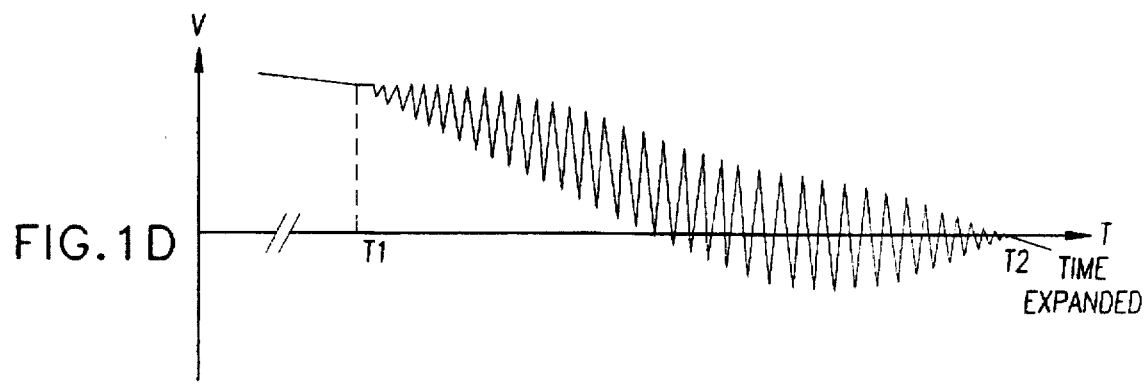

FIG. 1D is an expanded time scale illustration corresponding to FIG. 1C and illustrating with greater particularity the effect of one possible application of an alternating charge flow to the second surface, which results in a reduction in the apparent surface voltage on the second surface from the voltage at T1 to very nearly zero at T2.

Figure 2:
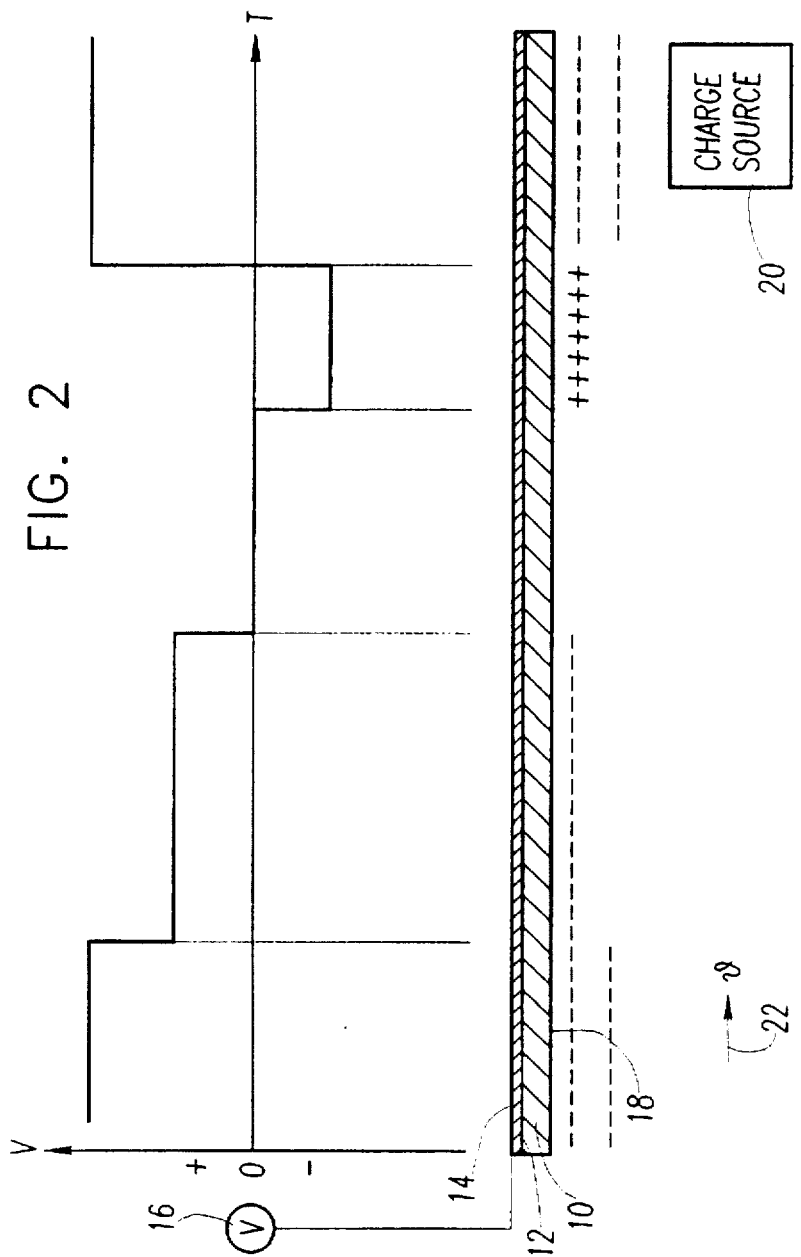
FIG. 2 is an illustration of a time varying voltage signal on a first surface of a dielectric substrate resulting in a corresponding charge pattern being retained on an opposite surface of the dielectric substrate in accordance with a preferred embodiment of the present invention.

Referring now to FIG. 2, there is shown schematically an arbitrary voltage signal provided on a dielectric substrate 10 at a first surface 12 thereof, which is preferably backed with a conductive backing 14 to which is coupled a time-variable voltage source 16. FIG. 2 also illustrates in one dimension, the corresponding spatial charge pattern, of opposite polarity to the corresponding voltage signal, which is retained on a second surface 18 of the dielectric substrate in accordance with the dynamic charge retention of the present invention, by application of a flow of charges to the second surface which is operative to temporarily neutralize the effect on the second surface of the voltage applied to the first surface 12. The application of the flow of charges is preferably provided by an alternating polarity charge source (APCS) 20, such as an AC corona, capable of achieving a spatial edge accuracy consistent with the desired resolution. Such an AC corona may be realized by employing one or more corona wires or needles enclosed within a shield having a defined charge outlet opening and having an amplitude modulated or constant AC voltage supplied to the corona wire or wires.

The charge source 20 is preferably moved at a velocity v along the second surface 18 of the dielectric substrate 10, indicated by an arrow 22.

Reference is now made to FIGS. 3A and 3B which illustrate apparatus for applying voltage and charges to opposite surfaces of a dielectric substrate 42 in accordance with another embodiment of the present invention.

In this embodiment, an elongate alternating polarity charge source (EAPCS) 46, such as that described above and being capable of achieving a spatial edge accuracy consistent with the desired resolution is scanned in one dimension, perpendicular to its longitudinal axis, along a second surface 48 of substrate 42, by means of a linear drive mechanism including a worm screw 50 cooperating with a screw rider 52, fixed to source 46. An electric motor 54 drives the worm screw 50 in response to the outputs of a commercially available synchronized driver 56. A host computer (not shown) provides positioning instructions via a multiplexer 58 to driver 56.

In this embodiment, a multisectional conductive backing layer 60, typically comprising a plurality of elongate electrodes 44, is associated with the first surface of the dielectric substrate 42. Each electrode 44 is provided with an information content modulated time varying voltage via a corresponding driver 62, in response to control signals received from the host computer via multiplexer 58.

It may be appreciated that in the embodiment of FIGS. 3A and 3B a charge pattern is written on the second surface by information content modulation of voltages applied simultaneously to the different regions of the first surface of the dielectric substrate 42 via electrodes 44 in synchronism with the one dimensional scanning motion of source 46.

It is appreciated that a desired two-dimensional spatial resolution may be achieved by adjusting appropriate parameters. In a first dimension, the parameters to be adjusted include the width of the elongate electrodes 44, the width of a gap 45 between adjacent electrodes 44, the thickness of the dielectric layer 42 and the dielectric constant of the dielectric layer 42. In a second dimension, the parameters include the edge definition of the EAPCS 46. The gaps 45 should be filled with electrically insulative dielectric material having high dielectric strength. Alternatively, gaps 45 may be filled with highly resistive material.

It is further appreciated that the dynamic charge retention techniques described hereinabove allow an uninterrupted line of uniform width as small as one pixel to be achieved. The advantages of these techniques include the replacement of dot pixels thus eliminating holes between pixels. Accordingly, intentional overlap of pixels is not necessary.

Multi-sectional conductive backing layer 60 may comprise a uniform conductive film from which a plurality of electrodes are created using an etching technique such as laser etching, chemical etching, or ion etching. Alternatively the multi-sectional conductive backing layer may comprise a grid comprising a weave of straight conductive wires in one dimension and insulating curved wires in a second dimension. This type of grid is available from Carbotex of Grutlistrasse 68, Zurich, Switzerland. Alternatively, the multi-sectional conductive backing layer 60 may be produced by electroforming techniques.

Figure 4A:
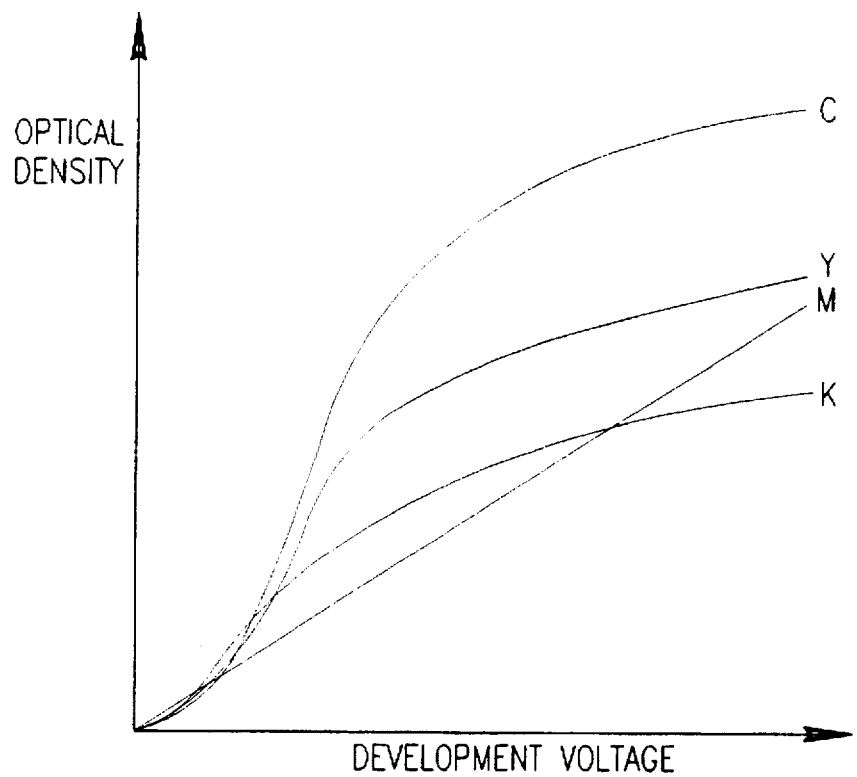
FIGS. 4A and 4B are respectively graphical and pictorial illustrations of the operational parameters of apparatus for continuous toning by optical density modulation in accordance with a preferred embodiment of the invention.
Figure 4B:
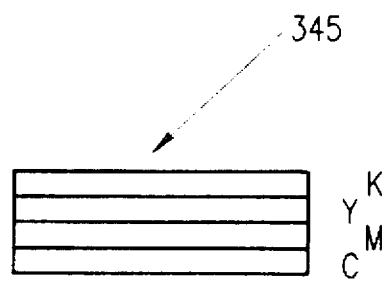

Reference is now made to FIGS. 4A and 4B which illustrate operational parameters for continuous toning apparatus in accordance with a preferred embodiment of the present invention.

It is appreciated that certain toners are characterized by the property that the optical density of a toned area can be controlled by the development voltage. Some liquid toners and certain dry toners are examples of this type of toner.

It is also appreciated that the dynamic charge retention techniques described hereinabove are capable of writing continuous voltage levels thus enabling the generation of one-pass monochrome toned images of continuous optical densities, when toners of the type described hereinabove are used.

In accordance with a preferred embodiment of the present invention, continuous color printing using standard subtractive colors and optical density modulation can be achieved in accordance with the dynamic charge retention writing techniques described herein and standard multi-pass printing techniques.

FIG. 4A graphically demonstrates hypothetical optical densities of four basic printing colors (CMYK) typically used with subtractive color printing systems as a function of the development voltage of each of the toner colors.

FIG. 4B illustrates a single area of a color print 345 to which four basic printing colors (CMYK) have been sequentially transferred in accordance with standard multi-pass printing techniques.

The specific optical density of each color across any area may be controlled by writing (in accordance with the writing techniques described hereinabove in association with FIGS. 3A and 3B) at the corresponding area a voltage level which corresponds to the desired optical density for that color.

It is appreciated that the subtractive combination of the optical densities of each of the four basic printing colors over an area results in a color having any of a continuum of color shades.

It is also appreciated that a color shade may be uniformly distributed within the borders of an entire area. Therefore, the specific color shade desired is achieved at the level of one pixel and not as a result of the combination of several pixels.

This embodiment offers continuous control over color levels providing high quality color prints.

Figure 5:
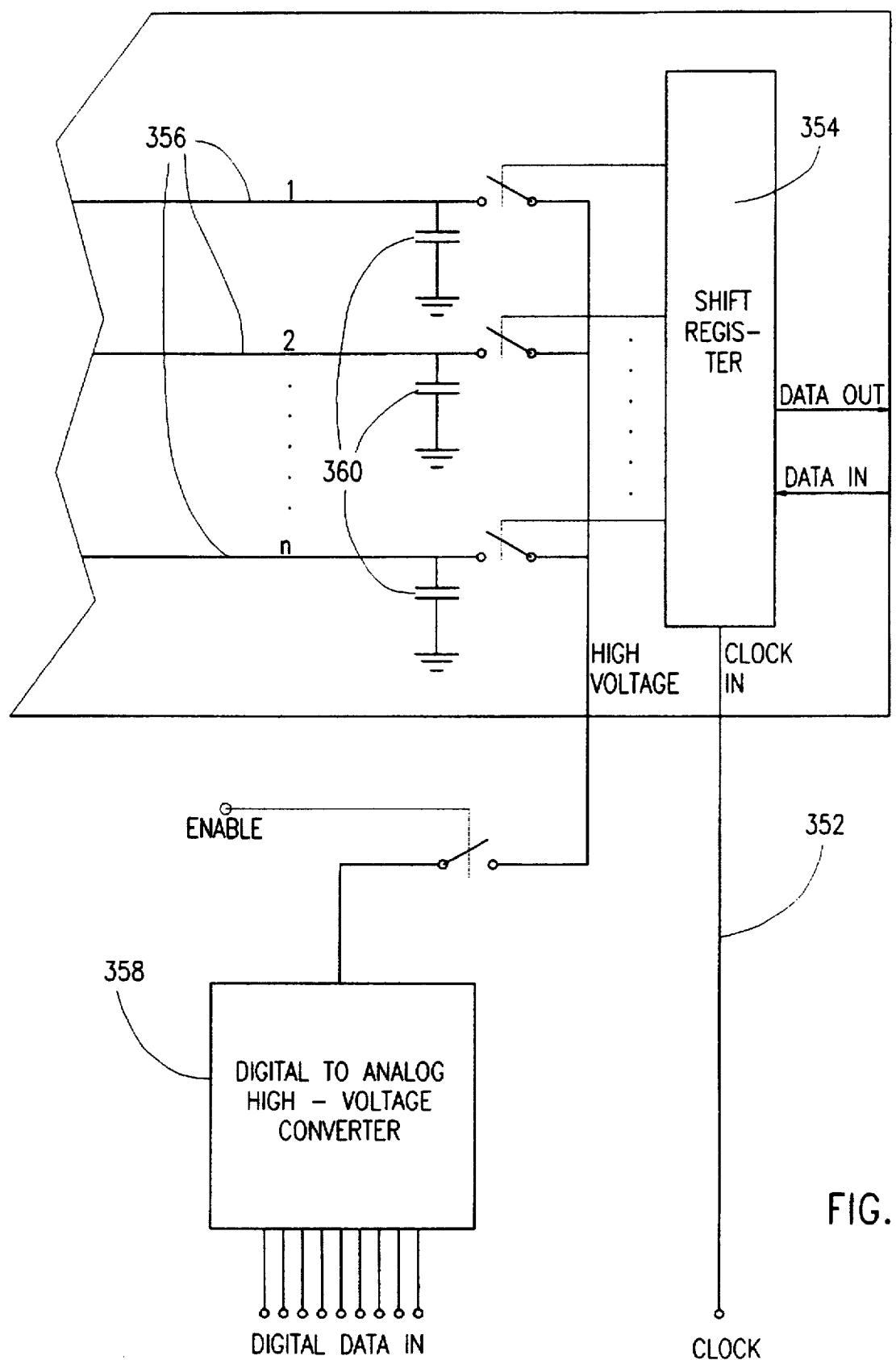
FIG. 5 is a schematic illustration of an alternate embodiment of the apparatus of FIGS. 3A and 3B.

Reference is now made to FIG. 5 which illustrates a schematic representation of imaging electronics for use in the apparatus of FIGS. 3A and 3B for writing continuous as well as half-tone levels.

A clock input 352 is pulsed in coordination with input data causing a shift register 354 to sequentially address each of a plurality of conductive electrodes 356. The conductive electrodes 356 may correspond to conductive electrodes 44 in FIGS. 3A and 3B. The electrode being addressed at any given time receives a voltage level from imaging electronics 358 and is charged to that voltage level. Typically, imaging electronics 358 comprises a digital to analog high voltage converter.

Associated with each electrode 356 is a capacitor 360 which retains the given voltage level until the electrode is subsequently addressed and receives a new voltage level.

It is appreciated that the dynamic charge retention techniques of the present invention allow charges of either polarity to be written to the substrate. It is further appreciated that one individual charge pattern can contain charges of both polarities. The number of voltage levels achievable in accordance with this embodiment is not dependent on the print head. Instead, the number of voltage levels is determined by the imaging electronics 358.

Reference is now made to FIGS. 6A–6C which illustrate a method for obtaining a continuum of monochrome gray levels by providing pixel size modulation in accordance with an embodiment of the present invention.

FIG. 6A graphically represents monochromatic gray levels that can be achieved over an area as a function of the fractions of each of the pixels comprising that area that are toned. Pixels are charged and toned in accordance with the writing techniques described hereinabove, particularly with reference to FIGS. 3A and 3B, and standard toning techniques.

The dimension of a pixel in the direction of the sweep of the charge source may be represented by L. The dimension of a pixel in the second direction is determined by the width of the conductive electrode associated with that pixel. (a/L) is the toning fraction, where a is a function of the velocity of the charge source multiplied by the effective time duration during which the bias voltage on the conductive electrode changes during the writing of a single pixel.

Curve 470 illustrates one possible representation of gray levels that can be achieved by controlling the toning fraction of each pixel. In this representation, the voltage biasing the conductive electrode is zero at the beginning and end of a sweep of the pixel by a charge source. During the sweep, the voltage biasing the conductive electrode is raised to a high level for a time duration determined by the desired toning fraction.

Curve 472 illustrates an alternate representation of gray levels that can be achieved by controlling the toning fraction of each pixel. In this representation, the voltage biasing the conductive electrode is at a high level at the beginning and end of a sweep of the pixel by a charge source. During the sweep, the voltage biasing the conductive electrode is reduced to zero for a time duration in accordance with the desired toning fraction.

It is appreciated that a continuum of monochrome gray scales may be achieved for an area by selecting the appropriate voltages for the beginning and end of the sweep of each of the pixel locations comprising that area (following curve 470 or curve 472 depending upon the desired grey level).

FIGS. 6B and 6C illustrate close-up views of the fractionally toned image of the pixels of two adjacent conductive electrodes (not shown) where the pixels of one electrode have been phase shifted with respect to the pixels of the second electrode.

Two different gray scales are shown (FIG. 6B and FIG. 6C).

It is appreciated that the phase shift with respect to adjacent electrodes enabled by pixel size modulation techniques described hereinabove allows half tone gray scales with high spatial frequency of pixel arrangements to be achieved.

It is further appreciated that continuous color shades, via half tone, can be achieved using pixel size modulation techniques to vary the toning fraction of each pixel during each of four monochrome passes carried out during standard multi-pass subtractive color printing.

It is appreciated that the dynamic charge retention techniques described hereinabove, particularly with reference to FIGS. 3A and 3B, provide a method for generating a charge pattern that contains charges of both polarities. It is understood that there exist toners which develop positive charge images and similarly there are other toners which develop negative charge images.

Therefore by using two different color toners which develop opposite polarity charge images, a two-color image may be produced in a single pass. The two-color image may contain any of a continuum of shades of the two colors, in accordance with the techniques for continuous toning described hereinabove, or alternatively, in accordance with the techniques for pixel size modulation half-tones described hereinabove. One possible application for this technique is in the generation of "highlight" images.

Figure 7A:
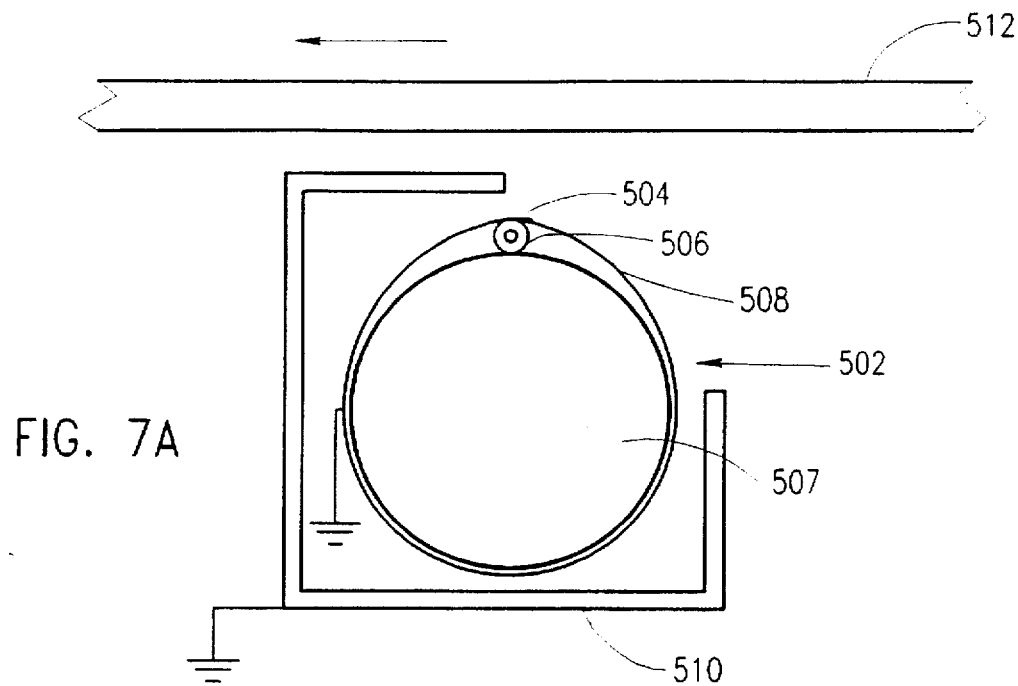
FIGS. 7A and 7B are pictorial illustrations of side and top views, respectively, of an alternative embodiment of an alternating polarity charge source providing a charge flow having at least one defined edge.
Figure 7B:
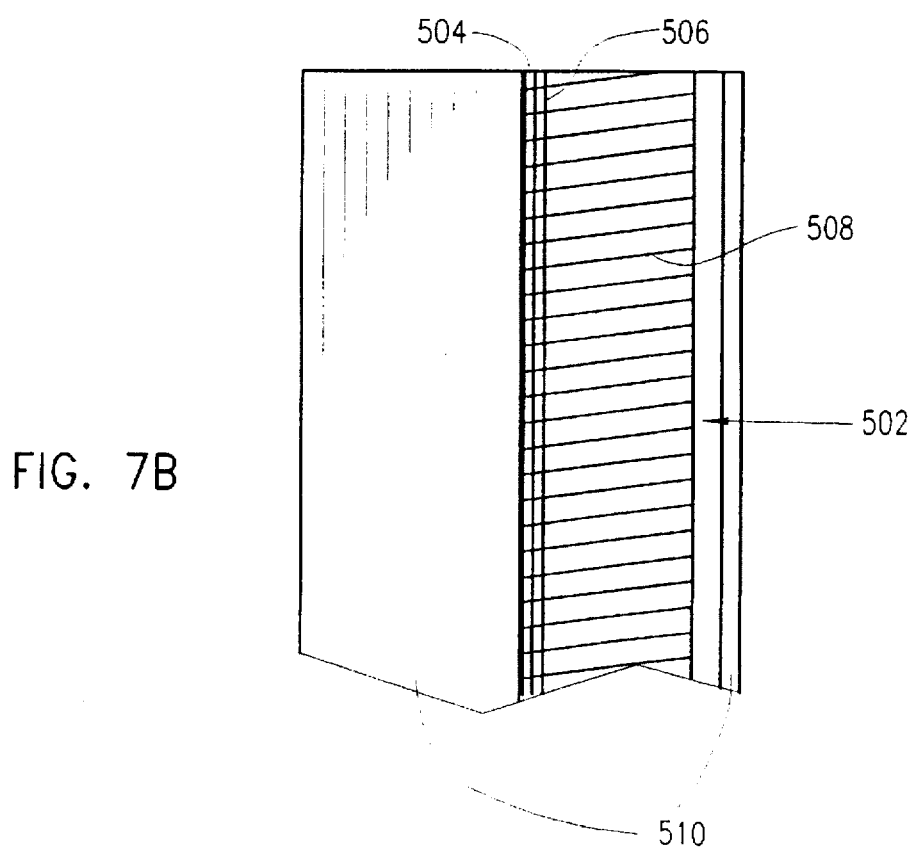

Reference is now made to FIGS. 7A-7B which are pictorial illustrations of side and top views, respectively, of an alternating polarity charge source providing a charge flow having at least one defined edge in accordance with an embodiment of the present invention.

Alternating polarity charge pool apparatus 502 comprises a non-imagewise source of ions. Apparatus 502 may also comprise an elongate conductor 504 coated with a dielectric layer 506 and a transversely oriented screen electrode 508 contacting or closely spaced from the dielectric-coated conductor and coiled about an inner dielectric support structure 507 as described in U.S. Pat. No. 4,409,604 assigned to Dennison Manufacturing Company of Framingham, Mass., USA Typically, inner dielectric support structure 507 is rod shaped. Alternately, inner dielectric support structure 507 may be of any suitable shape such as that illustrated in FIG. 7C below.

In accordance with a particular configuration of apparatus 502, transversely oriented screen electrode 508 is coiled around elongate conductor 504. When apparatus 502 is operational, a pool of positive and negative ions is continuously generated in the air space immediately surrounding the dielectric-coated conductor 504 at the regions in between the locations where the coiled conductor crosses over the dielectric-coated conductor.

An elongate electrostatic shield 510, typically comprising a conductive material, may be configured as illustrated to partially enclose charge pool apparatus 502.

It is appreciated that the charge source of FIGS. 7A-7B is capable of providing an ion beam with at least one edge sharply defined. It is appreciated that charge pool apparatus 502 alone does not provide an elongate ion beam with a sharply defined edge.

It is further appreciated that charge pool apparatus 502 may serve as an elongate alternating polarity charge (EAPCS) source described hereinabove in accordance with dynamic charge retention techniques described hereinabove. This configuration is presented to offer an example of possible configurations for the EAPCS and is not intended to be limiting.

Typically, elongate conductor 504 receives high AC voltage typically about 2000V pp and having a frequency in the range between several hundred kHz to several MHz. It is appreciated that the high AC voltage may be supplied continuously or alternately may be supplied in bursts.

Typically, elongate electrostatic shield 510 and transversely oriented screen electrode 508 are grounded and the dominant force in charge extraction is the ASV. As the ASV decreases, charge extraction is reduced accordingly until neutralization of the ASV. In this embodiment, amplitude modulation is not required.

According to an alternative embodiment, an elongate grounded shield generally enclosing charge pool apparatus 502, except for an elongate opening, may be used to provide an ion beam with two defined edges.

A dielectric surface 512, typically of the type described hereinabove particularly in accordance with FIGS. 3A-3B, sweeps relative to the charge source. Preferably, the gap between dielectric surface 512 and shield 510 is about 100-300 microns. Typically, dielectric surface 512 comprises a plurality of regions each having associated therewith an apparent surface voltage (ASV). During the sweep, these regions of the dielectric surface are brought into their maximum propinquity with the charge pool. The ASV of each region creates an electric field between dielectric substrate 512 and the charge pool.

Electrostatic shield 510 serves to tailor the electric field created. The ASV at regions on the dielectric substrate which have direct unshielded access to the charge pool causes ions of the appropriate polarity to be extracted until the ASV at that region is neutralized. The ASV at regions on dielectric substrate 512 which are shielded from the charge pool are not involved in ion extraction. When a region on the dielectric surface is in a location which is not shielded from the charge pool, the region may accumulate charges in accordance with the techniques described hereinabove. When the region is moved to a shielded location, additional charge will not accumulate on that region.

Alternately, amplitude modulation techniques as described herein, particularly with reference to FIG. 1D, may be used. In accordance with this embodiment, elongate electrostatic shield 510 and transversely oriented screen electrode 508 are not grounded. Instead they receive a phase shifted high amplitude modulated AC voltage at the same frequency as the voltage applied to elongate conductor 504. The amplitude of the voltage is on the same order of magnitude as the maximum ASV. Charge extraction is a combined function of the ASV and the amplitude modulated voltage. The phase shift, between the amplitude modulation voltage and the voltage supplied to elongate conductor 504, determines the efficiency of charge extraction from the charge pool by the amplitude modulated voltage. This provides the advantage of accelerated neutralization of the ASV. As the ASV is neutralized, the amplitude of the modulated voltage is gradually decreased to zero, so that the final charge level retained corresponds only to the ASV that was present on the dielectric substrate 512 prior to activation of the charge pool apparatus 502. It is appreciated that amplitude modulation techniques may be used in accordance with any of the embodiments of FIGS. 7A–11A.

It is appreciated that the extracted ions typically form a beam with at least one sharply defined edge. In accordance with the techniques described in accordance with this embodiment of the invention, preconditioning of the dielectric surface to be charged is not necessary. Therefore, the width of the charge beam is not significant as long as one edge is sharply defined. It is also appreciated that charges from the opposite, undefined edge of the ion beam do not affect the final amount of charge that is retained at a region. When the region moves past the sharply defined edge, the appropriate amount of negative or positive charges is retained to balance the effect of the conductive backing potential regardless of any stray charges that may have accumulated at that region from the opposite, undefined edge. The edge resolution achievable in the direction of the sweep may be a function of the intensity of the ion beam and the sharpness of the beam edge.

Figure 7C:
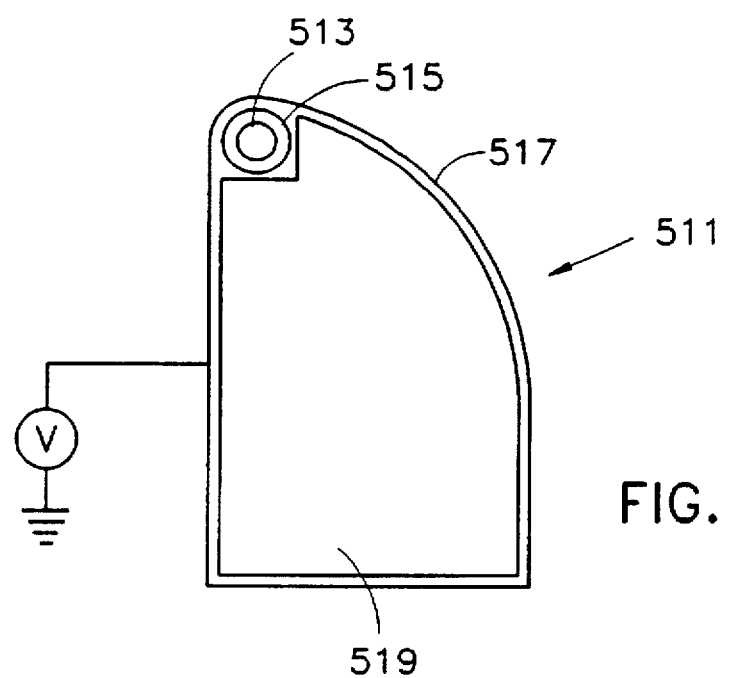
FIG. 7C is an alternative embodiment of the alternating polarity charge pool apparatus of FIG. 7A.

Reference is now made to FIG. 7C which is a pictorial illustration of a side view of an alternative embodiment of alternating polarity charge pool apparatus 502 of FIG. 7A in accordance with an alternative embodiment of the present invention.

Alternating polarity charge pool apparatus 511, comprises a non-imagewise source of ions. Apparatus 511 may also comprise an elongate conductor 513 coated with a dielectric layer 515 and a transversely oriented screen electrode 517 contacting or closely spaced from the dielectric-coated conductor and coiled about an inner dielectric support structure 519 as described in U.S. Pat. No. 4,409,604 assigned to Dennison Manufacturing Company of Framingham, Mass., USA In the embodiment of apparatus 511 of FIG. 7C inner dielectric support structure 519 corresponds to inner dielectric support structure 507 of FIG. 7A. However, the shape of inner dielectric support structure 519 provides greater exposure of elongate conductor 513 to screen electrode 517 providing increased ion generation without compromising the mechanical strength of alternating polarity charge pool apparatus 502.

Reference is now made to FIG. 8 which is a graphical illustration of the intensity of an ion current measured by a current measuring device as a function of the relative displacement in a sweep direction between an alternating polarity charge source and the device in accordance with a preferred embodiment of the present invention;

For the measurements illustrated herein, a conductive current probe with a constant bias voltage of 400V (providing an ASV of 400V) was used to monitor the steady-state ion beam.

Curve 520 illustrates a typical ion beam profile for the case where apparatus 502 (FIGS. 7A and 7B above) does not comprise an electrostatic shield.

Curve 522 illustrates a typical ion beam profile for the case where apparatus 502 (FIGS. 7A and 7B above) comprises an electrostatic shield, typically of the type described hereinabove and indicated by reference number 510.

The two sets of measurements were carried out under the same conditions. In particular, the distance between the probe and the charge pool remained unchanged. Curve 522 illustrates the region in which the beam has a sharp edge. The shaded area represents the uncertainty of the measurement due to the accuracy of the measuring device. The edge of the ion beam (illustrated by curve 522) using the shield apparatus is sharply defined. By contrast the edge of the ion beam (illustrated by curve 520) in the non-shielded apparatus is not sharply defined.

It is appreciated that curves 520 and 522 illustrate ion beams under static conditions where the ASV does not change. Under dynamic conditions, when the ASV changes with time, the ion beam of the unshielded apparatus may exhibit a high degree of blooming. It is appreciated that under the same dynamic conditions, the ion beam of the shielded apparatus will not exhibit such blooming at the edge.

Figure 9A:
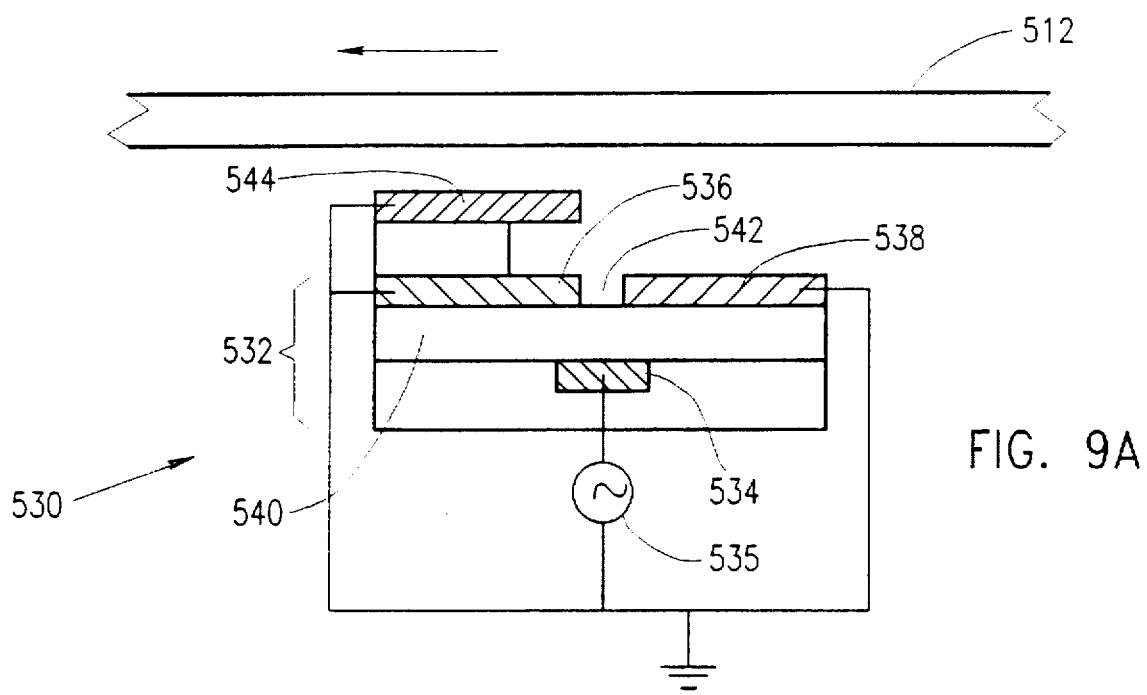
FIGS. 9A and 9B are pictorial side and top view illustrations respectively, of a further alternating polarity charge source providing a charge flow having at least one defined edge.
Figure 9B:
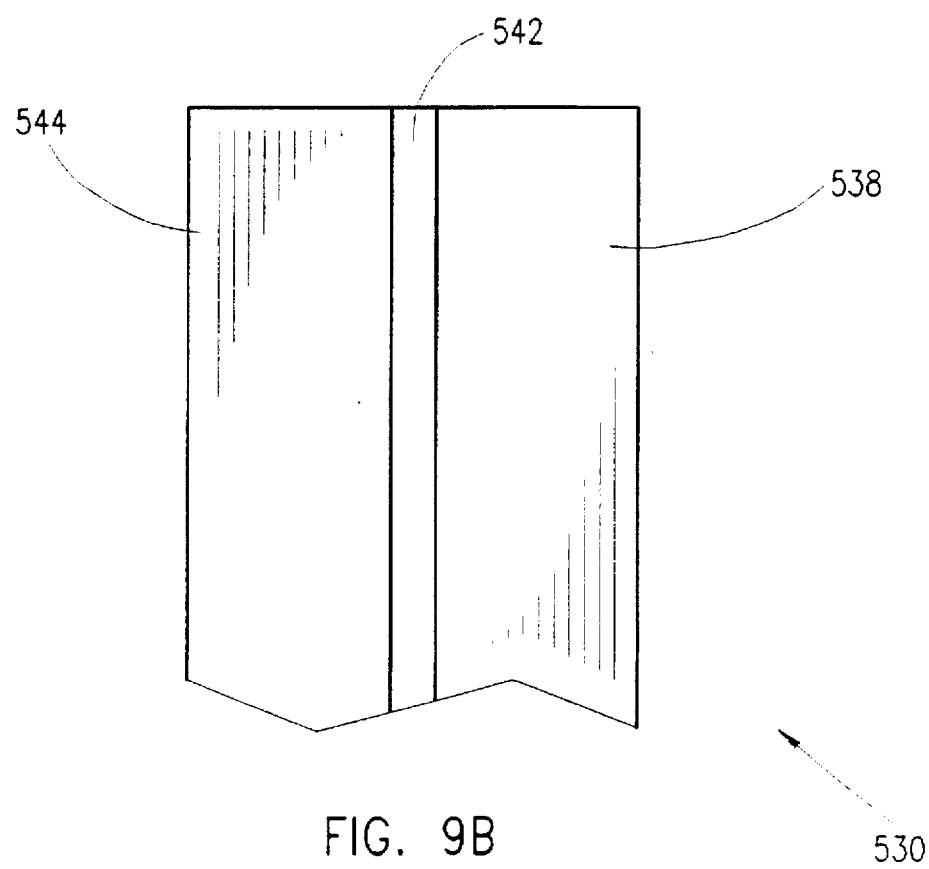

Reference is now made to FIGS. 9A–9B which are pictorial respective side and top view illustrations of apparatus 530 for providing an alternating polarity charge source having at least one defined edge.

Apparatus 530 comprises alternating polarity charge pool apparatus 532 which includes a non-imagewise source of ions, comprising a high voltage electrode 534 coupled to a high voltage AC source 535 and two typically grounded screen electrodes 536 and 538. Alternately screen electrodes 536 and 538 may receive an amplitude modulated voltage in accordance with the techniques described herein.

Screen electrodes 536 and 538 are separated from high voltage electrode 534 by a dielectric layer 540. A space 542 is defined between screen electrodes 536 and 538, providing a slot in which an ion pool may be generated. Alternatively screen electrodes 536 and 538 may be replaced by a single slotted electrode. The electrode arrangement may be as described in U.S. Pat. No. 4,155,093 assigned to Dennison Manufacturing Company of Framingham, Mass., USA.

It is appreciated that alternating polarity charge pool apparatus 532 does not itself provide an elongate ion beam with a sharply defined edge.

In order to achieve an ion beam which has at least one edge defined in accordance with the techniques described hereinabove particularly with respect to FIGS. 7A–7C, apparatus 530 further comprises an elongate electrostatic shield 544. Shield 544, typically comprising a preferably conductive material, is located with some spacing relative to charge pool apparatus 532. Typically shield 544 is grounded. Alternately, shield 544 may receive an amplitude modulated voltage in accordance with the techniques described herein. Electrostatic shield 544 may be configured as illustrated whereby charge pool apparatus 532 is partially obscured by shield 544.

It is appreciated that apparatus 530 may serve as an elongate alternating polarity charge source in the dynamic charge retention techniques described hereinabove. It is noted that the configuration presented here is a further example of a possible configuration for the charge source and is not intended to be limiting.

Figure 10A:
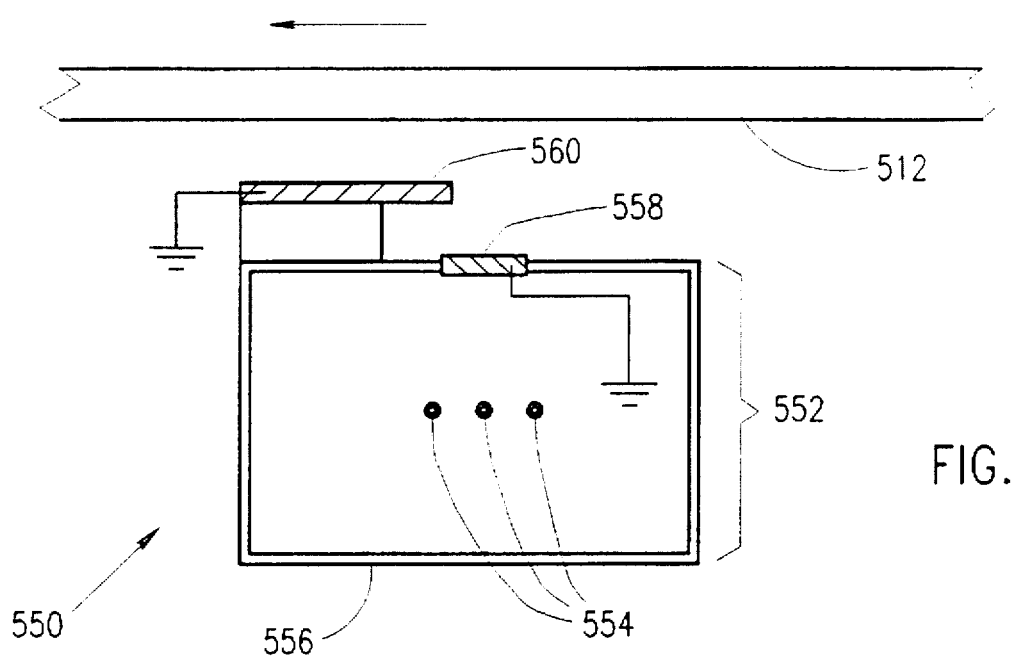
FIGS. 10A and 10B are pictorial side and top illustrations of an alternative embodiment of an alternating polarity charge source providing a charge flow having at least one defined edge in accordance with the present invention.
Figure 10B:
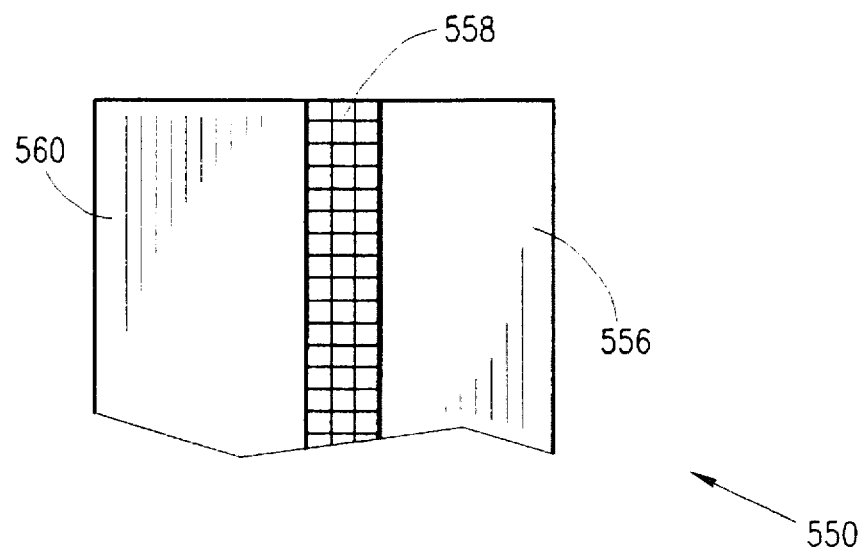

Reference is now made to FIGS. 10A and 10B which are pictorial illustrations of apparatus 550 for providing an alternating polarity charge flow having at least one defined edge.

Apparatus 550 comprises alternating charge pool generating apparatus 552, a casing 556 and an elongate electrostatic shield 560. Apparatus 552 preferably comprises one or more corona wires 554 some or all of which may be dielectrically coated. Alternatively, corona wires 554 may not be dielectrically coated. Each corona wire 554 is operative to receive a high AC voltage. All of the wires 554 may be biased by the same AC source (not shown). Alternatively, corona wires 554 may be biased by AC sources having different amplitudes. Each corona wire 554 may receive a different AC voltage.

Corona wires 554 are confined by an isolating casing 556, typically formed of a dielectric material. Casing 556 typically contains an elongate screen electrode 558 which is partially open and wherein an ion pool is created. Screen electrode 558 and electrostatic shield 560 are typically grounded. Alternately, when using amplitude modulation techniques as described herein, screen electrode 558 and electrostatic shield 560 receive a high amplitude modulated AC voltage.

The open area of screen 558 may comprise a gridlike area as shown. Alternatively, the open area may comprise at least one elongate slot.

According to an alternate embodiment of apparatus 552, casing 556 may further comprise an inlet through which conditioned air may flow onto corona wires 554. In this embodiment, the intensity of the ion pool created at screen 558 may be increased.

In order to achieve an ion beam which has at least one edge as described hereinabove particularly with reference to FIGS. 7A–7B, elongate electrostatic shield 560 typically comprising a grounded conductive material, is spaced relative to charge pool apparatus 552. Electrostatic shield 560 may be configured as illustrated so that charge pool apparatus 552 is partially obscured.

It is appreciated that apparatus 550 may serve as an elongate alternating polarity charge (EAPCS) source described hereinabove in accordance with the dynamic charge retention techniques described hereinabove. This configuration is an example of a possible configuration for the EAPCS and is not intended to be limiting.

Figure 11A:
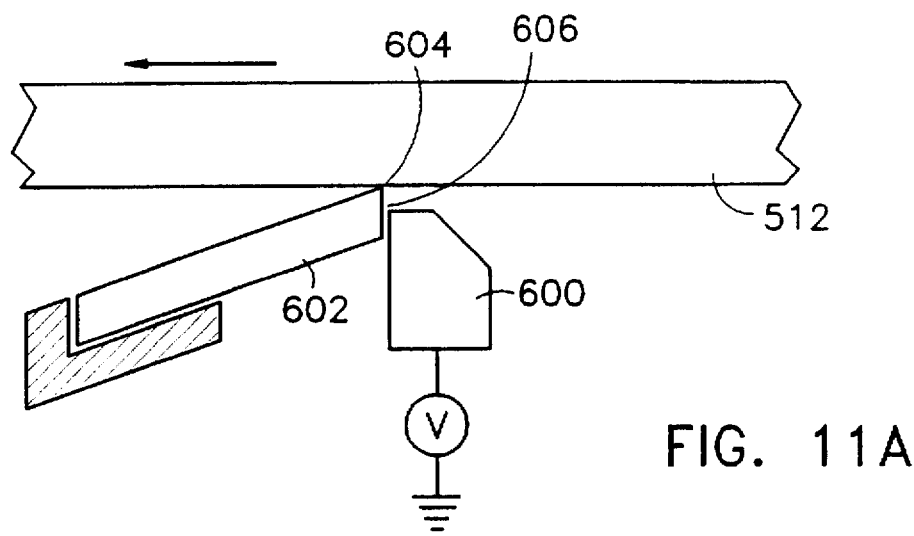
FIG. 11A is a pictorial illustration of a side view of apparatus for providing an alternating polarity charge flow having at least one defined edge in accordance with a further embodiment of the present invention.

Reference is now made to FIG. 11A which is a pictorial illustration of a side view of apparatus for providing an alternating polarity charge flow having at least one defined edge in accordance with a further embodiment of the present invention.

Apparatus 598 comprises alternating charge pool apparatus 600 and dielectric blade 602 with elongate edge 604.

Alternating polarity charge pool apparatus 600 may be of the type described hereinabove with reference to FIGS. 7A–10B, in particular with reference to FIG. 7C.

A dielectric surface 512, typically of the type described hereinabove particularly in accordance with FIGS. 3A–3B, sweeps relative to alternating polarity charge flow apparatus 598. Preferably, dielectric blade 602 is placed in contacting proximity of dielectric surface 512. It is appreciated that dielectric blade 602 serves as an electrostatic shield.

Typically, dielectric surface 512 comprises a plurality of regions each having associated therewith an apparent surface voltage (ASV). During the sweep, these regions of the dielectric surface are brought into their maximum propinquity with charge pool 606.

When the screen electrode (not shown) of alternating charge pool apparatus 600 is grounded, as described hereinabove, with reference to FIGS. 7A–10B, the ASV of each region creates an electric field between dielectric substrate 512 and charge pool 606 causing ions to be extracted and deposited on the dielectric substrate 512, neutralizing the ASV.

Alternately, modified amplitude modulation techniques, with its associated benefits, may be used, whereby a high amplitude modulated AC voltage is applied to the screen electrode (not shown) of alternating charge pool apparatus 600.

After an area of dielectric substrate 512 has swept over edge 604 of elongate dielectric blade 602, additional charge will not reach that area due to the physical barrier created by contact between elongate edge 604 of blade 602 and dielectric surface 512. Thus, the density of retained charge on a given region corresponds to the ASV of that region as dielectric substrate 512 sweeps over edge 604.

Dielectric blade 602 is typically made from an elastomeric dielectric material. The precise material is selected so as to be free of triboelectricity when brought into contact with dielectric surface 512, in order to prevent interference with charge retained on dielectric substrate 512.

It is further appreciated that apparatus 598 may serve as an elongate alternating polarity charge (EAPCS) source described hereinabove in accordance with dynamic charge retention techniques described hereinabove. This configuration is presented to offer an example of possible configurations for the EAPCS and is not intended to be limiting.

Figure 11B:
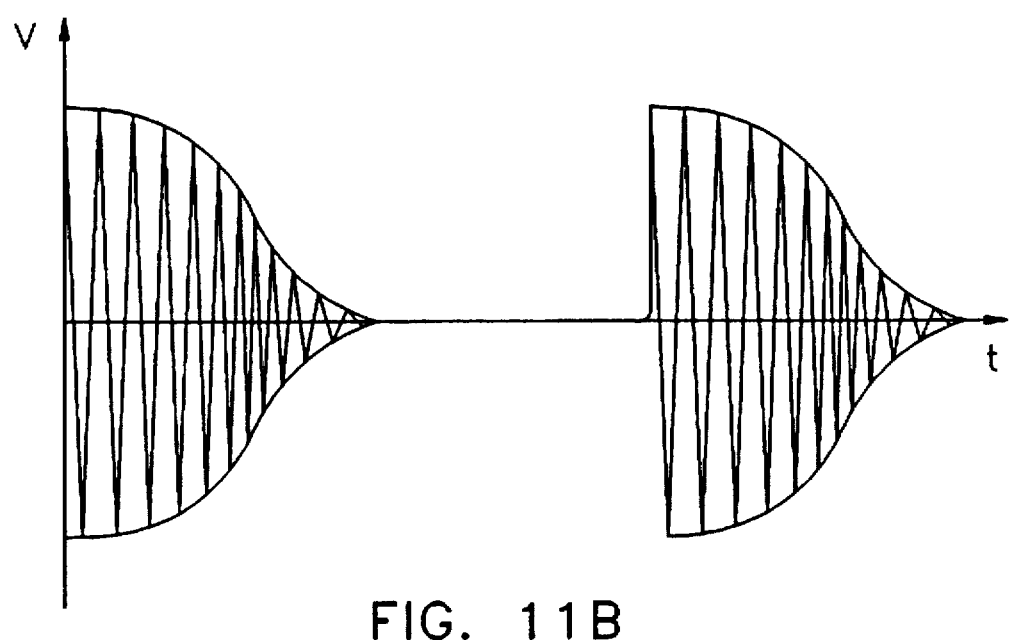
FIG. 11B is an illustration of the amplitude modulation of voltage applied to apparatus for providing an alternating polarity charge flow over time in accordance with a preferred embodiment of the present invention.

Reference is now made to FIG. 11B which shows, as a function of time, the amplitude modulated AC voltage applied to the screen electrode (not shown) of apparatus 600 of FIG. 11A, in accordance with the amplitude modulation techniques described herein.

Figure 12A:
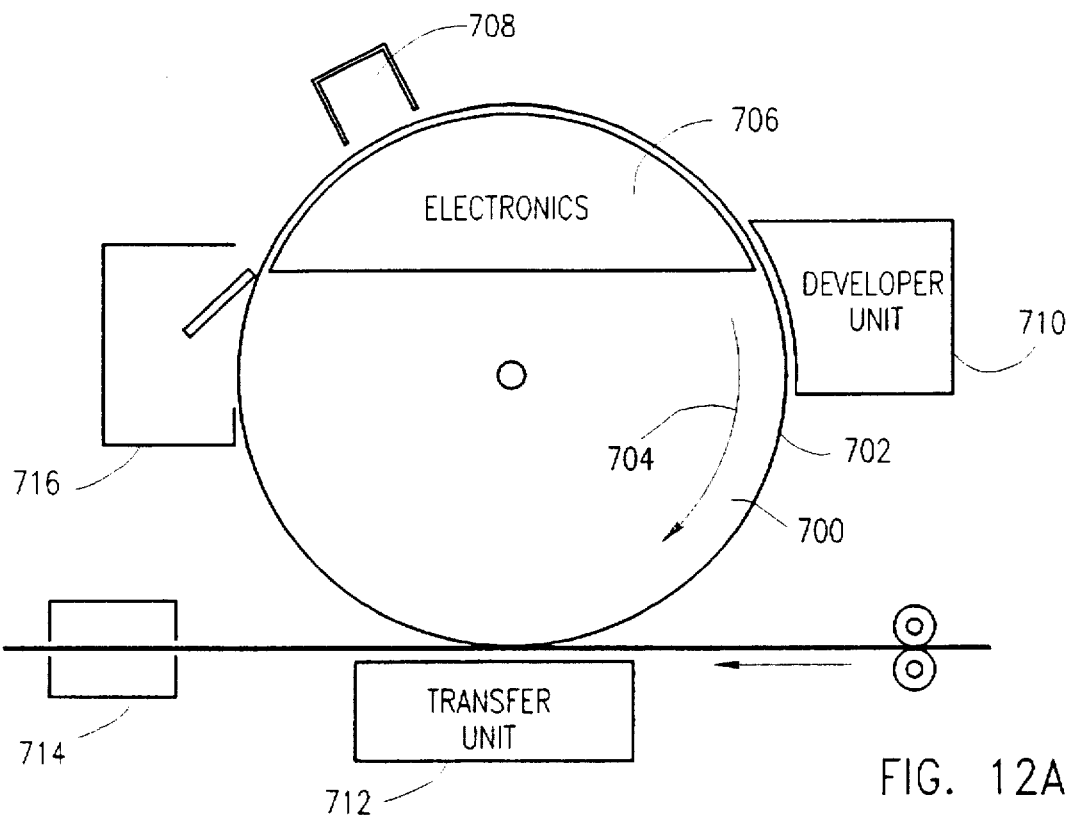
FIG. 12A is a simplified illustration of printing apparatus constructed and operative in accordance with another preferred embodiment of the present invention.
Figure 12B:
FIGS. 12B and 12C are signal diagrams illustrating electrical signals produced by the apparatus of FIGS. 3A and 3B.
Figure 12C:
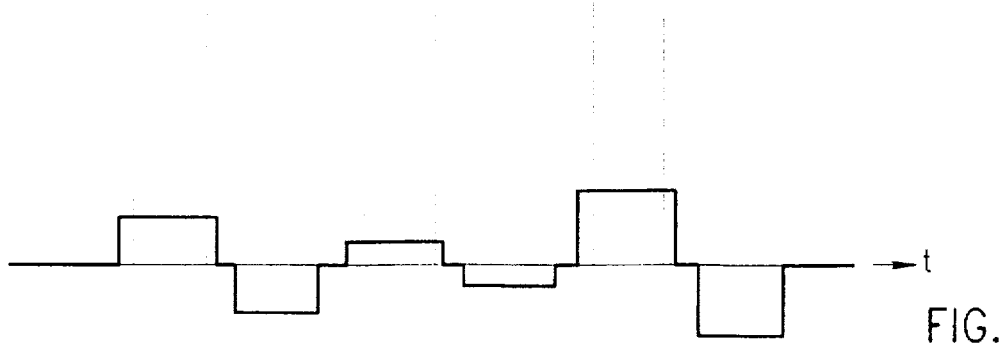

Reference is now made to FIGS. 12A–12C which illustrate a system for writing and developing electrostatic images in accordance with another embodiment of the present invention. The illustrated embodiment employs a drum 700 having a dielectric layer 702 on its outer surface, which is rotated in a direction indicated by arrow 704.

A plurality of conducting electrodes (not shown) are embedded in the dielectric layer 702 and extend over the periphery of the outer surface of the drum. Electronic circuitry 706 may be mounted interiorly of the outer surface of the drum and of layer 702, whereby each electrode may be connected to a driver forming part of the circuitry 706.

Associated with drum 700 and more particularly with dielectric layer 702 is a charge source 708, preferably of the type shown in any of FIGS. 7A–11A. A magnetic brush developer unit 710 and a cleaning unit 716 are operatively associated with drum 700 in a conventional manner.

The apparatus of FIGS. 12A–12C is particularly characterized in that charge image generation and developing may take place simultaneously at different regions of the drum. This is achieved by operating the charge source 708 discontinuously, in a series of bursts, as indicated in FIG. 12B.

During each burst of the operation of charge source 708, all of the electrodes embedded in dielectric layer 702 receive appropriate voltages representing a single raster line of an image to be printed. Immediately following operation of the charge source 708, i.e. in between the bursts shown in FIG. 12B, the drivers in circuitry 706 supply to each such electrode a voltage which is equal and opposite to the voltage applied thereto during the operation of charge source 708.

FIG. 12C shows the voltage on a given electrode both during the bursts of operation of the charge source 708 and in between the bursts, in response to operation of the drivers in circuitry 706.

The result of these operations is that in each electrode, an electrical signal is generated which is composed of high Fourier frequency components and a zero DC component. The elimination of the DC component eliminates spurious operation of the magnetic brush developer unit 710 which would otherwise occur.

It is further noted that when the developer unit 710 employs dual-component toners the high Fourier frequency components in the signal also do not result in spurious toner deposition by the developer unit 710.

In this way, the signals present on the electrodes during development by developer unit 710 do not interfere with the desired development of the latent image on the dielectric layer 702, but operate only for desired latent image generation.

The toned image produced by developer unit 710 is transferred to an output substrate, typically paper, by a transfer unit 712 and fixed to the output substrate by a fixing unit 714 using standard toner fixing techniques. Any residual toner on the outer surface of the drum 700 is removed by the cleaning unit 716 using standard techniques.

Figure 13A:
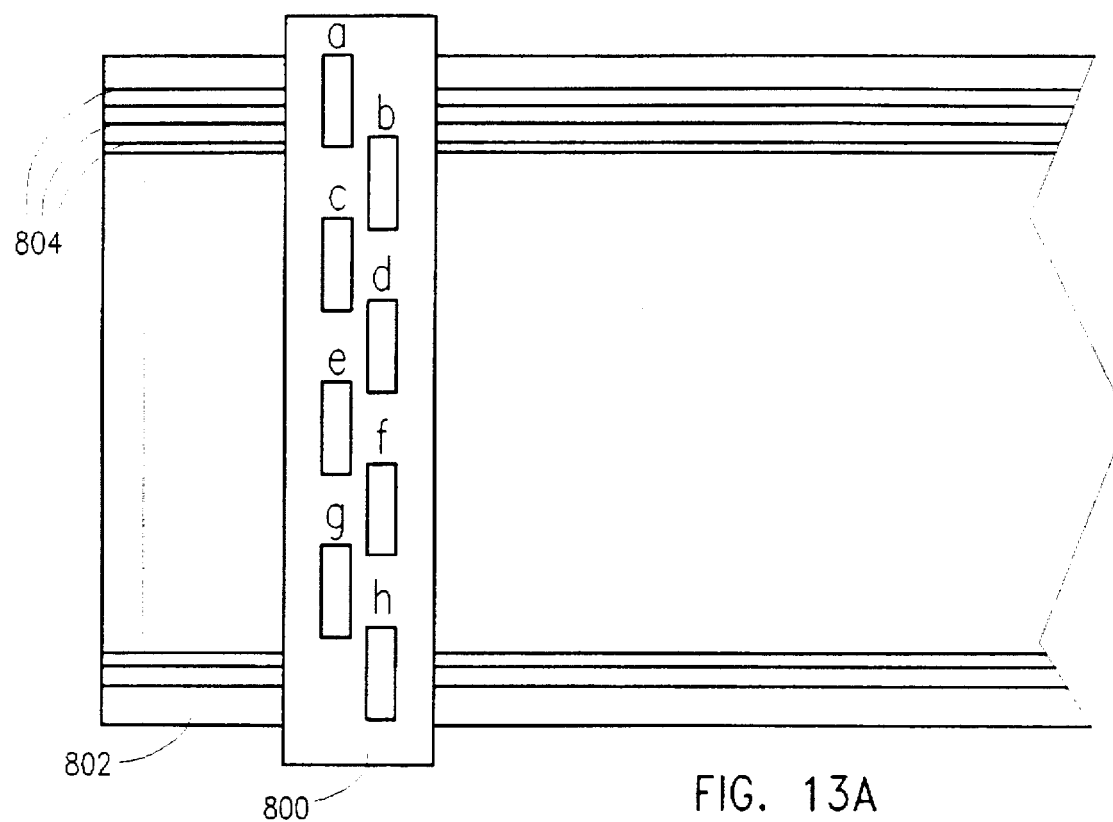
FIG. 13A is a simplified illustration of printing apparatus constructed and operative in accordance with another preferred embodiment of the present invention.
Figure 13B:
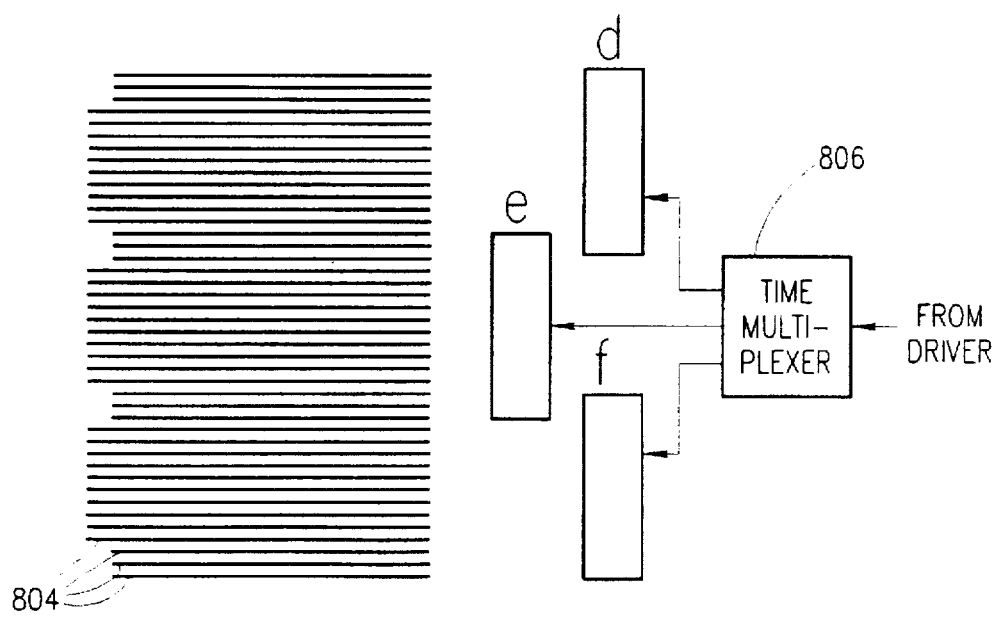
FIG. 13B is an illustration of the operation of the apparatus of FIG. 13A.

Reference is now made to FIGS. 13A and 13B which illustrate a system for writing electrostatic images in accordance with yet another embodiment of the present invention. The illustrated embodiment employs time multiplexing of the output of a limited number of drivers to a plurality of different arrays of individual charge sources, such as shown in FIGS. 3A and 3B.

As seen in FIGS. 13A and 13B, a charge source array assembly 800 includes a plurality of individual charge sources, which are indicated by the letters a–h and are seen to be arranged in staggered, mutually partially overlapping relationship with a substrate 802 bearing a plurality of electrodes 804. The individual charge sources receive signal inputs from a time multiplexer 806 which in turn receives signal inputs from drivers (not shown). The individual charge sources a –h may be of the type illustrated in any of FIGS. 7A–11A.

In accordance with this embodiment, electrodes 804 may be connected in primary groups which are then subdivided into secondary groups. The number of primary groups is a function of the number of charge source line arrays in charge source array assembly 800. For example, in FIG. 13A, two charge source line arrays are shown, so two primary groups of electrodes 804 may be used.

The secondary grouping of each primary group of electrodes 804 corresponds to the number of individual charge sources making up a single line array. For example, in FIG. 13A, there are four individual charge sources per line array, therefore each primary group of electrodes 804 is subdivided into four secondary groups. It is appreciated that the electrodes 804 from each secondary group in a primary group are connected in parallel to a shared set of high voltage imaging electronics. By connecting electrodes 804 in secondary groups, the number of outputs from, and therefore the volume of, high voltage imaging electronics is reduced.

Electrostatic charge patterns are written by sequentially activating each charge source of a first line array of charge source array assembly 800. During activation of a charge source, voltage information is supplied to electrodes 804 located beneath the active charge source. Voltage signals supplied to each electrode 804 are also supplied to all other electrodes 804 in the same subgroup. However, only electrodes 804 underlying the active charge source will retain charge in accordance with the dynamic charge retention techniques described herein.

Charge sources in a single array are sequentially activated to write a charge image over the dielectric substrate associated with electrodes 804 of an entire primary group. When substrate 802 moves relative to charge source assembly 800, the activation and charge writing cycle is repeated for the second primary group and its associated line array of charge sources.

It is appreciated that charge sources of charge source array assembly 800 are arranged in an overlapping fashion. Furthermore, there exists overlap between primary groups of electrodes 804. Thus, the need for a high level of registration between charge source array assembly 800 and substrate 802 is eliminated.

Figure 14A:
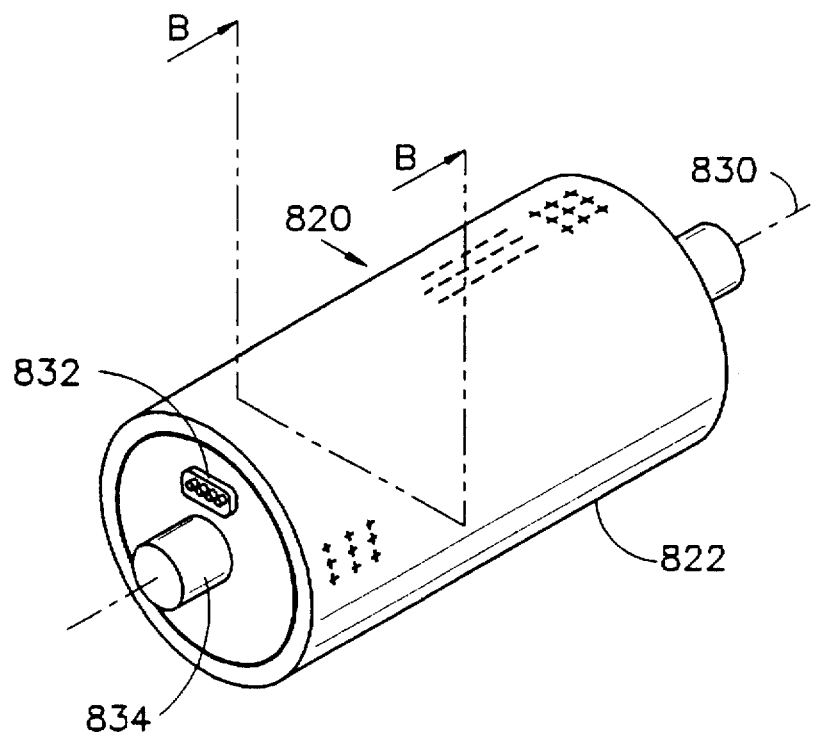
FIG. 14A is a generalized pictorial illustration of a digital receptor imaging drum constructed and operative in accordance with a preferred embodiment of the present invention.
Figure 14B:
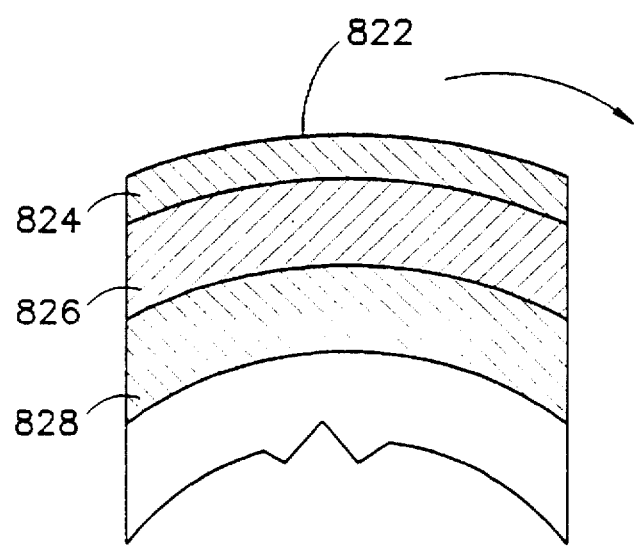
FIG. 14B is a sectional illustration of a portion of the drum of FIG. 14A, taken at line B—B on FIG. 14A.

Reference is now made to FIGS. 14A and 14B which illustrate a digital receptor imaging drum suitable for use in a variety of imaging applications including those described hereinabove and hereinbelow and in the copending applications referred to hereinabove, the description of which is hereby incorporated by reference.

FIG. 14A shows a drum 820 on whose outer surface 822 latent electrostatic images may be generated in accordance with the dynamic charge retention image writing techniques described hereinabove and hereinbelow.

The outer surface 822 includes portions which are imaging regions and other portions which are not imaging regions. Images are created at the imaging regions using an edge-defined alternating polarity charge source (not shown), and signals supplied to a conductive backing forming part of the drum. The charge source may be any suitable one of the charge sources described hereinabove, and particularly those illustrated in any of FIGS. 7A–11A. The conductive backing preferably comprises a plurality of electrodes.

Alternately, drum 820 may be used for image reading in accordance with techniques described herein.

FIG. 14B shows a cross section of an imaging region of the drum. The drum comprises an outer dielectric imaging layer 824 which may extend over both the imaging regions and the non-imaging regions. At imaging regions, a conductive backing 826 is associated with the outer dielectric imaging layer 824. The conductive backing overlies an inner dielectric layer 828. Imaging electronics (not shown) are associated with the electrodes of the conductive backing 826.

The outer dielectric imaging layer 824 can be made of any material that is suitable for use with the conductive backing 826. A suitable material may include dielectric polymeric-based materials, such as polyethylene terephthalate (PET, PETP), polyamides, or abrasion-resistant polysiloxanes. Alternatively inorganic materials, such as glass or ceramics (alumina, sapphire, etc.) may be used. It is appreciated that a photoconductive material could be used for outer dielectric imaging layer 824 in accordance with certain embodiments of the invention.

The conductive backing 826 preferably comprises densely spaced thin conductive electrodes. The density of the electrodes, the transverse cross-sectional geometry thereof and the thickness of the outer dielectric imaging layer 824 determine the spatial resolution of the latent image in the axial direction parallel to the longitudinal axis 830 of the drum 820.

Contained within drum 820 are imaging electronics which preferably includes serial to parallel data conversion electronics and high voltage electrode drivers.

Alternatively or additionally, drum 820 may contain imaging electronics which include parallel to serial data conversion and transmission electronics; and sample and hold circuitry for sensing signal information from outer dielectric imaging layer 824. It is appreciated that this type of imaging electronics is useful for image reading as described herein.

External data representing the latent image to be generated may be supplied to the imaging electronics through one or several connectors 832. It is appreciated that connectors 832 may be located additionally or alternatively on the faces of the drum or on a drum axle 834. Alternatively or additionally, data connections between the rotating drum and the stationary data source may be effected using slip rings (not shown), which may include mechanical, optical or conductive liquid based elements. Alternatively in accordance with certain configurations, where the drum does not complete full rotations, information may be transferred through a flexible cable.

The length of the drum along axis 830 may be any desired length and is typically selected to conform to standard print formats, for example, standard A and B formats.

The printing properties of the drum, its durability, the speed of operation, the toning materials, the operating voltages and the print cycle are determined in part by the materials used in building the drum. For example, drums with an outer dielectric glass or ceramic imaging surface are expected to provide enhanced durability.

In accordance with an alternate image reading embodiment of the present invention, outer dielectric imaging layer 824 can be replaced by an outer photoconductive layer (not shown). In this embodiment, imaging electronics for image reading applications, as described hereinabove and hereinbelow, are required.

Reference is now made to FIGS. 15A–15D which illustrate four alternative arrangements of imaging regions on the cylindrical surface of drum 820.

Figure 15A:
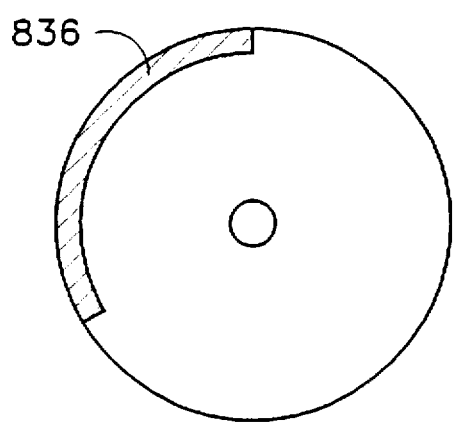
FIGS. 15A, 15B, 15C and 15D are sectional illustrations, taken along line B of FIG. 14A, of four alternative embodiments of the imaging drum of FIG. 14A.

As noted above, the surface of drum 820 comprises one or more imaging regions with the remaining surface of the drum not being active in the imaging process. The size of the non-active surface area is selected to achieve the desired drum diameter in accordance with a desired print cycle and print engine configuration. The division between imaging and non-imaging regions thus depends on the printing cycle, printing speed and other characteristics of a given printing engine. Possible configurations include, for example:

1. A single imaging region extends across less than half of the drum surface. One printing cycle is carried out per complete drum rotation. In this case, the drum typically continuously rotates in a single direction. This embodiment is shown in FIG. 15A where the conductive backing is indicated by reference numeral 836.

Figure 15B:
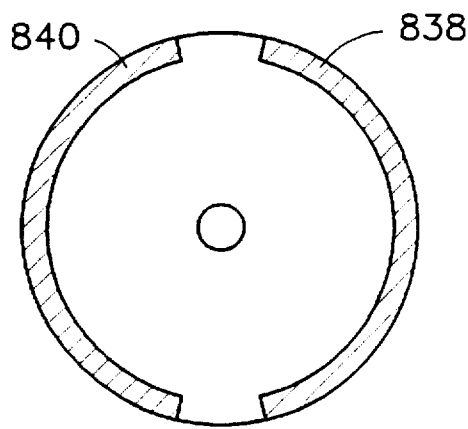

2. Two distinct independent imaging regions are separated by non-imaging regions. Two printing cycles are carried out per complete drum rotation, one cycle for each imaging region. In this case, the drum typically continuously rotates in a single direction. This embodiment is shown in FIG. 15B where the conductive backing portions are indicated by reference numerals 838 and 840.

Figure 15D:
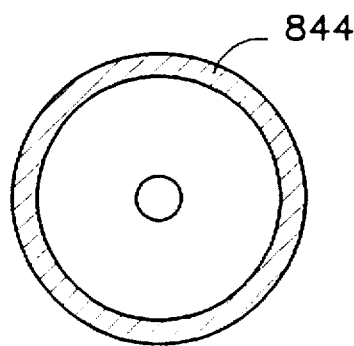
Figure 15C:
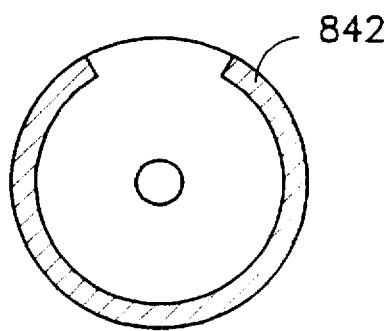

3. A single imaging region extends across most or all of the drum surface. Each printing cycle is accomplished by several rotations of the drum. In this case, the drum typically continuously rotates in a single direction. Alternatively, a printing cycle may be carried out by a combination of clockwise and counterclockwise rotations of the drum. These embodiments are shown in FIGS. 15C and 15D, where the conductive backing portions are indicated by reference numerals 842 and 844.

Typically, the imaging regions and non-imaging regions have similar external appearance. Alternatively, the regions may be externally distinguishable.

Figure 16A:
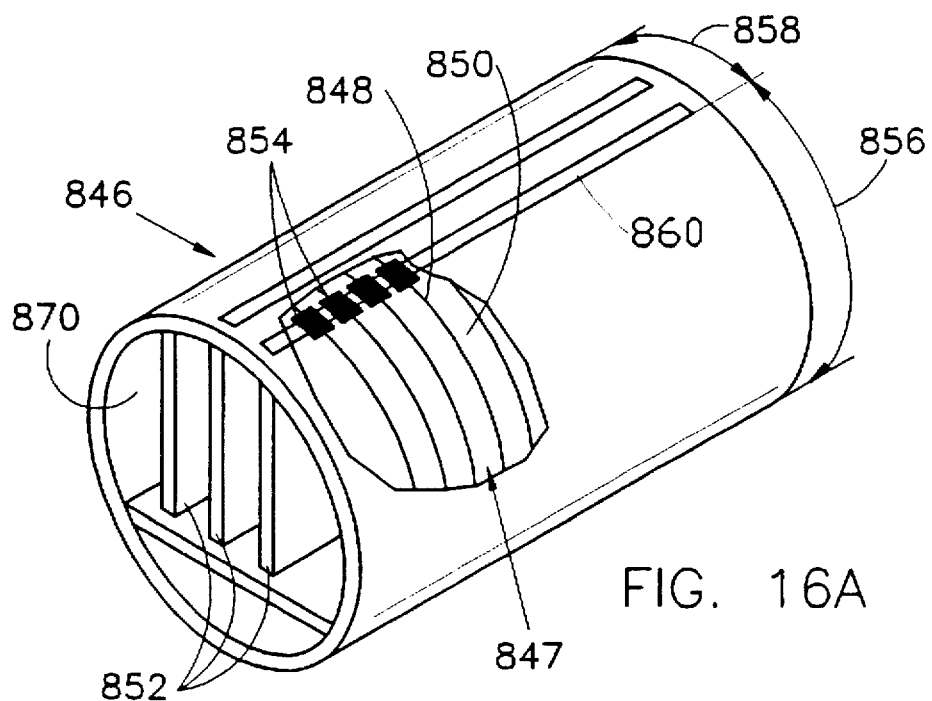
FIG. 16A is a partially cut away generalized pictorial illustration of a preferred embodiment of the drum of FIGS. 14A and 15C.

Reference is now made to FIGS. 16A–16E which illustrate preferred interior structures for drum 820. Referring first to FIG. 16A, it is seen that the drum, indicated by reference numeral 846, comprises a conductive backing 847 comprising closely spaced electrodes 848 embedded in a dielectric substrate 850, imaging electronics located on primary printed circuit boards 852 located interior of the drum and connectors 854 connecting the electrodes 848 to the printed circuit boards 852. The electrodes 848 and connectors 854 are shown in FIG. 16A with exaggerated dimensions and spacing. In reality, each electrode has a width of approximately 20–40 microns and the electrodes are separated from one another by a spacing of approximately 15–20 microns. The connectors 854 may be pads formed by printed circuit techniques. In reality, the width of each connector 854 is typically on the order of 100 microns and the gap between connectors is also typically on the order of 100 microns.

The dielectric substrate 850 having electrodes 848 embedded therein may be fabricated by any suitable technique including, for example, techniques mentioned hereinabove.

Two general methods for producing the conductive backing 847 of the imaging region of the drum are described hereinbelow with reference to FIGS. 16C and 16D.

Drum 846 comprises an imaging region 856 which extends across most of the drum surface and a non-imaging region 858. Non-imaging region 858 covers the connectors 854 which connect conductive electrodes 848 to primary printed circuit boards 852. Each primary printed circuit board 852 typically contains a single line array of connectors 854.

Typically, primary printed circuit boards 852 are shaped to fit inside drum 846. The line array of connectors 854 of each printed circuit board 852 is positioned for exposure through a narrow slot 860 in the drum surface, which slot extends parallel to the longitudinal axis of drum 846. The number of slots 860 may correspond to the number of primary printed circuit boards 852. Alternately, each slot 860 may correspond to more than one primary printed circuit board 852.

Imaging electronics, including digital serial-to-parallel data transfer and high-voltage electrode drivers, may be located on a non-connector section of printed circuit board 852. The non-connector section of primary printed circuit boards 852 may be flexible or rigid depending on the drum structure and diameter.

Figure 16B:
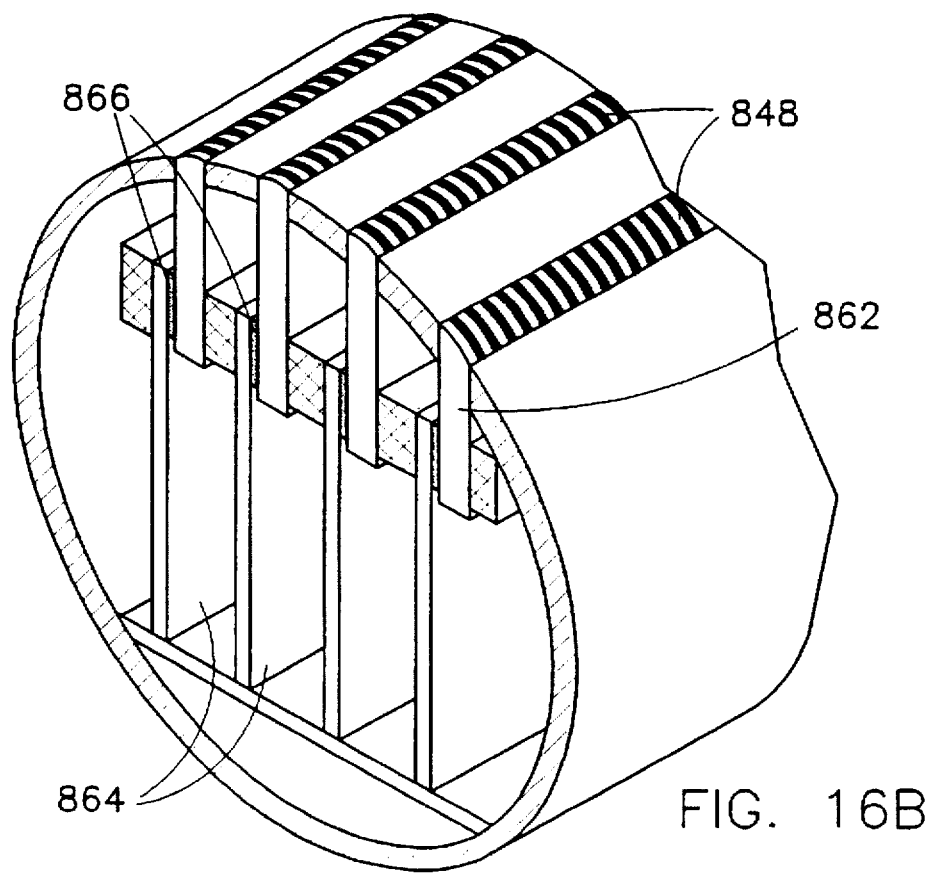
FIG. 16B is a partially sectional, partially pictorial illustration of a further variation of the imaging drum of FIGS. 14A and 15C.

Reference is now made particularly to FIG. 16B which shows an alternative inner configuration of drum 846. In this configuration, two sets of parallel printed circuit boards are used, a primary set 862 and a secondary set 864. Each printed circuit board in primary set 862 is connected to a plurality of conductive electrodes 848 (FIG. 16A) by means of a single line array of connectors. Preferably, the primary set of printed circuit boards 862 does not contain any electronic components. Instead, the primary set of printed circuit boards 862 serves only as an interconnection between conductive electrodes 848 and the secondary set of printed circuit boards 864.

Alternatively, a pre-formed rigid base, comprising any suitable dielectric material (for example ceramic, glass, anodized aluminum, etc.) with a surface pattern created using a conductive material (for example copper, gold, etc.) may be used in place of the primary set of printed circuit boards 862.

The secondary set of printed circuit boards 864, which may be made of a flexible or rigid material, comprises imaging circuitry and a set of connectors. The number and layout of connectors on the secondary set of printed circuit boards 864 corresponds to that on the primary set 862.

Electrical connection in registration between the connectors of the printed circuit boards of the primary set 862 and of the secondary set 864 may be effected using elastomeric high density contact arrays (zebra connectors) 866. Alternately, any other suitable method for generating high density electrical connections between the two sets of printed circuit boards may be used.

It is appreciated that connectors may be placed on one or both sides of the printed circuit boards of the primary set 862. Typically, contact between the set of connectors on the primary and secondary sets may be carried out through application of pressure.

It is appreciated that the number of printed circuit boards 864 comprising the secondary set may be determined in accordance with the specific mechanical structural considerations of drum 846 and design considerations of the printed circuit boards. For example, numerous secondary printed circuit boards 864 could be arranged in a cascade and connected to one printed circuit board of the primary set 862 allowing for simplification of each secondary printed circuit board 864.

It is further appreciated that in accordance with this configuration, printed circuit boards of the secondary set 864 are removable from drum 846 by releasing the pressure holding the connectors. Thus, the outer part of drum 846 may be replaced without necessitating replacement of the secondary set 864 of printed circuit boards or of the imaging electronics formed thereon.

Figure 16C:
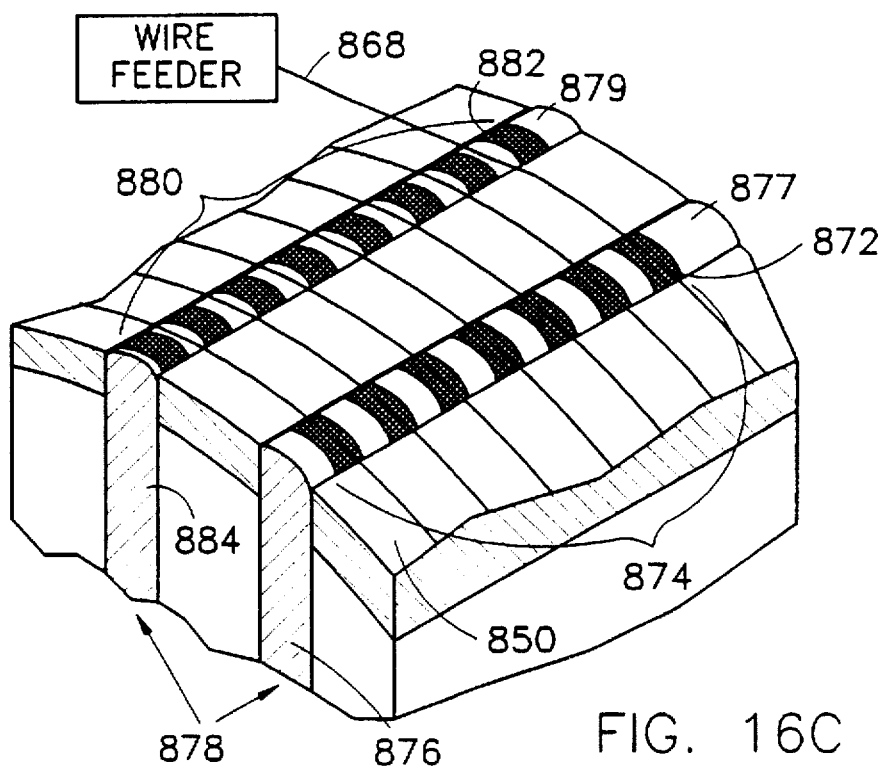
FIG. 16C is an enlarged illustration of a portion of the imaging drum of FIG. 16A, at an intermediate stage of drum fabrication.

Reference is now made to FIG. 16C which illustrates conductive electrodes 848 of drum 846 at an intermediate stage of fabrication.

A conductive wire 868 is tightly wrapped around an inner dielectric surface 850 of drum 846 resulting in a coiling of the wire into spacewound turns about surface 850 with a very precise pitch. Prior to wrapping the wires, a thin adhesive layer (not shown) may be adhered to the inner dielectric surface 870 of the drum 846 to ensure proper alignment and spacing of the wires.

The wires should exhibit sufficiently high electrical conductivity combined with mechanical strength so as not to tear during the winding process. The wires may be made of stainless steel, copper alloys, tungsten, etc. and may be uncoated. Alternatively, the wires may be coated with an insulating material such as glass or alternatively with a polymeric coating such as polyurethane, polyamide, etc. The actual material for the wire and for its coating are selected to best suit the fabrication process, the desired properties of the printing device and other materials used in production.

The pitch of the coil is selected to match the spacing of connectors 872 of the first primary printed circuit board 876 which is located in a slot 877. The wire is coiled until each connector 872 is located in contact with an individual turn of the wire. Primary printed circuit boards 878 may be of the type described above in conjunction with FIG. 16A or FIG. 16B.

After the wire is coiled so that each connector 872 of the first primary printed circuit board 876 is located in contact with an individual coil of the wire, the wire is bonded to connectors 872. Bonding may be accomplished by parallel gap bonding techniques. Alternatively, bonding may be carried out by employing reflow wire Soldering techniques using hot rams, or non-contact hot air jets. Where necessary, the insulating coating may be stripped off the segments of the wire that are located in the connector region, during or after the winding process. For wires with a solderable coating, stripping may be carried out during the soldering process. Additionally, or alternatively any other suitable bonding technique may be used.

In accordance with a further embodiment of the invention, connectors 872 of the primary printed circuit boards 876 may be precoated with a predetermined amount of soldering material per connector, for example, thin-lead solder. This method facilitates the bonding process for fine-pitch soldering.

After the wire has been bonded to all the corresponding connectors in a single line array 874, a thin layer of dielectric material encapsulates the line array 874 of connectors 872 to electrically insulate them from each other.

The wire coil is then cut parallel to the drum axis adjacent both sides of an adjacent slot 879. The cuts disconnect from each other adjacent portions of the coil in electrical contact with adjacent connectors of a given line array 874. The result is an array of precisely spaced mutually electrically-insulated conductive wires each of which is separately connected to a separate connector forming part of array 874. These wires constitute some of the electrodes of the present invention. Additionally, the cuts remove those portions of wire which would otherwise extend over an adjacent line array 880 of connectors 882 of an adjacent primary printed circuit board 884.

After the above steps have been completed on the first primary printed circuit board 876, they are repeated for every primary printed circuit board 878 typically continuing until each connector on each primary printed circuit board is in electrical contact with a wire. The spacing between connectors in each single line array on each primary printed circuit board is constant. However, the first connector and thus all subsequent connectors in the line array on each primary circuit board are staggered along an axis parallel to the longitudinal axis of the drum slightly relative to the connectors of each adjacent primary printed circuit board.

The number of connectors used, which determines the pitch of the winding, can be varied to achieve different spatial resolutions along the drum axis direction. Using several primary printed circuit boards and several sequential corresponding winding steps enables high spatial resolution of the conductive electrodes to be realized while enabling relatively lower resolution to be employed for the connectors, which resolutions are better suited to printed circuit board manufacturing and bonding processes. Alternatively, when lower resolutions are required, or when otherwise desirable, a single primary printed circuit board can be used.

Densities greater than 600 lines (wires) per linear inch can be achieved using this technique, as can be appreciated by a consideration of the examples shown in FIGS. 16A, 16B and 16C, where four primary printed circuit boards and 1600 connectors are employed in association with each primary printed circuit board.

Alternatively, the conductive backing 847 of drum 846 may be prepared by other techniques which allow the creation of densely packed conductive electrodes.

Figure 16D:
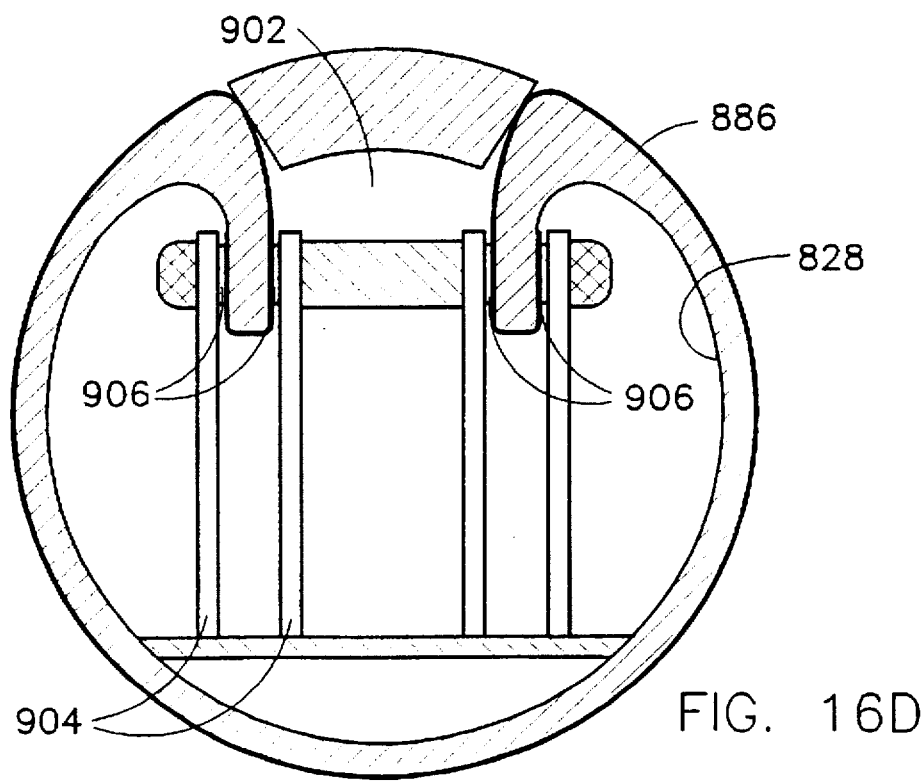
FIG. 16D is a generalized pictorial illustration of a further variation of the imaging drum of FIGS. 14A and 15C.
Figure 16E:
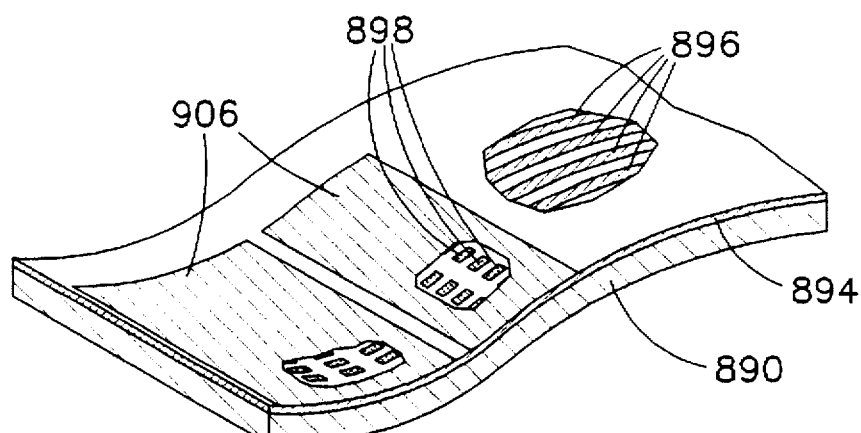
FIG. 16E is a partially cut-away illustration of part of the imaging drum of FIG. 16D.

Reference is now made particularly to FIGS. 16D and 16E, which illustrate an alternative configuration of the conductive backing and the inner structure of drum 820 in accordance with an embodiment of the present invention.

The conductive backing comprises a multi-layer blanket 886 which includes a flexible dielectric carrier 890 and a further layer 894 on which is formed a plurality of conductive electrodes 896, where the electrodes terminate in a fan out array 898 of connectors. Conductive electrodes 896 together with fan out array 898 may be produced on layer 894 by photoetching, plasma etching, laser etching, mechanical etching, electroforming or a combination thereof.

Blanket 886 is wrapped around inner layer 828 of drum 820, with each blanket end being inserted into a opening 902. Fan out arrays 898 at the blanket ends are aligned with a secondary set of printed circuit boards 904 that are located within drum 820. Fan out arrays 898 at each blanket end may comprise one or more contact regions 906. Through the contact regions 906, electrodes of blanket 886 are electrically connected to secondary printed circuit boards 904. Typically, the electrical connection may be made using elastomeric contact arrays as described hereinabove. Alternately any other high density connectors may be used. Blanket 886 eliminates the need for a set of primary printed circuit boards. A thin adhesive layer may be used to ensure adhesion of dielectric carrier 890 to drum inner layer 828.

After a conductive backing has been produced by any of the methods described hereinabove with reference to any of FIGS. 16A–16E, or by any suitable alternate method, outer dielectric surface 824 is formed. Outer dielectric surface 824 is created by coating conductive backing 826 with a dielectric layer or layers resulting in a uniform smooth outer layer with predetermined total thickness.

The capacitance of outer dielectric surface 824 is determined by the dielectric constant of the material or materials used in the coating process and the accumulated thickness of all of the coating layers.

Typically, the total thickness of outer dielectric surface 824 is between 10–50 microns. The capacitance of outer dielectric surface 824 plays an important role in determining the final resolution of the latent image and the maximum charge density that can be accumulated on the surface per the voltage applied to the conductive backing.

In addition to its dielectric properties, the material used for the outer dielectric coating should have appropriate surface energy, be sufficiently durable and abrasive resistant.

Various techniques may be used to create outer dielectric imaging layer 824 of drum 820. The specific method used is chosen to conform to the configuration of conductive backing 826 and the specific materials used. Prior to coating, the surface of conductive backing 826 may be chemically treated to prepare for coating with one or many thin dielectric layers.

Coating techniques may comprise fog spraying of dielectric polymeric-based solutions or dispersions. Typically, fog spraying is carried out while the drum is rotating. Alternatively, coating may be carried out using dip or web coating techniques. Depending on the material of the conductive electrodes, either dip or web coating (with a polymeric based solution, dispersion or two components) or hot melt dip or web coating (using dielectric thermoplastic materials or glass) may be used.

After coating, each dielectric layer may be hardened using evaporation, a thermal process, or curing via radiation or heat, depending on the coating material used.

After all dielectric layers have been coated and hardened, a smooth uniform outer dielectric imaging layer 824, having an embedded conductive backing 826, remains.

Alternatively, outer dielectric surface 824 may be created by a rough casting of polymeric based materials or sintering of ceramics inside a preformed container. After the casting or sintering is complete, the container is removed, and all unnecessary coating material is machined away leaving a coating with a specified even thickness and a smooth outer layer.

Furthermore, outer dielectric surface 824 may be created by deposition techniques, including vacuum or plasma deposition to deposit a suitable dielectric material. Typically, deposition is carried out while the drum is rotating.

Alternatively, coating techniques may comprise spreading of a dielectric adhesive onto the electrodes of conductive backing 826, thus filling all gaps. A thin dielectric film (such as polyester based films) of predetermined thickness may then be wrapped around the entire drum surface and pressure laminated to the conductive wires/adhesive surface. Following this step, the adhesive is cured leaving a flat dielectric outer imaging surface adhered to the electrodes.

Optionally any and all of the drums described herein may be provided with an additional thin dielectric outer coating, which preferably is disposable and easily replaceable. This coating, which may be formed of polyethylene terephthalate (PET, PETP) or any other suitable material, may have a thickness in the general range of 12 microns.

In accordance with an alternate embodiment of the present invention, for image reading applications, an outer photoconductive layer (not shown) may be formed over the electrodes of conductive backing 826 by any suitable techniques.

Figure 17A:
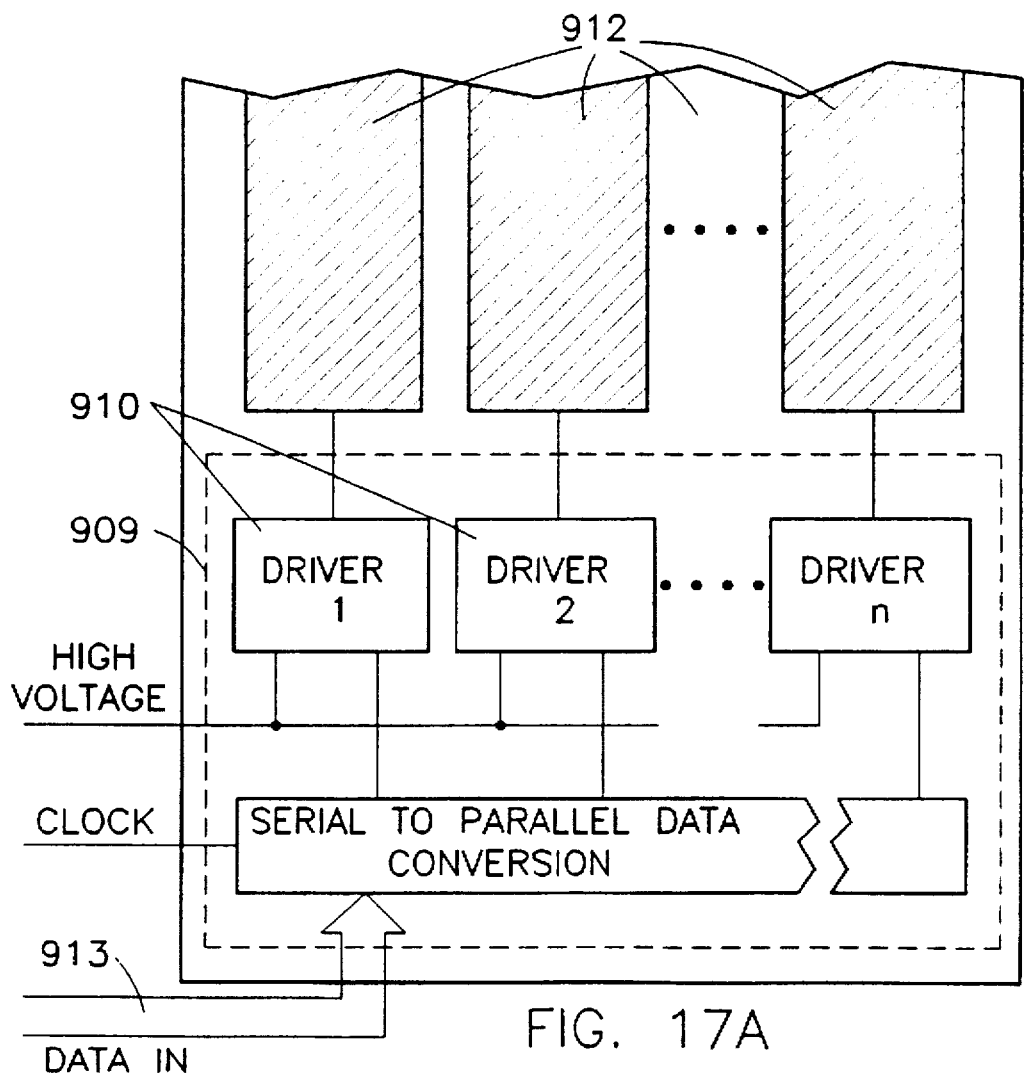
FIGS. 17A and 17B are schematic illustrations of alternate embodiments of the imaging electronics used in the apparatus of FIGS. 14A end 14B.

Reference is now made to FIG. 17A which is a simplified schematic illustration of the imaging electronics of the printed circuit boards. The imaging electronics comprise a cascade 909 of multi-channel serial to parallel devices outputting to drivers 910. Each driver 910 provides a high voltage output, in the range of up to several hundred volts, which drives a separate conductive electrode 912.

Data is input serially from an external data source, such as a computer, copier, scanner or facsimile receiver, to the imaging electronics via a data bus 913. Serial data, representing a pattern which is to be generated on the outer dielectric imaging surface of the drum, is typically fed to data bus 913 in 1, 8 or 10 byte words.

The data propagates along the cascade 909 of multichannel serial to parallel converting devices. A single output of each device within cascade 909 corresponds to each conductive electrode 912. For example, if the conductive backing of a drum contains 6400 conductive electrodes, one hundred. 64-channel devices or two hundred 32-channel devices may be employed in the cascade 909. Typically, the devices are evenly distributed over the printed circuit boards on which the imaging electronics are located.

After data representing one raster line of a pattern to be generated has been serial loaded across the cascade of multichannel serial to parallel converters 909, the data is loaded in parallel to high voltage drivers 910. Based on the data, high voltage drivers 910 apply appropriate voltages to the electrodes.

Simultaneous with the application of the voltages to conductive electrodes 912, an Elongate Alternating Polarity Charge Source (EAPCS), of the type described in any of FIGS. 7A–11A, is activated.

The EAPCS may be placed in proximity to the outer dielectric imaging surface of a drum, such as drum 820 of FIG. 14A or drum 846 of FIG. 16A, and includes at least one well-defined edge. The EAPCS is positioned so that, during drum rotations, the trailing edge of the EAPCS is a well-defined edge. Charge is not supplied by the EAPCS to areas of the outer dielectric imaging surface of the drum that are beyond the edge of the EAPCS.

The EAPCS may be activated for a pulse duration containing tens of plasma cycles. This activation supplies charges to the outer dielectric imaging surface. The final charge retained on the outer dielectric imaging surface of the drum is a dynamic function which corresponds to the voltage signals applied to conductive electrodes 912 over the pulse duration. The area of charge retention is bounded by the defined edge of the EAPCS.

During EAPCS activation, data representing the next raster line of the image to be generated is serially loaded into cascade 909, but the data is not forwarded to high voltage drivers 910.

Prior to application of voltages corresponding to data for a subsequent raster line of the image, the drum rotates slightly to position the EAPCS for the next line. After rotation of the drum, the new line data is sent to high voltage drivers 910 and the EAPCS is activated, again causing retention of a new amount of charge, positive or negative, corresponding to the new line data that was fed to the devices. Areas that are beyond the boundary created by the defined edge of the charge source do not receive additional charge. Instead, they retain the charge that was previously accumulated.

The above-described line writing cycle repeats itself until a latent image of the entire pattern is generated.

Alternatively, the EAPCS may be operated continuously during the latent image generation process. During continuous operation of the EAPCS, the retained charge pattern is continuously refreshed. Conversely, when the EAPCS is operated in pulses, the retained charge pattern is refreshed during time intervals whose length determines the dimension of a single raster line of the image in the direction in which the drum rotates.

Figure 17B:
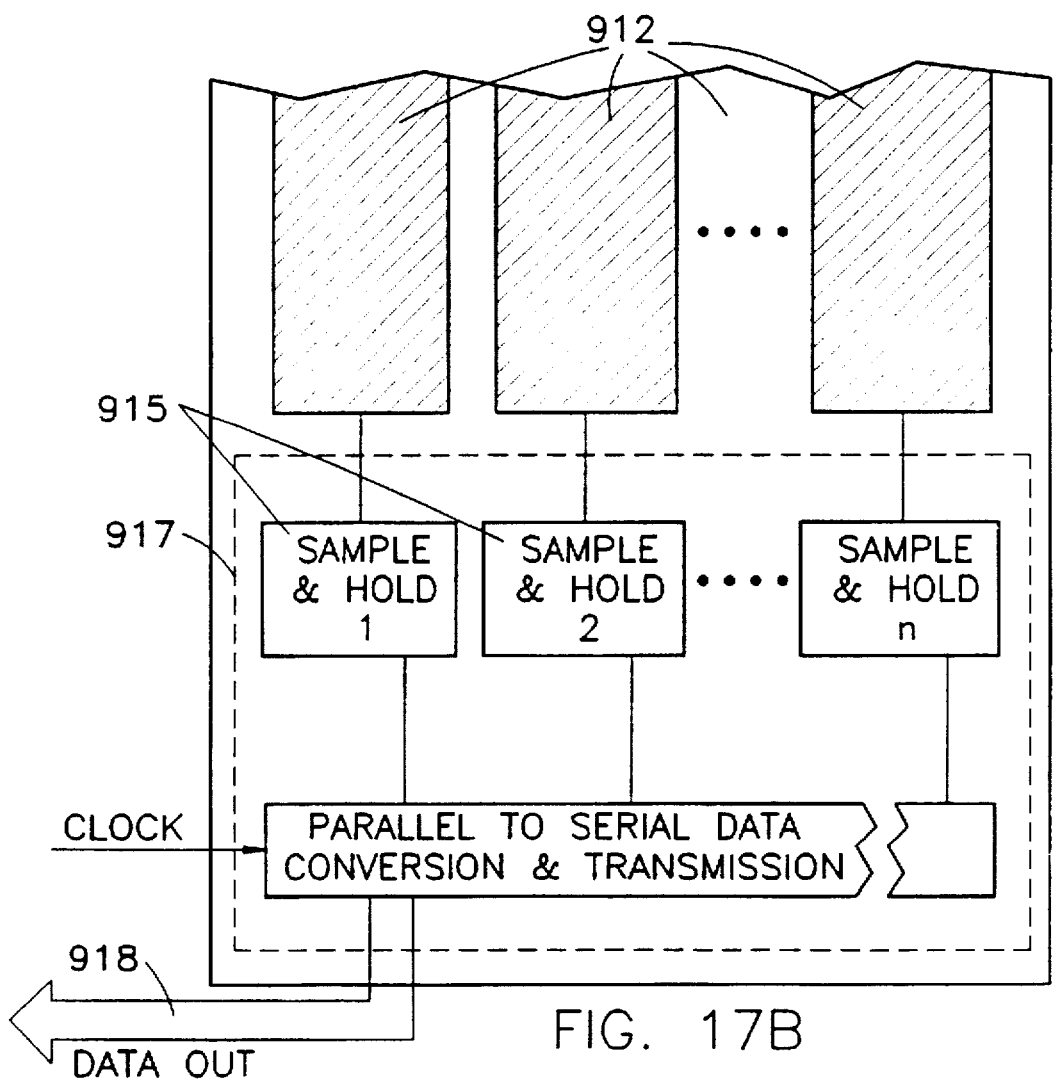

Reference is now made to FIG. 17B which is a simplified schematic illustration of imaging electronics of the printed circuit boards for use in reading electrostatic charge images. The imaging electronics comprise sample and hold circuitry 915 which supply output to a cascade 917 of multi-channel parallel to serial data conversion and transmission devices. Each sample and hold circuit 915 receives input from a conductive electrode 912.

A data bus 918 serially outputs data to an external data collector. Each conductive electrode 912 is electrically connected to a sample and hold circuit 915, which are typically evenly distributed over the printed circuit boards on which the imaging electronics are located.

The data output by data bus 918 represents digital information corresponding to an electrostatic charge image which was read from the outer dielectric imaging surface of the drum in accordance with techniques described herein.

It is appreciated that the image to be read may be written onto the dielectric outer imaging surface using the dynamic charge retention techniques described herein or any other suitable technique, for generation of latent charge images. For example, when the outer dielectric imaging surface is a photoconductor as described hereinabove, a charged latent image can be created on the surface using conventional electrophotography techniques.

An additional benefit to the image reading techniques described herein is that the reading process effectively erases and uniformly charges the outer dielectric imaging surface in a single step, pre-conditioning the outer dielectric imaging surface. Such pre-conditioning is not necessary when writing images using the dynamic charge retention techniques described herein, but is required prior to the projection of optical images on a photoconductor.

An Elongate Alternating Polarity Charge Source (EAPCS), of the type described in any of FIGS. 7A–11A, is placed adjacent an outer dielectric imaging surface of a drum, such as drum 820 of FIG. 14A or drum 846 of FIG. 16A. It is appreciated that during drum rotations for image reading, the leading edge of the EAPCS is a well-defined edge. The EAPCS does not supply charge to areas of the outer dielectric imaging surface of the drum that are beyond the leading edge.

To read a single line of information from outer dielectric imaging surface, the EAPCS may be activated for a pulse duration containing tens of plasma cycles. This activation unifies the charge level across one line of the electrostatic charge pattern, erasing that line of the pattern, and inducing a current flow from each conductive electrode 912 to a capacitor (not shown) in the corresponding sample and hold circuits 915. During each line reading cycle, the total charge flow into each sample and hold circuit 915 is a function of the charge density level that was present at the location on the outer dielectric surface corresponding to the conductive electrode 912 connected to the sample and hold circuit 915, prior to activation of the EAPCS.

The charge level retained on the line of the outer dielectric imaging surface after line reading is a function of the bias voltage applied to the conductive electrodes during line reading. Typically conductive electrodes 912 are grounded during line reading. Alternately, conductive electrodes 912 may be biased to a predetermined bias voltage level. It is appreciated that the same level of voltage is typically applied to all conductive electrodes 912 during reading.

Signals from all the sample and hold circuits 915 are output in parallel to a cascade 917 of multi-channel parallel to serial data conversion and transmission devices. Cascade 917 provides digital output data representing one line of the image that was present on outer dielectric imaging surface. Data on output bus 918 typically comprises one or eight bits of information, representing 2 or 256 grey levels, respectively.

The above-described line reading cycle repeats itself until digital information representing the entire electrostatic charge image to be read is collected.

During pulse operation of the EAPCS, the pulse duration is synchronized with the sample and hold circuit cycle. The duration of the pulse defines the dimension of the raster line of the image that is being read.

Alternatively, the EAPCS may be operated continuously during the image reading process. During continuous operation of the EAPCS, the dimension of a single raster line of the image being read is determined by the sample and hold circuit cycle.

It is appreciated that the abovedescribed image reading techniques may provide numerous functions including optical scanning and reading, and electrostatic information storage.

Figure 18:
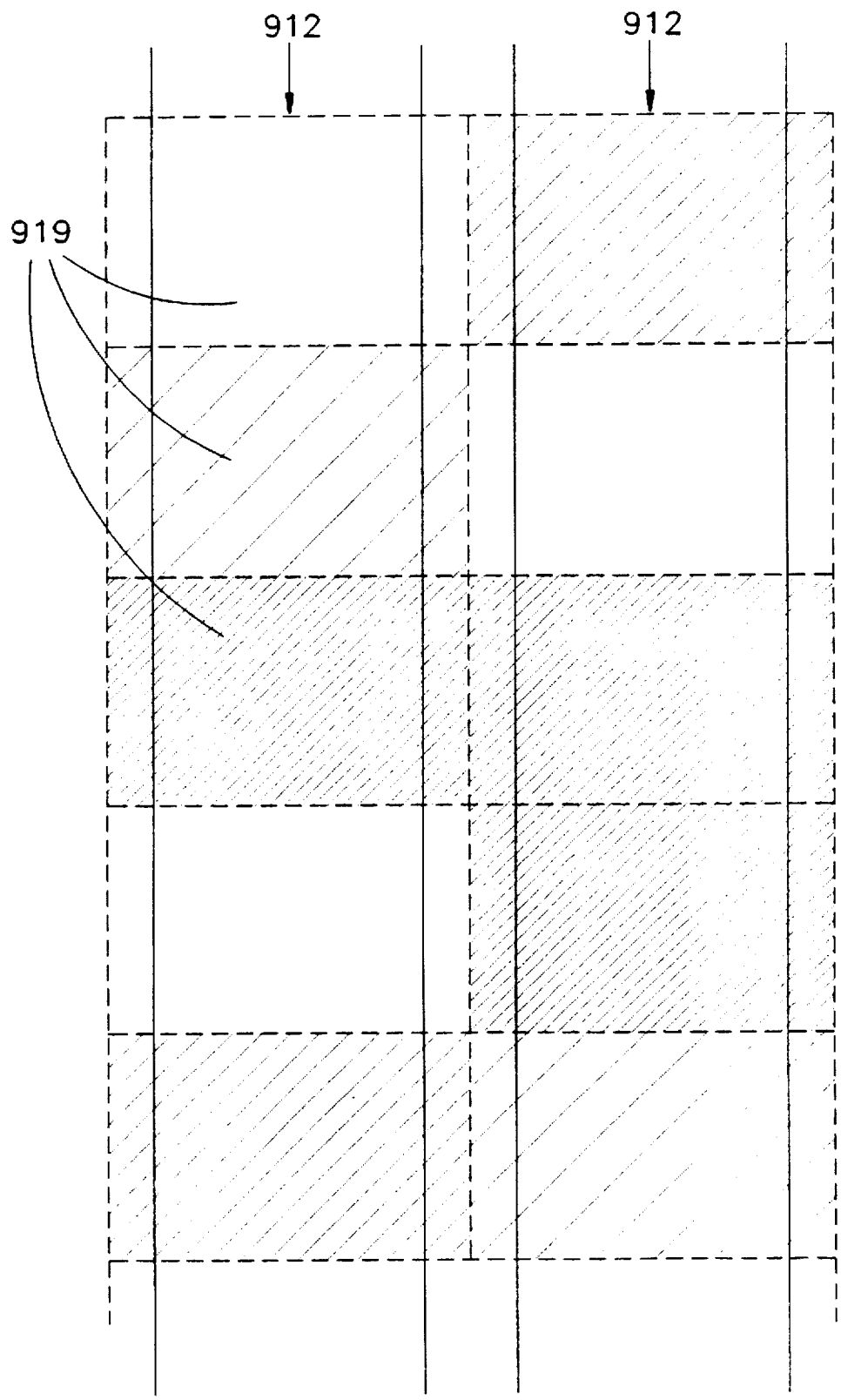
FIG. 18 is an illustration of a continuous tone pattern generated using the apparatus of FIG. 17A.

Reference is now made to FIG. 18 which illustrates an image pattern comprising a plurality of pixels 919 along conductive electrodes 912, where the charge density of each pixel is determined by input data.

It is appreciated that the imaging electronics may be configured for different methods of achieving grey shades for printing images. Specific printing methods may include optical density modulation or pixel size modulation and micropositioning as described hereinabove, all of which are compatible with the drum configuration and imaging techniques described hereinabove. It is appreciated that a large number of grey shades can be achieved without resolution sacrifices thereby allowing print outs which combine high quality text, graphics and images.

Optical density modulation allows images to be created by controlling the amount of toner, hence the shade, of each pixel. Alternately, images may be created using super-pixel half-tone patterns, where each super-pixel comprises several pixels and where each pixel is either toned or non-toned. In addition, micropositioning of each pixel may be combined with super pixel half tone pattern techniques.

It is further appreciated that in accordance with the writing techniques described herein, the imaging electronics and the level of high voltage employed can accommodate a variety of toners and toning techniques, including liquid and dry toners. one method for achieving continuous tone images using drum 820 and the writing techniques described hereinabove is described hereinbelow.

Through amplitude modulation of the voltages applied to the electrodes 912 by the drivers 910 during EAPCS activation, the total amount of charge retained may be precisely determined.

A charge pattern containing a two-dimensional array of pixels, where the charge density for each pixel can be selected, is created using the latent image writing techniques and drum described hereinabove. Each pixel is defined as the minimum unit that can be addressed in a line. The number of pixels in the direction of the longitudinal axis of the drum is equal to the number of conductive electrodes therein. The shape of the pixels is determined by the geometry of the conductive electrodes, the thickness of the outer dielectric layer, and the edge definition of the EAPCS. Using appropriate toners and toning techniques, a continuum of shades can be achieved for each pixel.

A benefit of creating continuous tone images using the writing techniques and drum described hereinabove is that the total charge density at any pixel location is a function of the voltage applied to the conductive electrode during EAPCS activation. Therefore, the charge density is not sensitive to environmental factors, such as temperature, humidity, light, etc. Typically, line-printing techniques, for example LED Arrays in electrophotography, ion guns in ionography, are based on imagewise writing heads which are typically composed of pixel-sized writing sources. Dissimilarities between any of the pixel-sized writing sources comprising an imaging head may result in image non-uniformities.

The line printing techniques described herein do not employ an imagewise writing head. Instead, the charge density for each pixel location is determined by the voltage applied to the conductive electrodes. Ordinary fluctuations in the charge source do not cause non-uniformities in the image. Therefore, the charge density can be closely controlled and repeatability is achievable.

Figure 19A:
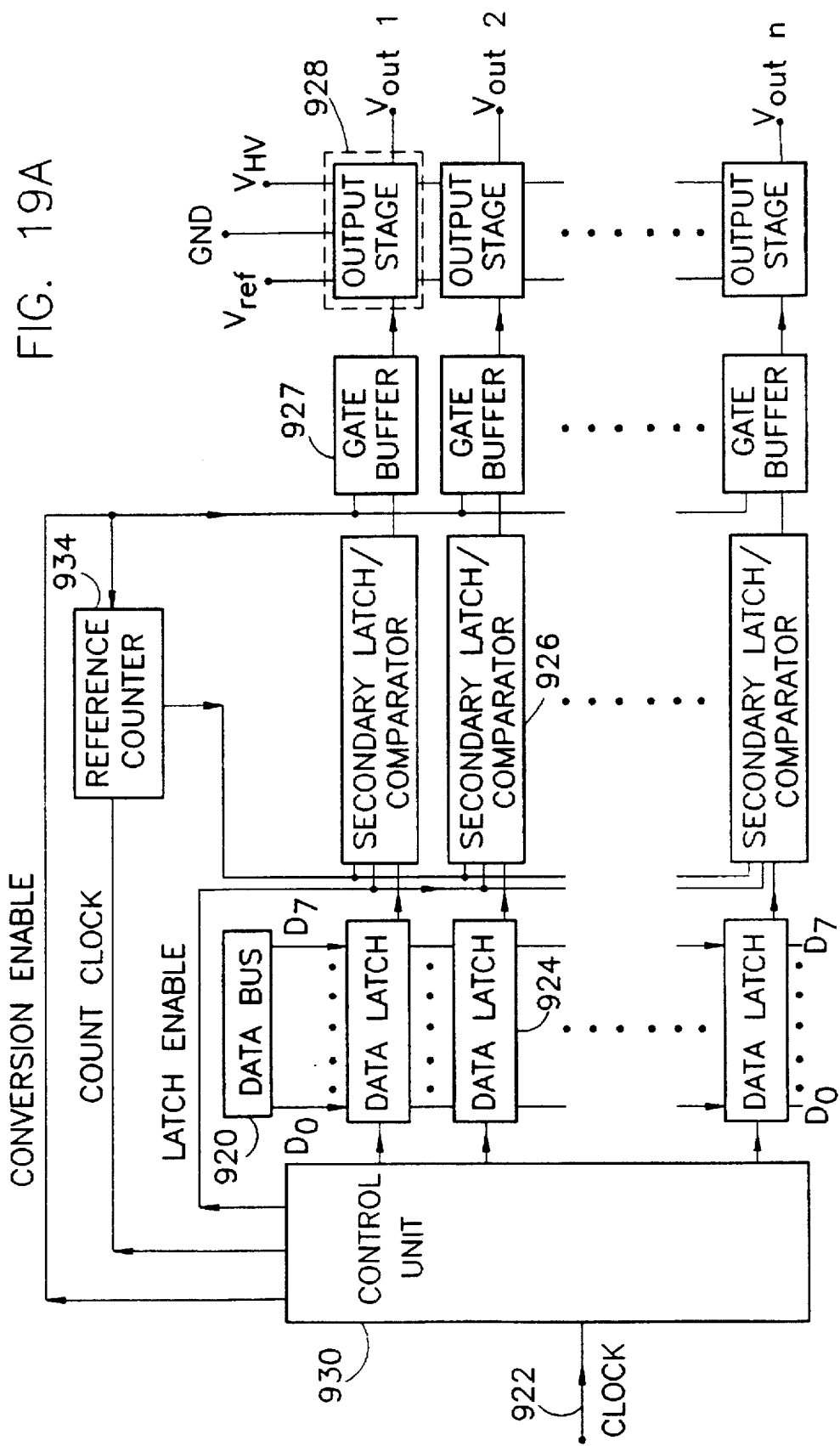
FIGS. 19A and 19B are block diagram illustrations of the architecture of the apparatus of FIG. 17A when used for producing a continuous tone pattern.

Reference is now made to FIG. 18A which illustrates an example of the circuitry of basic continuous tone imaging apparatus that can be used to perform amplitude modulation for each conductive electrode 912. FIG. 19A depicts one preferred embodiment of the apparatus of FIG. 17A, which is particularly suitable for use in generating continuous tone images.

The basic circuitry typically comprises one among a multiplicity of units which make up the cascade 917 (FIG. 17A). Typically, for high quality continuous tone imaging, 8 bit inputs to the data bus are used, where each 8-bit data word corresponds to the desired voltage level for one conductive electrode. When 8-bit word input is used, 256 different voltage levels are available for each conductive electrode corresponding to 256 different shades for each pixel. Since up to four different latent images, one representing each different print color, such as cyan, magenta, yellow, black, may be used for each final color print image, 256 shades for each color translates to millions of possible color combinations.

Data is serially loaded from data bus 913 and propagated at a high rate, typically using loading clock 922, which operates at few tens of MHz, into each data latch 924 of each device. Each data latch 924 corresponds to one secondary latch 926 and one output voltage stage 928.

Once an entire line of data has been loaded into the data latches 924, the line data is transferred in parallel from data latches 924 to secondary latches 926. Transferring the data to secondary latches 926 allows new data representing the next line of the image to be loaded into the data latches 924. Concurrently, all data in secondary latches 926 undergoes a parallel digital to analog high voltage conversion.

The outputs of secondary latches 926 are supplied to respective gate buffers 927. The outputs of gate buffers 927 are supplied to respective output stages 928. A control unit 930 controls the timing and triggering of the subsystems in each device.

The conversion cycle begins by setting a binary reference counter 934 on each device to 00000000. In predefined increments, a clock signal is sent from control unit 930 to reference counter 934 incrementing reference counter 934 by units of 1 until a maximum level of 11111111 is reached. Each increment is associated with one of 256 possible output levels.

Figure 19B:
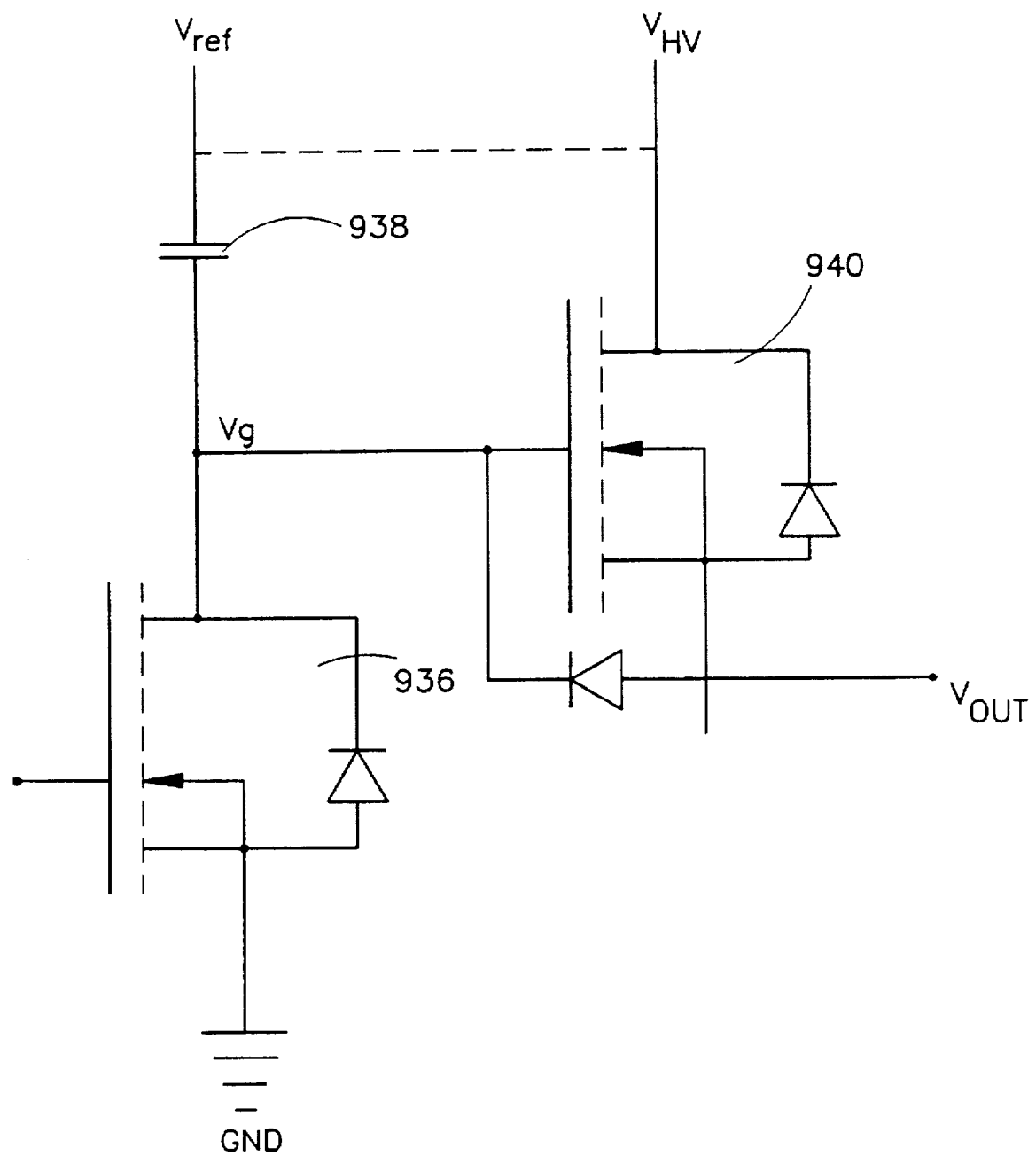

Reference is now made to FIG. 19B which is a detailed circuit diagram of a possible output stage 928 of the basic continuous tone circuitry apparatus of FIG. 19A. It is appreciated that other circuits which perform a multi-channel digital to high voltage analog conversion may also be used.

At output stage 928, which employs high-voltage CMOS technology, digital data from secondary latch 926 is converted to an analog output voltage $V_{out}$ as follows:

A ramping voltage $V_{ref}$ typically of up to 600 Volts, is applied to output stages 928 of all devices in cascade 917. Voltage $V_{ref}$ is switched via charging transistors 936 causing hold capacitors 938 in each output stage 928 to experience a rise in voltage.

Each time the value in reference counter 934 is incremented, the digital information in secondary latch 926 associated with each output stage 928 is compared with the value in reference counter 934. When reference counter 934 reaches the value held by secondary latch 926, the charging transistor 936 is switched off thereby terminating charging of the hold capacitor 938 of that output stage 928.

When charging transistors 936 are switched off, $V_{ref}$ may still be ramping. Voltage $V_g$ at the gate of voltage follower 940 begins to ramp and continues ramping at the same rate as voltage $V_{ref}$. Since voltage follower 940 acts as a follower of $V_g$, the output voltage $V_{out}$ also begins to ramp at the same rate as $V_g$ and $V_{ref}$. When $V_{ref}$ reaches its peak and begins holding, $V_g$ also reaches its peak and begins holding. $V_{out}$ follows $V_g$ and reaches its peak at the same time. The overall effect of this operation is a conversion of the digital data to an analog high voltage output value $V_{out}$.

An advantage to the stage described hereinabove is that there is no cross-coupling between different channels, since all of the outputs reach their peak voltages at the same time.

Typically, $V_{out}$ is maintained constant across conductive electrodes 912 during the EAPCS activation. Once the EAPCS is made non-active, $V_{ref}$ is reduced to zero, allowing hold capacitors 938 to discharge, thereby discharging the corresponding conductive electrode 912. The total charge accumulated on a given region of the conductive electrode 912 prior to discharge is determined by the data input to data latch 924 associated with the corresponding output stage 928. After $V_{ref}$ rises back to its normal level, a conversion cycle for the next line of data is begun.

Figure 20:
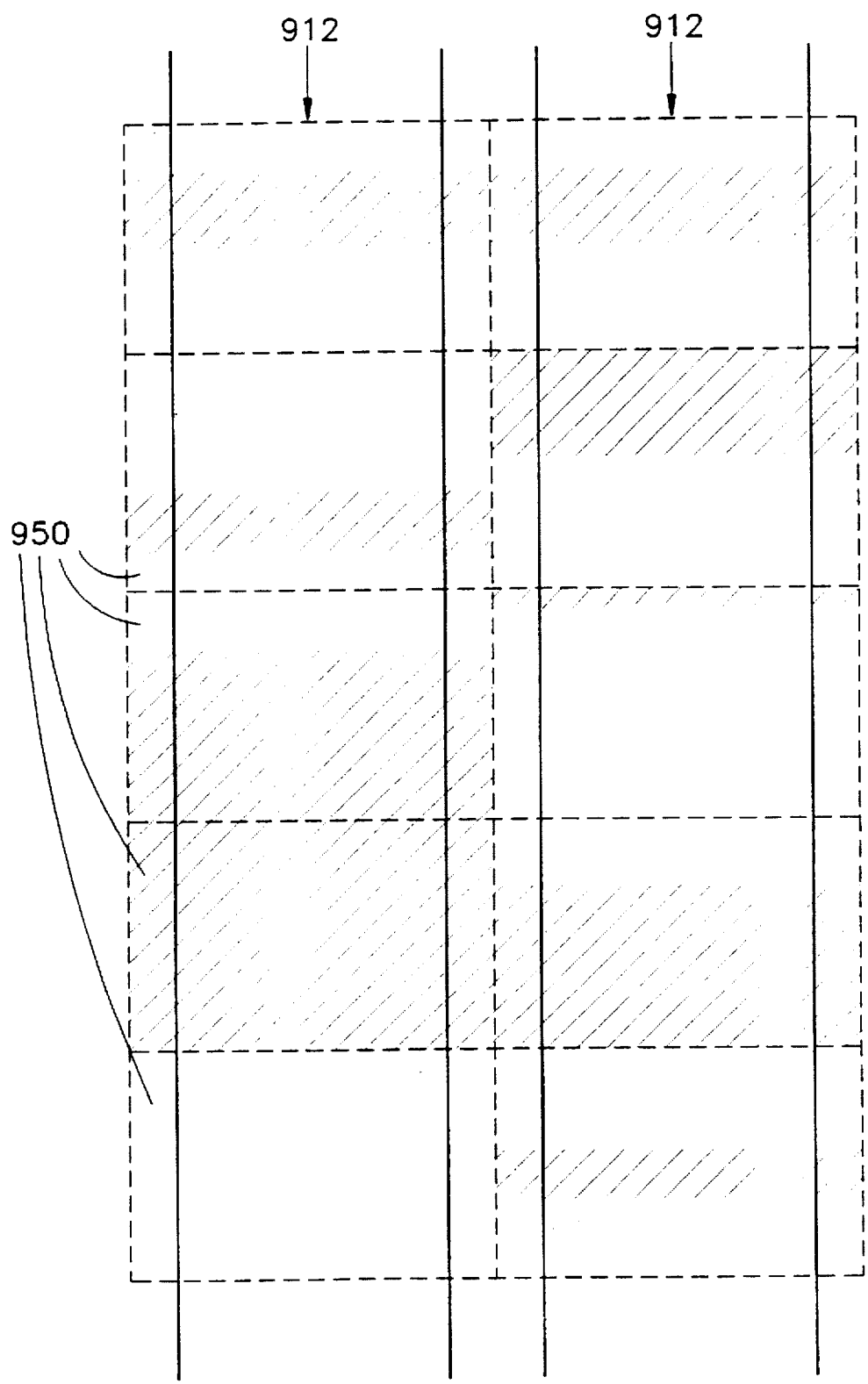
FIG. 20 is an illustration of a halftone pattern generated using the apparatus of FIG. 17A.

Reference is now made to FIG. 20 which illustrates a half-tone image pattern comprising a plurality of pixels 950, delimited by dashed lines, along conductive electrodes 912 (FIG. 17A). The image pattern may be generated using pulsewidth modulation techniques and image writing techniques described hereinabove where an EAPCS is activated continuously during the image writing cycle.

Pulsewidth modulation includes controlling the fractional area to be charged in each pixel 950 and micropositioning of the charged areas within pixel 950. In the example shown, the charged areas of the pixel are shaded and the substantially uncharged areas appear unshaded. Typically, the charge density in charged areas is the saturation level corresponding to the voltage applied to conductive electrodes 912.

Figure 21A:
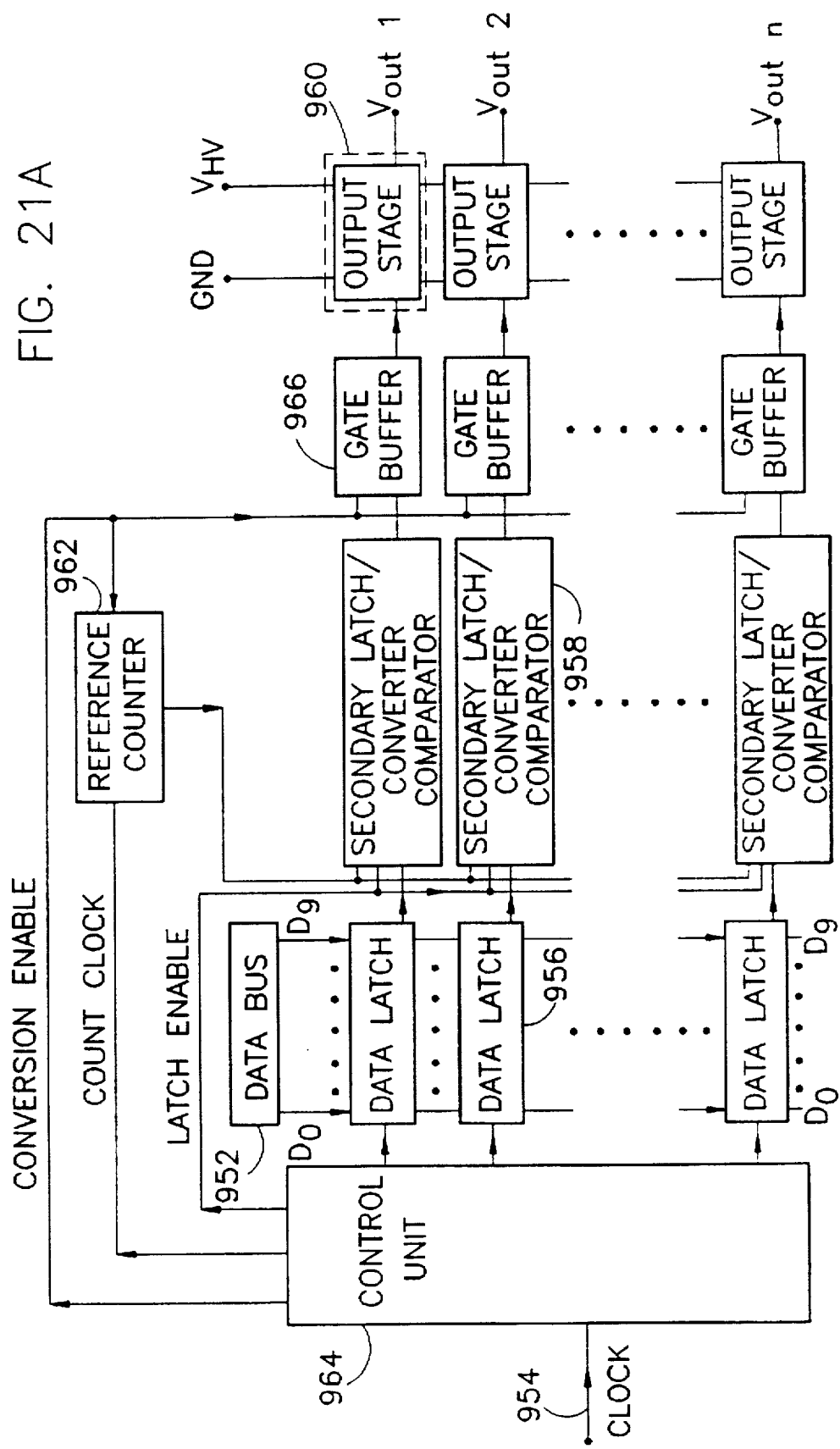
FIGS. 21A and 21B are block diagram illustrations of the architecture of the apparatus of FIG. 17A when used for producing a pixel-size modulated half-tone pattern.
Figure 21B:
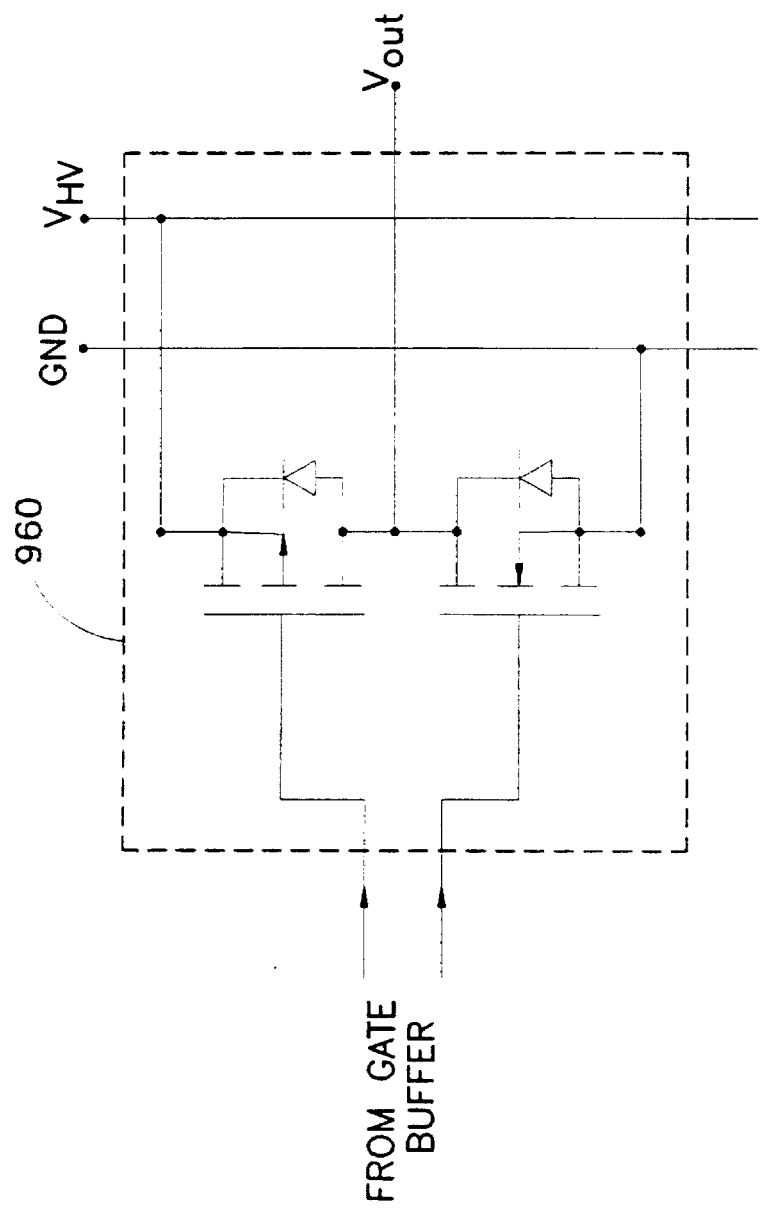

Reference is now made to FIGS. 21A and 21B which illustrate an example of basic pulsewidth modulation imaging apparatus that can be used to perform pulsewidth modulation for imaging pixels generated on conductive electrodes 912 (FIG. 17A). FIGS. 21A and 21B depict a further preferred embodiment of the apparatus of FIG. 17A which is particularly suitable for use in generating half tone images having multiple gray levels.

The basic circuitry typically comprises one among a multiplicity of units which make up the cascade 917 (FIG. 17A). Typically, for half-tone images with multiple gray levels, 10 bit inputs to the data bus may be used. Eight of the ten bits represent 256 possible levels for the fill fraction of each pixel. The remaining two bits represent four possibilities for micropositioning of the fill area within the pixel. Alternatively, any other suitable multi-bit input data combination may be used, with certain bits representing the fill fraction and the remaining bits representing the positioning.

Micropositioning of the fill area is used to achieve images having high spatial frequency. High spatial frequency enhances the appearance of toned images and enables simulation of continuous tone in half-tone images. Four possibilities for micropositioning represents a reasonable minimum necessary to ensure desirable variation in the fill location at adjacent pixels located on adjacent conductive strips as described in FIG. 6A-6C above. For a fill area that is greater than half the pixel area, the location may be adjacent the leading or trailing edge of the pixel. For a fill area that is less than half the pixel area, the location typically begins or ends at the middle of the pixel and extends towards the leading or trailing edge.

Conversion of input data to voltages on the conductive strips 912 by means of pulse width modulation is preferably carried out as described hereinbelow:

Data is serially loaded from a data bus 952 and propagated at a high rate, typically using loading clock 954 which operates at a few tens of MHz, into each data latch 956 of each unit in cascade 917. Each data latch 956 corresponds to one secondary latch 958 comprising a converter and comparator and one output stage 960. Once an entire line of data has been loaded into data latches 956, the line data is transferred in parallel from data latch 956 to secondary latches 958.

Transferring the data to secondary latches 958 allows new data representing the next line of the image to be loaded into data latches 956. Based on the above-described positioning bits, the data in secondary latches 958 is typically converted to two words describing the beginning and end locations of the fill region of the pixel.

The outputs of secondary latches 958 are supplied to respective gate buffers 966. The outputs of gate buffers 966 are supplied to respective output stages 960. A control unit 964 controls the timing and triggering of the subsystems in each device.

The conversion cycle begins by setting a binary reference counter 962 on each device to 00000000. In predefined increments, a clock signal is sent from control unit 964 to reference counter 962, incrementing reference counter 962 by units of 1 until a maximum level of 11111111 is reached. Each increment is associated with one of 256 possible pulse width outputs.

Each time the value in reference counter 962 is incremented, the two word digital information in secondary latch 958 associated with each output stage 960 and the value in reference counter 934 are compared. When reference counter 962 reaches the value held by secondary latch 958 for the beginning location of the pixel fill area, a signal is sent from secondary latch 958 to output gate buffer 966 and the output stage voltage increases to $V_{HV}$. When reference counter 962 reaches the value held by secondary latch 958 for the end location of the pixel fill area, a signal is sent from secondary latch 958 to output gate buffer 966 and the output stage voltage goes to ground.

Typically output stage 960 comprises push-pull high voltage MOSFETS capable of sinking and sourcing current from conductive electrodes 912 to which the output stages 960 are connected.

It is appreciated that half-tone color images can be generated by creating one half-tone image for each of the four printing colors.

It is further appreciated that during half-tone printing using the pulsewidth modulation imaging techniques described hereinabove, relatively large numbers of grey levels are achieved without reducing spatial resolution. Typically, half-tone techniques using super-pixel and screening methods require a tradeoff between the number of gray levels and the spatial resolution.

Figure 22:
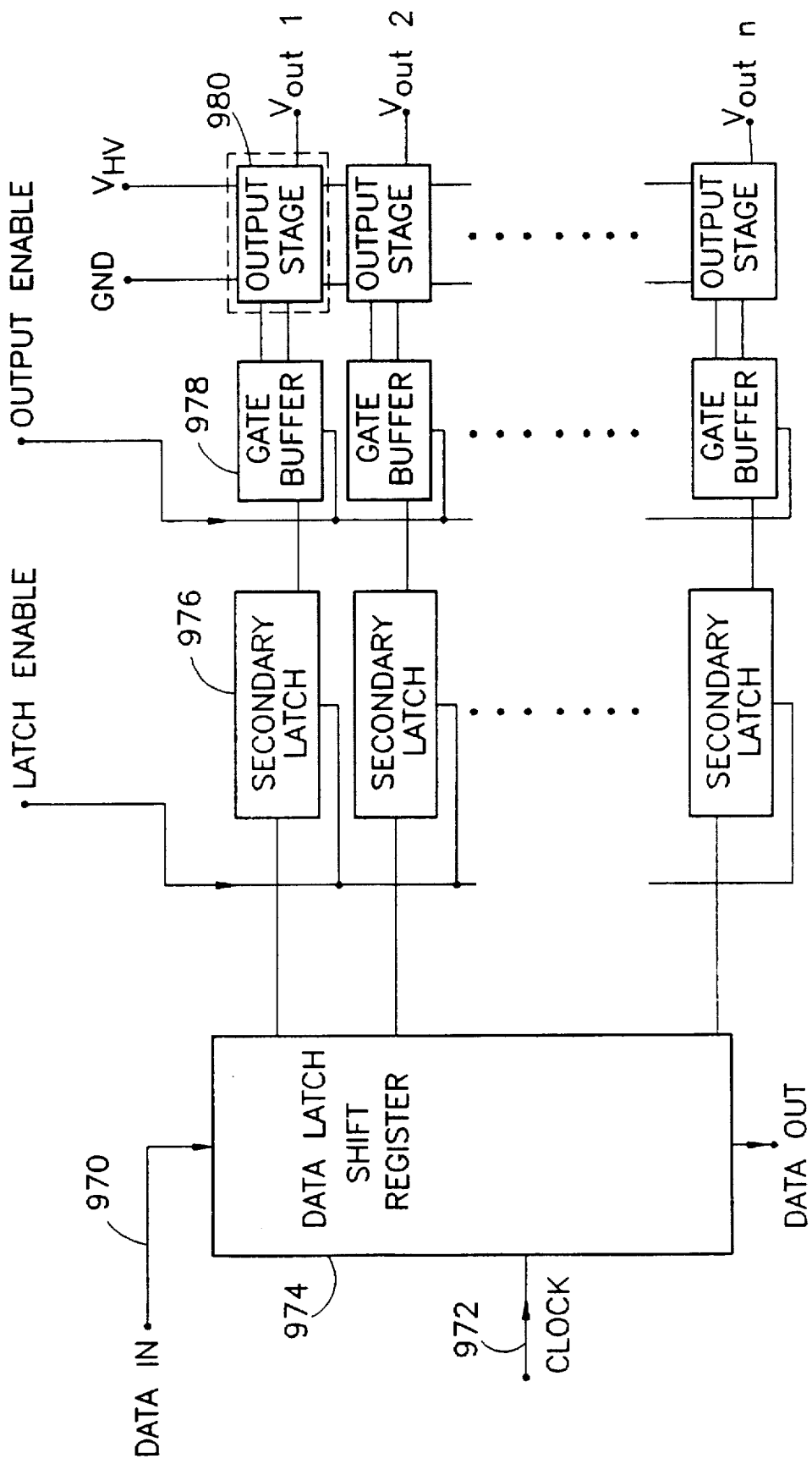
FIG. 22 is a block diagram illustration of the architecture of the apparatus of FIG. 17A when used for producing a super-pixel halftone pattern.

Reference is now made to FIG. 22 which illustrates an example of circuitry of basic apparatus that can be used to generate an alternate type of half-tone image on conductive electrodes 912. FIG. 22 depicts a further preferred embodiment of the apparatus of FIG. 17A which is particularly suitable for use in generating super-pixel half tone images based on screening methods.

The basic circuitry typically comprises one among a multiplicity of units which make up the cascade 917 (FIG. 17A). Typically, each such unit receives a one-bit input from a data bus 970. Based on the binary information supplied by the data bit, each conductive electrode 912 receives either high voltage or low voltage during the EAPCS activation. In this embodiment, the EAPCS can be activated in pulse mode or continuous mode.

Data is serially loaded from a data bus 970 and propagated at a high rate, typically using a loading clock 972 which operates at few tens of MHz, into a shift register 974. Once all the data for one line has been loaded into shift register 974 of all units in the cascade 917, the data is transferred in parallel to secondary latches 976. A signal is sent from a secondary latch 976 to an output gate buffer 978 indicating whether output stage 980 should apply high or low voltage to conductive strip 912.

Typically output stage 980 comprises push-pull high voltage MOSFETS capable of sinking and sourcing current from conductive electrodes 912 to which the output stages 980 are connected. Output stage 980 may be of the type shown in FIG. 21B.

Figure 23:
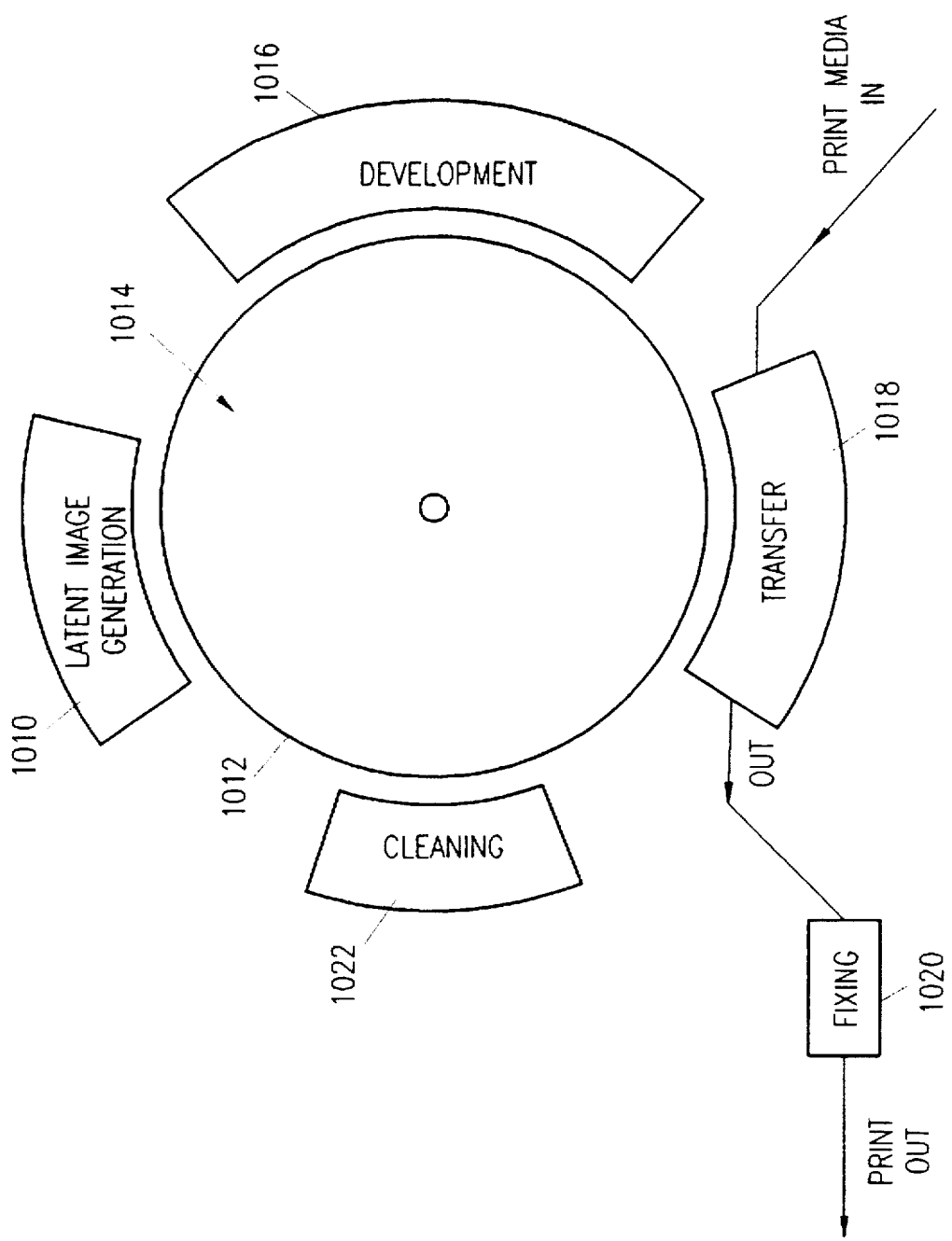
FIG. 23 is a schematic illustration of printing engine apparatus operative in accordance with a preferred embodiment of the present invention.

Reference is now made to FIG. 23 which is a schematic illustration of printing engine apparatus which may be incorporated into a variety of printer and digital copy systems. The printing engine apparatus is based on use of a digital input electrostatic (D/E) imaging drum as described hereinabove and is characterized by its ability to provide high quality text, graphics, and images using continuous tone or half tone imaging techniques. These imaging techniques may include modulation of the optical density of each pixel or modulation of the pixel dimensions as described hereinabove or any other suitable technique that is capable of providing a large number of grey levels.

The printing engine apparatus comprises an imaging drum 1010, having a dielectric outer surface 1011, and a latent image generation unit 1012 which creates electrostatic latent images on the dielectric outer surface 1011 of imaging drum 1010 in accordance with the techniques and latent image generation methods and using the apparatus described hereinabove and/or in one or more of applicant's co-pending patents and patent applications including U.S. Pat. Nos. 5,289,214 and 5,157,423 and U.S. patent applications 12939, 12466), the disclosure of which is hereby incorporated by reference.

Typically, the printing engine apparatus further comprises subsystems for image developing, image transfer, image fixing and cleaning of residual toner from imaging drum 1010. A step of electrostatic preconditioning of the dielectric outer surface of a drum prior to writing of a latent charge image, typically associated with standard electrostatic imaging techniques, is eliminated when using the latent image generating techniques described herein.

In FIG. 23, each subsystem is depicted as an individual unit with a developing unit being indicated by reference numeral 1016, a transfer unit being indicated by reference numeral 1018, a fixing unit being indicated by reference numeral 1020 and a cleaning unit being indicated by reference numeral 1022. Developing, transfer, fixing and cleaning techniques may be selected in accordance with the printer or digital copy system being used and in accordance with the desired printing medium, print quality, and process speed.

Developing unit 1016 is operative to develop an electrostatic latent image present on dielectric outer surface 1011 of drum 1010 to a visible toned image by application of liquid or dry toner. Developing unit 1016 may comprise one or several developing elements where each developing element applies a unique toning color.

The printing engine apparatus may be adapted for use with the differing developing voltage requirements of a multitude of toners. This is due to the fact that the image generating techniques which are used to create latent images on the dielectric outer surface 1011 of imaging drum 1010 can be adapted to a variety of apparent surface voltage ranges, as described hereinabove.

Either dry powder toner or liquid toner may be applied by developing unit 1016, with the precise structure of developing unit 1016 being selected in accordance with the type of toner used and the specific printer requirements.

Types of dry powder toners which may be used in the developing unit 1016 include monocomponent dry powder toners, of assorted size distributions. Specific types of toner may include both conductive and dielectric monocomponent toners such as those described in "Trends in Imaging Materials for Color Hardcopy", by D. Wilson, SPIE Vol. 1253 Hard Copy and Printing Materials, Media and Process (1990). Generally, when using dry powder toner, contact between developing unit 1016 and dielectric outer surface 1011 is required.

In place of monocomponent dry powder toners, dual component dry powder toners such as those described in the aforesaid SPIE article may be used. When dual, component dry powder toners are used, the developing unit 1016 may operate using non-contact developing techniques such as described, for example in U.S. Pat. No. 4,746,589 entitled Developing Method in Electrophotography Using Oscillating Electric Field to Haneda et al.

According to a further alternate embodiment, electrostatic liquid toners may be used in the developing unit 1016. Liquid toners having various types of colloidal dispersions with various size distributions, rheologic and fixing properties may be used. Primary fixing properties of the liquid toners may include drying by evaporation, heat and pressure fixing.

Transfer unit 1018 is operative to transfer the visible toned image from the dielectric outer surface 1011 of imaging drum 1010 to a print medium (not shown). A variety of techniques may be used to transfer the toned image from imaging drum 1010 to the print medium. Examples of such techniques are briefly described hereinbelow:

A monochrome image (typically cyan, yellow, magenta, or black) is developed on the dielectric outer surface 1011 of imaging drum 1010 in accordance with the steps described hereinabove. After developing, the monochrome image is transferred from the dielectric outer surface 1011 of imaging drum 1010 directly to print medium. The transfer may be carried out electrostatically, mechanically, or through a combination thereof.

To generate color images, several monochrome images (such as cyan, yellow, magenta, or black) may be developed on imaging drum 1010, one at a time, with each monochrome image then being directly transferred in precise registration to the same print medium, prior; to generation of the subsequent monochrome image. In this case, the number of transfers to one print medium corresponds to the number of colors used in forming the composite color image. The necessary level of transfer registration between the monochrome images composing the composite color image on the print medium is achieved using a high-registration transport unit, not shown. The transport unit, which may comprise a carrier belt or an imaging drum, repeatedly and precisely brings the print medium into touching contact with the dielectric outer surface 1011 of imaging drum 1010 for each necessary image transfer.

A monochrome image (such as cyan, yellow, magenta, or black) is developed on dielectric outer surface 1011 of imaging drum 1010 in accordance with the steps described hereinabove. The toned image is then transferred from dielectric outer surface 1011 to an intermediate transfer medium 1018 (belt, drum, etc.). The transfer may be carried out using mechanical means, electrostatically or through a combination thereof. Following cleaning by unit 1022 of the dielectric outer surface 1011 of imaging drum 1010, subsequent monochrome images are created and developed on dielectric outer surface 1011 of imaging drum 1010 with each monochrome image sequentially transferred to an intermediate transfer medium 1018. After all the monochrome images comprising a full color image have been transferred to the intermediate transfer medium, a single transfer is carried out to the print medium.

Alternately, each single monochrome image may be individually transferred from the intermediate transfer medium 1018 to the print medium creating the full composite color image on the print medium. Transfer from the intermediate transfer medium 1018 to the print medium may be carried out using mechanical means, a combination of mechanical and thermal means, or electrostatically. Using a heat and pressure combination unifies the steps of transfer and fixing. The material composition of the intermediate transfer medium and its surface energy are selected in accordance with the type of transfer desired.

A monochrome image (such as cyan, yellow, magenta, or black) is developed on dielectric outer surface 1011 of imaging drum 1010 in accordance with the steps described hereinabove. Subsequent latent images are superimposed on each previous developed image and then developed. After a composite color image is created on the dielectric outer surface 1011 of imaging drum 1010, a single transfer either directly to the print medium or alternately, to the intermediate transfer medium is carried out using any of the techniques mentioned above, and dielectric outer surface 1011 is cleaned. In order to effect the superimposition of latent images onto developed images, the toner used must exhibit dielectric properties in order that the surface conductance of the developed image be sufficiently low to prevent charge leakage and to preserve high resolution. An example of this type of toner is described in U.S. Pat. No. 3,337,340 to Matkan.

Fixing unit 1020 is operative to fix the transferred image onto the print medium. The structure of fixing unit 1020 is determined by the specific toner used in developing unit 1016. When dry toner is used, the toner is fused and fixed to the print medium using heat and pressure rollers or alternately using flood radiation heating. When some types of liquid toner are used, the toner may be fixed to the print medium upon spontaneous or induced evaporation of the liquid carrier. Fixing other types of liquid toner may require fusing of the toner particles onto the print medium by heat, pressure or a combination thereof.

When using an intermediate transfer medium as described hereinabove, the fixing of the image onto the print medium may occur simultaneous with the transfer, i.e. transfixing, thereby eliminating the need for fixing unit 1020.

Cleaning unit 1022 is operative to remove residual toner remaining on the dielectric outer surface 1011 of imaging drum 1010 after each transfer of toned images from imaging drum 1010. The structure of fixing unit 1022 is determined by the specific toner used in the developing unit 1016. When dry toner is used, removal of residual toner is typically carried out using mechanical means, using a scraping blade, rollers, brushes and/or a combination which may also comprise a vacuum.

Additionally, the cleaning stage may include a pre-cleaning step whereby dielectric outer surface 1011 of imaging drum 1010 is electrostatically treated. When liquid toner is used, the cleaning stage may comprise mechanical or chemical means or a combination thereof. Chemical means may include a local rinse with the carrier component used in the liquid toner or intergradients.

Figure 24:
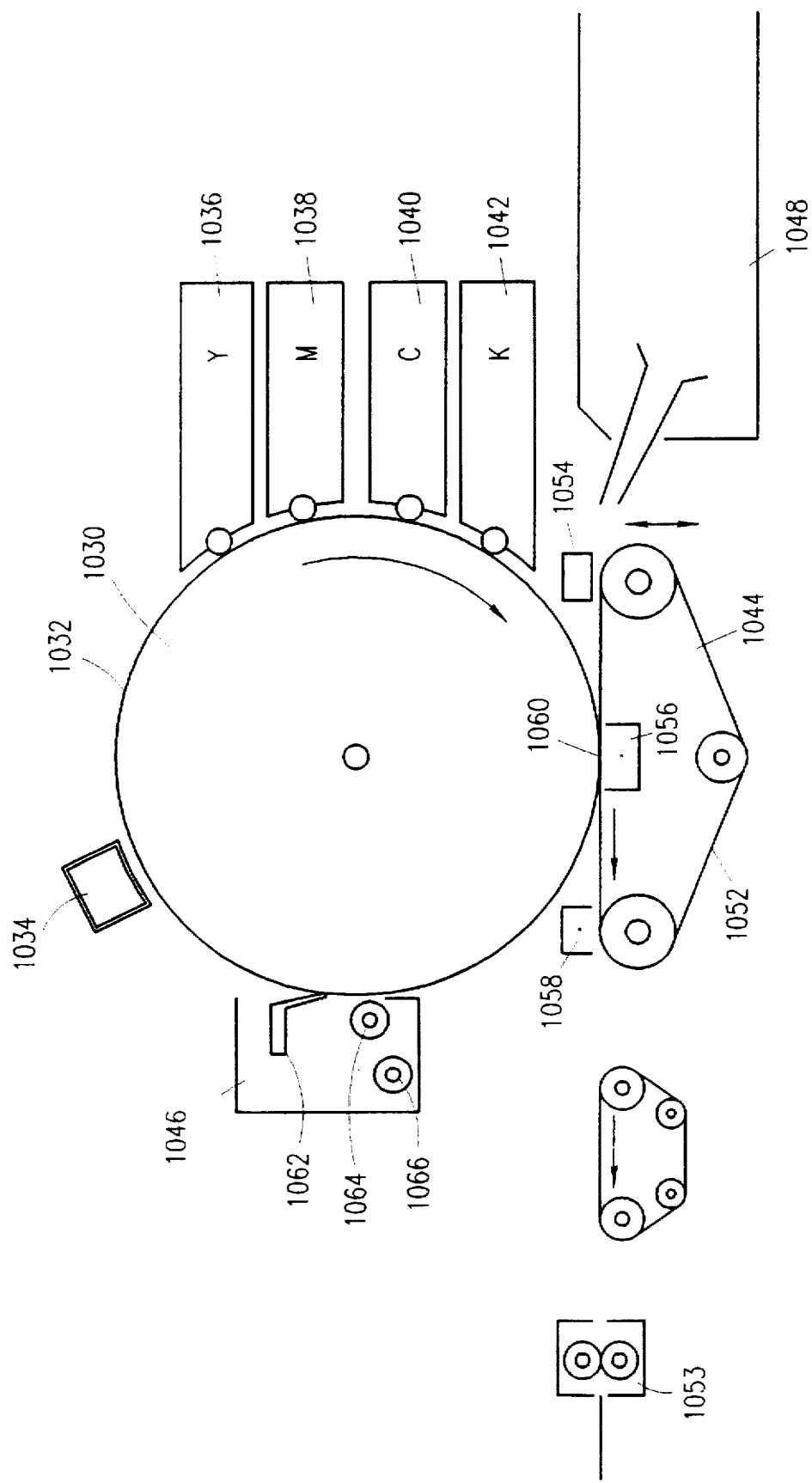
FIG. 24 is a structural illustration of printing engine apparatus representing an embodiment of the present invention.

Reference is now made to FIG. 24 which shows a structural illustration of a printing engine apparatus representing an example of a specific embodiment of the present invention. The printing engine apparatus shown in FIG. 24 is characterized by its ability to create a high quality composite color image on the imaging drum surface and to transfer the image in one step to a final print medium. The apparatus is also adaptable for monochrome images.

A conventional printing engine, taken from a Konica 90-28 Digital Color Copy Machine, from which the conventional drum was removed was employed by the inventor. This printing engine is specifically configured for color prints in formats up to standard paper size A3. A digital electrostatic imaging drum 1030 of the type described hereinabove and particularly shown in FIG. 15C and having an outer diameter of 7.2" (182 mm) was employed for latent image generation and developing in place of the conventional drum which was removed from the printing engine.

A dielectric outer surface 1032 of imaging drum 1030 comprises an imaging area and a non-imaging area where the non-imaging area subtends a 5.5" (140 mm) arc. The specific structure of the inner electronics of imaging drum 1030 and of the imaging regions of imaging drum 1030 may be generally as described hereinabove, particularly with reference to FIG. 16B.

The printing engine of FIG. 24 further comprises an edge-defined elongate alternating polarity charge source 1034, developer units 1036, 1038, 1040, and 1042, a transfer unit 1044, and a cleaning unit 1046. Furthermore, the printing engine may comprise a fixing unit 1047.

During printing, a print medium (not shown) typically paper, is fed to the printing engine using a feed unit 1048. A toned image, which may comprise one or many monochrome images, that was developed on outer surface 1032, is transferred to the print medium in accordance with the techniques described hereinabove. After transfer, the print medium is output via a transport unit 1060 to fixing unit 1047, where the toned image is fixed to the final print medium.

Alternating polarity charge source 1034, capable of achieving a spatial edge accuracy consistent with the desired resolution, is typically of the type described hereinabove or as described in one or more of applicant's co-pending patent applications mentioned above.

In the example shown in FIG. 24, each of developer units 1036, 1038, 1040 and 1042 typically contains dry dielectric toner in one of the primary imaging colors yellow, magenta, cyan and black. The toner is typically two-component based such as described in either of U.S. Pat. Nos. 4,746,589 and 4,679,929 both to Haneda et al or any other toner useful with the Konica 90-28 digital color copy machine and typically comprises relatively small carriers having an average carrier particle size of approximately 50 microns. Average toner particle size is approximately 10 microns.

Development of a latent image on outer surface 1032 of imaging drum 1030 may be carried out using non-contact development techniques. Using non-contact development apparatus enables a composite color image to be created on outer surface 1032 without mixing of color toners which could adversely affect the quality of the final image.

During each development cycle, one of the four developer units is activated. AC voltage with a DC bias is applied to a developing roller 1037, 1039, 1041 or 1043 in the corresponding activated developer unit 1036, 1038, 1040 or 1042. Application of the AC voltage creates a toner cloud adjacent outer surface 1032 by causing toner particles to oscillate in the space between outer surface 1032 and the developing roller of the activated developer unit. This results in developing conditions relatively similar to those found in powder cloud development, a technique characterized by the provision of a high number of grey levels.

An electrostatic attracting field, caused by the net difference between the apparent surface voltage, as defined hereinabove, of each pixel location of the latent image and a biased developing roller 1037, 1039, 1041 or 1043, is generated during development, attracting toner to outer surface 1032 of imaging drum 1030. The amount of toner electrostatically adhering to outer surface 1032 of imaging drum 1030 at each pixel location is a function of the magnitude of the electrostatic attracting field and determines the optical density of the toner at that location.

Transfer unit 1044 comprises a dielectric transfer belt 1052, a print medium charging device 1051, a transfer corona unit 1056, and a print medium neutralizing AC corona unit 1058. After a final toned image comprising one or several superimposed monochrome images is developed and toned on outer surface 1032 of imaging drum 1030, transfer from the surface 1032 to a print medium takes place as follows:

A print medium (not shown) such as plain paper is fed to transfer unit 1044 from feed unit 1048. A print medium charging device 1051 then electrostatically adheres the print medium to the top side of a transfer belt 1052. Once adhered, the print medium is carried by transfer belt 1052 to a transfer location 1055 where the print medium is brought into contact with surface 1032 of imaging drum 1030. The final toned image present on outer, surface 1032 of imaging drum 1030 is then electrostatically transferred directly onto the print medium.

During imaging drum revolutions during which no transfer from outer surface 1032 of imaging drum 1030 to a print medium takes place, transfer belt 1052 is moved out of contact with imaging drum 1030.

Transfer of the final toned image from imaging drum 1030 to the print medium takes place by activating a transfer corona unit 1056 which bombards the backside of transfer belt 1052 with charges of a polarity opposite to the polarity of the toner particles. This bombardment of the transfer belt 1052 causes the toner to be attracted to the print medium.

The print medium, bearing the final toned image, is then transported to a print medium neutralizing AC corona unit 1058 where the print medium is neutralized and detached from the transfer belt 1052. After detachment, the print medium is fed to a transport unit 1060 and is then transported to fixing unit 1047 where the final toned image is fixed to the print medium.

Cleaning unit 1046 preferably comprises an adjustable blade 1062, typically made of polyurethane, and a toner disposal roller 1064. After transfer of the final toned image to the print medium at location 1055, cleaning unit 1046 is brought into operative contact with outer surface 1032 of imaging drum 1030 to remove residual toner from outer surface 1032. The toner is then collected by toner disposal roller 1064 and is removed to a toner reservoir (not shown) using an Archimedes' screw 1066.

The imaging cycle may comprise the following steps:

Digital data representing an image pattern to be generated is serially input to the inner electronics (not shown) of imaging drum 1030 via rotary connectors (not shown). A latent image corresponding to the electronic signals input to the imaging drum is created on the imaging region of outer surface 1032 of imaging drum 1030 using edge-defined elongate alternating polarity charge source 1034. In the example illustrated in FIG. 24, an A3-size latent image corresponding to one toner color may be generated during one revolution of imaging drum 1030.

A second revolution of imaging drum 1030, during which one developer unit is activated, tones the latent image, thereby developing a monochrome image on outer surface 1032. For color prints, subsequent latent image generation and development cycles are carried out, with each new latent image being superimposed on the developed image. When all the monochrome images comprising the composite color image have been developed on outer surface 1032 of imaging drum 1030, a single transfer of the composite color image to the print medium is carried out at location 1055.

After the composite color image has been transferred to the print medium, the print medium is transported via transport unit 1060 to fixing unit 1047 where the composite color image is fixed to the print medium.

Alternately, the imaging cycle may comprise one transfer from imaging drum 1030 for each individual monochrome image. In this case, transfer unit 1044 requires modifications and may include a carrier belt (not shown) or carrier drum (not shown) and other mechanisms which are capable of handling the print medium and ensuring precise registration between the monochrome images of the composite color image. An example of a carrier drum and its associated mechanisms may be found in FIG. 6 of U.S. Pat. No. 5,105,280, assigned to Minolta Camera Kabushiki Kaisha of Osaka, Japan. A further example of a carrier drum and its associated mechanisms may be found in FIG. 5A of U.S. Pat. No. 5,111,302, assigned to Hewlett-Packard of Palo Alto, Calif.

Figure 25:
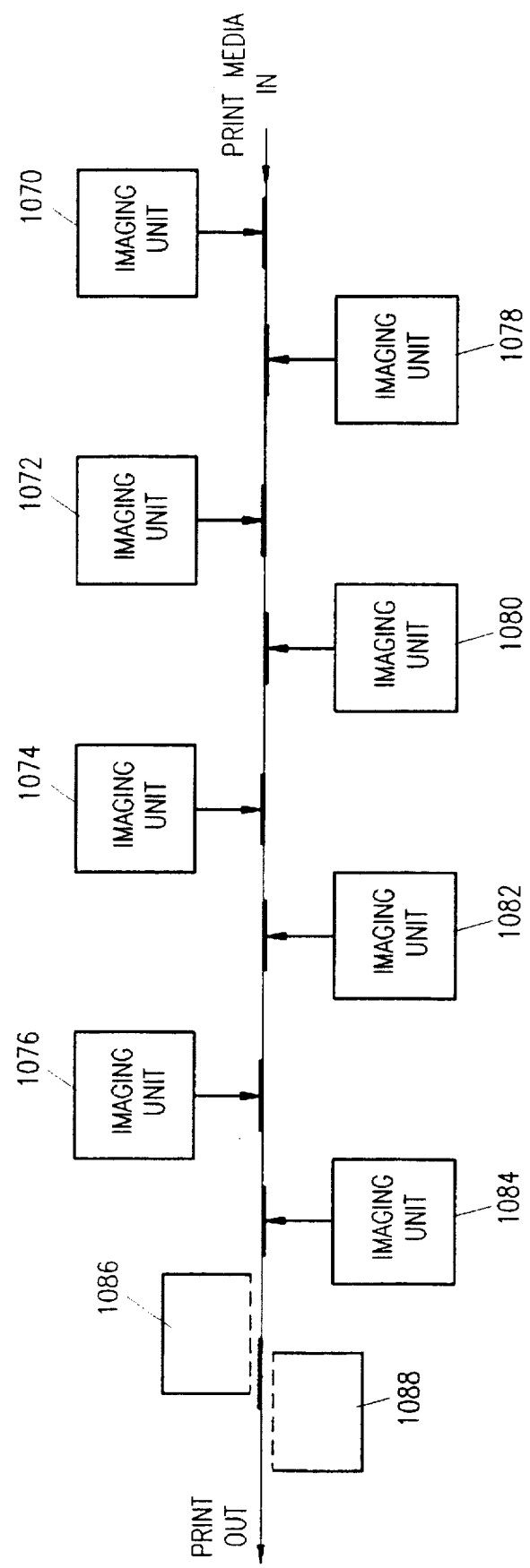
FIG. 25 is a schematic illustration of printing engine apparatus operative to provide high speed one-sided or duplex printing in an embodiment of the present invention.

Reference is now made to FIG. 25 which is a schematic illustration of printing engine apparatus implementing the imaging techniques and apparatus described hereinabove and in applicant's co-pending patent applications mentioned hereinabove, to provide very high speed one-sided or duplex printing. The printing engine apparatus and associated methods may form the base of a digital color press or alternately of other print devices where high speed, high quality, continuous tone printing is desired.

For duplex printing, the printing engine apparatus typically comprises four individual color imaging units;, such as cyan, magenta, yellow and black 1070, 1072, 1074 and 1076 for imaging one side of the print medium and an additional four color imaging units, such as cyan, magenta, yellow and black, 1078, 1080, 1082 and 1084 for imaging the second side of the print medium. It is appreciated that the exact number of color imaging units employed in the printing engine apparatus may be selected in accordance with the type of printing and the number of colors desired. For example, single sided printing may require only four color units. All color units in the printing engine apparatus may be operated simultaneously to achieve high throughput speeds which are unaffected by the number of colors used or by duplex printing.

Each color imaging unit preferably comprises a D/E imaging drum having a dielectric outer surface, a latent image generating unit, a developing unit, and a cleaning unit, all of which may be of the type described hereinabove with particular reference to FIG. 24 and FIG. 25.

A duplex color printing image may be generated as follows:

Color separation data representing an image to be printed on one side of a print medium is input to each of the color units distributed along one side of the print medium. Simultaneously, color separation data, representing a second image to be printed on the opposite side of the print medium may be input to each of the color units distributed along the second side of the print medium. After an image has been transferred to the print medium from one developing unit, the print medium is transported to the next imaging unit to receive a subsequent color separation image. This continues until a composite color image has been developed on both sides of the print medium.

The color units are activated in time synchronization, with the specific timing sequence of each latent image generation, development and transfer step being determined in accordance with the particular configuration of the imaging drum.

Latent images preferably are generated on the D/E imaging drum of each color unit using the latent image generation techniques and apparatus described in applicant's co-pending patent applications mentioned above. The development unit then generates a visible monochrome image on the imaging drum. Each developed monochrome image is then transferred to the print medium in registration. After transfer, any residual toner remaining on the imaging drum of each color unit is removed by the color unit's respective cleaning unit.

The print medium may be web roll-fed paper. Alternately, a carrier may be used to transport cut sheets between each of the color units.

After a composite color image has been created on the print medium, the image is fixed to the print medium at fixing units 1086 and 1088. Each fixing unit is typically operative to fix the composite color image to one side of the print medium. For one sided printing, one fixing unit is sufficient. Typically a fixing method which allows for high speed fixing of the image is used. An example of this type of fixing method is non-contact fixing using a radiant heat source. According to alternate embodiments of the present invention, image transfer and fixing may take place concurrently, eliminating the need for separate fixing units 1086 and 1088.

Figure 26:
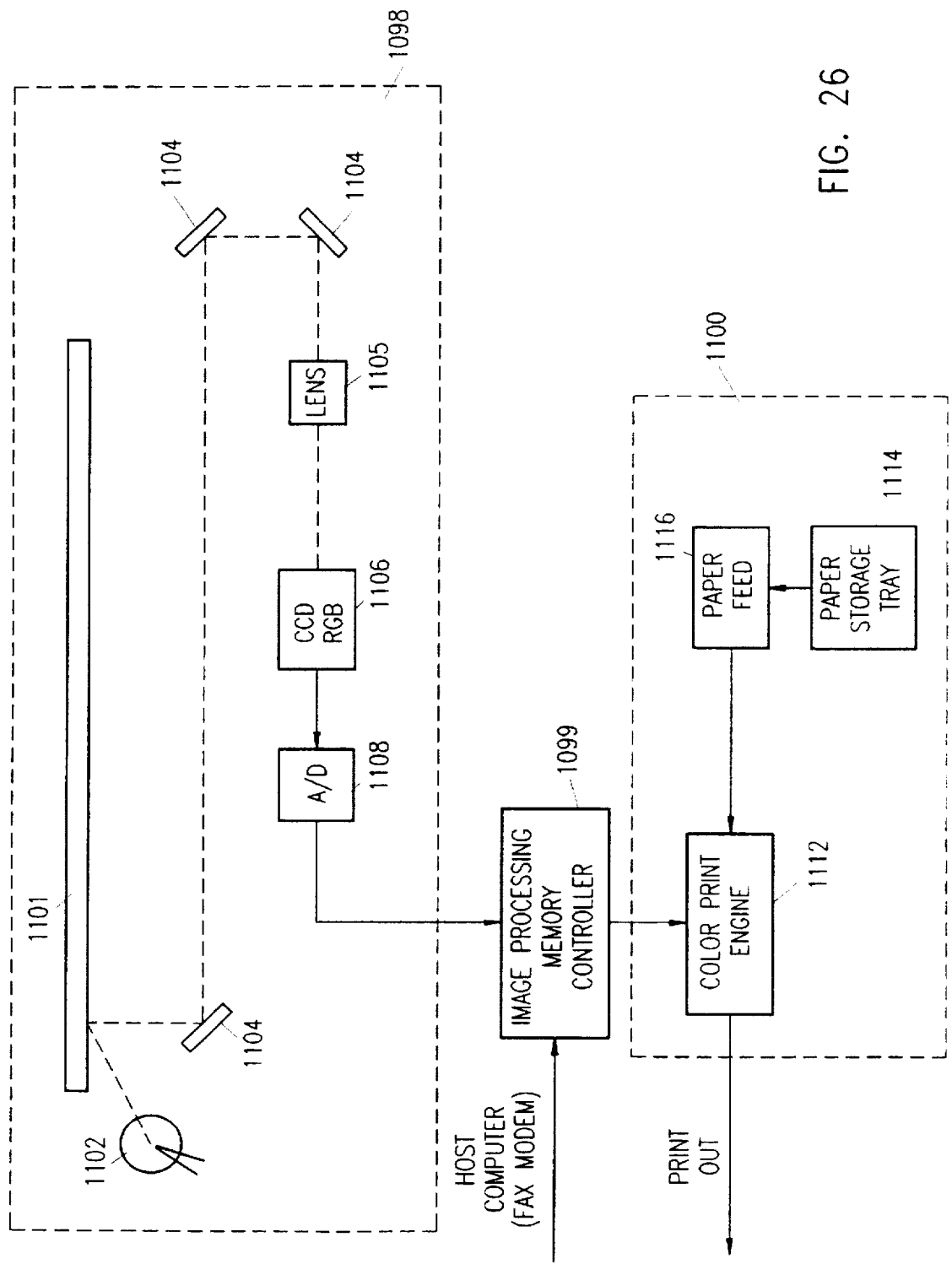
FIG. 26 is a schematic illustration of digital color copier apparatus operative in accordance with a preferred embodiment of the present invention.

Reference is now made to FIG. 26 which is a schematic illustration of digital color copier apparatus implemented using the print engine and imaging techniques and apparatus described hereinabove. The digital color copier apparatus preferably is composed of three main subunits: a scanning subunit 1098, a controller 1099 and a printing subunit 1100.

Scanning subunit 1098 scans the images to be copied and creates digital data corresponding to the RGB separations of the scanned image. The subunit 1098 may comprise standard color or monochrome scanning components including a generally flat scanning support surface 1101 on which an original image is placed prior to copying, a light source 1102, scanning optics 1104, including lens system 1105, CCD arrays and associated optical color filters 1106, and electronics 1108 which carry out analog to digital transfer of scanned data.

Controller 1099 receives data from the scanning subunit and carries out image processing and memory functions and transfer of the scanned data from the RGB format used in scanning to the CMYK format necessary for printing.

Printing subunit 1100 receives image data on a CMYK format and produces a hard copy of the image on a final print medium, typically cut-sheet paper. The printing subunit 1100 comprises a print engine 1112 which may be of the type described hereinabove with reference to FIG. 23 and FIG. 24. Paper is fed into print engine 1112 from a paper storage tray 1114 by a paper feed 1116.

Image data may be input to the controller 1099 from the scanning subunit 1098. Alternately, any other source that can provide electronic image data, for example a computer or a fax modem, can be used to provide input data to the printing subunit 1100 via the controller 1099.

It is appreciated that when using the print techniques described hereinabove to create print copies of a scanned image, printing of an image may be carried out in a line-by-line fashion. Since scanning of an image to create electronic data for printing may also He carried out in a line-by-line fashion, scanning and printing may occur simultaneously thus allowing conservation of memory resources.

Figure 27:
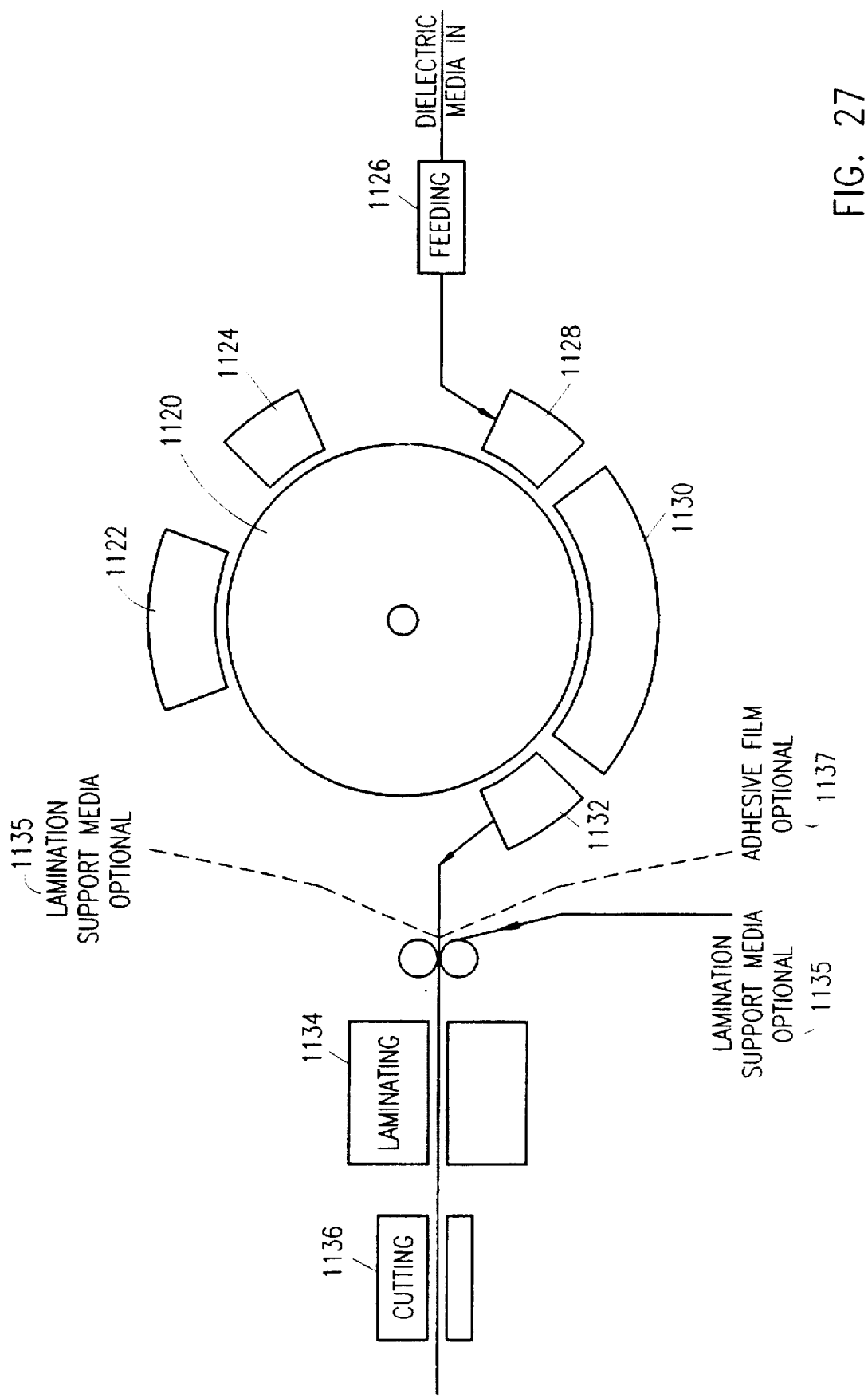
FIG. 27 is a schematic illustration of print laminator apparatus operative in accordance with a preferred embodiment of the present invention.

Reference is now made to FIG. 27 which is a schematic illustration of print laminator apparatus implemented using a version of the D/E imaging drum and modified imaging techniques and apparatus. The print laminator apparatus preferably comprises a D/E imaging drum 1120, which may be constructed in accordance with techniques and apparatus described hereinabove, typically having a dielectric outer surface 1121, a latent image generation unit 1122, a drum surface conditioning unit 1124, a dielectric film medium feed unit 1126, a film attachment unit 1128, a developing unit 1130, and a film detachment unit 1132.

The print laminator apparatus is characterized in that it creates composite color images directly on a thin, typically transparent, dielectric film, such as PET polyester, which has been attached to outer dielectric surface 1121 of printing drum 1120. Alternatively, the film may replace the outer dielectric surface 1121, provided that suitable dielectric connection is maintained with the remainder of the drum. After developing the composite color image, the film may be detached from the outer dielectric surface 1121 of imaging drum 1120 and laminated to a final substrate, thus creating a laminated print. Print laminator apparatus further comprises a laminating unit 1134 and may also comprise a cutting unit 1136.

A thin dielectric film, preferably having a thickness of 8–12 microns, is fed into the print engine using dielectric film medium feed unit 1126. Typically thin dielectric film may be either hazy or glossy. Preferably, the dielectric film is fed into feed unit 1126 in cut sheets. Alternately, dielectric film medium feed unit 1126 may contain cutting apparatus so that the dielectric-film output to the print engine apparatus is in cut sheet format.

As the dielectric film is being fed, drum surface conditioning unit 1124 preconditions outer dielectric surface 1121 of imaging drum 1120. Preconditioning of outer dielectric surface 1121 prepares the outer dielectric surface 1121 for attachment of the dielectric film thereto. Preconditioning and attachment may comprise any steps that enable good temporary adhesion between the dielectric film and the outer dielectric surface 1121 while maintaining dielectric uniformity across the dielectric film.

For example, when a liquid toner is used to develop the latent image, pre-conditioning may be carried out by rinsing and wetting the outer dielectric surface of the imaging drum with a dielectric liquid, such as the carrier component, typically Isopar, of the liquid toner. In this case, film attachment unit 1128 comprises apparatus which presses the dielectric film against the wet outer dielectric surface 1121 with a squeezing motion to remove the air between the outer dielectric surface 1121 and the dielectric medium. The necessary level of attachment is achieved by a vacuum that is then created between the two surfaces.

Once attachment of the dielectric film has been carried out, the dielectric film serves as the imaging surface for latent image generating and color development. Following attachment of the dielectric film, a color composite image is generated on the film surface, generally in accordance with image generating techniques described hereinabove, with a color composite image built up on the film from latent images which are superimposed on each previous developed image and then developed.

Since developing does not take place directly on the outer dielectric surface 1121 of imaging drum 1120, no toner cleaning unit is necessary.

Once the color composite image is fully developed, film detachment unit 1132 is activated, thereby removing the dielectric film from the outer dielectric surface 1121 of imaging drum 1120. Film detachment unit 1132 may detach the film by attracting and grabbing the leading edge of the dielectric film. Once the film has been detached, it is fed to laminating unit 1134 by transport apparatus (not shown).

At laminating unit 1134, the thin dielectric film may be laminated to a sup-port medium 1135 which may be paper, transparencies, etc. Typically, the dielectric film is laminated to the support material such that the side of the film containing the composite color image is placed in contact with the support medium 1135, protecting the image.. The support medium 1135 may contain adhesives, such as thermoplastics. Alternatively a typically thermoplastic transparent film 1137 may be sandwiched between the dielectric film and the support medium 1135 prior to the lamination.

Laminating unit 1134 preferably uses a combination of pressure and heat to adhere the dielectric film to the support medium 1135, thus creating the final print. Optional cutting unit 1136 may be used to define the precise edges of the final print. When cutting unit 1136 is used, high registration between the dielectric film and the support medium is not necessary.

It is appreciated that a print laminator apparatus as described herein could be used to generate high quality glossy or hazy (matte) continuous tone images on a variety of media including durable transparencies.

Generating and developing the toned image on the dielectric film, which then becomes a part of the final print, eliminates the step of transferring of a toned image and the resulting degradation of the image quality. Thus, the final print may be of a higher quality than images generated through ordinary print techniques.

Furthermore, during lamination the dielectric film encapsulates the toned image. Therefore, the image is protected from environmental sources and durability of the image is increased.

It will be appreciated by persons skilled in the art that the present invention is not limited to what has been particularly shown and described hereinabove. Rather the scope of the present invention is defined only by the claims which follow:

I claim:

1. Apparatus for pattern generation comprising:
   an imaging drum having an electrostatic latent image receiving and retaining surface;
   a plurality of electrodes underlying said electrostatic latent image receiving and retaining surface;
   imaging circuitry for application of voltage signals to said plurality of electrodes;
   a charge source operative to apply a flow of non-visible charges to said electrostatic latent image receiving and retaining surface, thereby creating an electrostatic latent image thereon; and
   a developing unit operative to apply toner to said electrostatic latent image receiving and retaining surface, thereby producing a toned image according to said latent image.

2. Apparatus according to claim 1 and also comprising a transfer unit operative to transfer said toned image to a print substrate.

3. Apparatus according to claim 2 and also comprising substrate feed and transport apparatus operative to feed said print substrate into said apparatus for pattern generation and to transport said print substrate to and from said transfer unit.

4. Apparatus according to claim 2 and wherein said transfer unit comprises an intermediate transfer medium.

5. Apparatus according to claim 1 and wherein said developing unit comprises a multi-color toner applicator assembly for applying toners of multiple colors.

6. Apparatus according to claim 1 and, wherein said developing unit comprises liquid toner applicator assembly.

7. Apparatus according to claim 1 and wherein said developing unit comprises a dry toner applicator assembly.

8. Apparatus according to claim 7 and wherein said dry toner applicator assembly comprises a monocomponent toner.

9. Apparatus according to claim 7 and wherein said dry toner applicator assembly comprises a dual component toner.

10. Apparatus according to claim 1 wherein said electrostatic latent image receiving and retaining surface is detachable from said imaging drum.

11. Apparatus according to claim 1 wherein said electrostatic latent image receiving and retaining surface is permanently attached to said imaging drum.

12. Apparatus for pattern generation on a relatively thin dielectric film comprising:
   a relatively thin dielectric film, an imaging drum including an outer dielectric substrate;
   a plurality of electrodes mounted underlying said outer dielectric substrate;
   imaging circuitry for application of voltage signals to said plurality of electrodes;
   a charge source operative to apply a flow of charges to said relatively thin dielectric film;
   an attaching unit which is operative to place said relatively thin dielectric film in dielectric contact with said outer dielectric substrate of said imaging drum;
   a detaching unit which is operative to separate said relatively thin dielectric film from said outer dielectric substrate of said imaging drum;
   a developing unit which is operative to apply toner to said relatively thin dielectric film; and
   a laminating unit which is operative to laminate said relatively thin dielectric film to a support medium.

13. Apparatus according to claim 12 and wherein said toner is liquid toner.

14. Apparatus according to claim 12 and wherein said support medium is paper.

15. Apparatus according to claim 12 and wherein said support medium is a transparency.

16. Apparatus according to claim 12 and wherein said laminating unit encapsulates the toner that is present on said relatively thin dielectric film.

17. Apparatus according to claim 12 and wherein said relatively thin dielectric film is transparent and glossy.

18. Apparatus according to claim 12 and wherein said relatively thin dielectric film is transparent and matte.

19. A method for pattern generation comprising the steps of:
   providing an imaging drum having an electrostatic latent image receiving and retaining surface;
   providing a plurality of electrodes underlying said electrostatic latent image receiving and retaining surface;
   applying voltage signals to said plurality of electrodes;
   operating a charge source to apply a flew of non-visible charges to said electrostatic latent image receiving and retaining surface, thereby creating an electrostatic latent image thereon; and developing said electrostatic latent image receiving and retaining surface, thereby producing a toned image according to said latent image.

20. A method according to claim 19 and also including the steps of feeding and transporting said substrate into operative association with said drum.

21. A method according to claim 19 and wherein said developing process includes the steps of applying toners of multiple colors.

22. A method according to claim 19 and wherein said developing process includes the steps of applying liquid toner.

23. A method according to claim 19 and wherein said developing process includes the steps of applying dry toner.

24. A method according to claim 23 and wherein said developing process includes the steps of applying a mono-component toner.

25. A method according to claim 23 and wherein said developing process includes the steps of applying a dual component toner.

26. A method according to claim 19 and wherein said transferring process includes the steps of transferring said tone image to an intermediate transfer medium.

27. A method for pattern generation on a relatively thin dielectric film comprising the steps of:

providing a relatively thin dielectric film;

providing an imaging drum including an outer dielectric substrate;

providing a plurality of electrodes mounted underlying said outer dielectric substrate;

applying voltage signals to said plurality of electrodes;

providing a charge source operative to apply a flow of charges to said relatively thin dielectric film;

placing said relatively thin dielectric film in dielectric contact with said outer dielectric substrate of said imaging drum;

separating said relatively thin dielectric film from said outer dielectric substrate of said imaging drum;

applying toner to said relatively thin dielectric film; and laminating said relatively thin dielectric film to a support medium.

28. A method according to claim 27 and wherein said applying toner process includes the step of applying a liquid toner.

29. A method according to claim 27 and wherein said laminating step includes the step of fixing said relatively thin dielectric film to paper.

30. A method according to claim 27 and wherein said laminating steps includes the step of fixing said relatively thin dielectric film to a transparency.

31. A method according to claim 27 and wherein said laminating step includes the step of encapsulating the toner that is present on said relatively thin dielectric film.

32. A method according claim 27 and wherein said step of placing a relatively thin dielectric film includes the step of placing a relatively thin transparent and glossy dielectric film.

33. A method according to claim 27 and wherein said step of placing a relatively thin dielectric film includes the step of placing a relatively thin transparent and matte dielectric film.

* * * * *